(12) United States Patent
Asterjadhi et al.

(10) Patent No.: US 10,660,038 B2
(45) Date of Patent: May 19, 2020

(54) WAKE-UP RADIO FRAME FORMATS AND DEVICE COMMUNICATIONS

(71) Applicant: QUALCOMM Incorporated, San Diego, CA (US)

(72) Inventors: Alfred Asterjadhi, San Diego, CA (US); George Cherian, San Diego, CA (US); Yanjun Sun, San Diego, CA (US); Santosh Paul Abraham, San Diego, CA (US); Bin Tian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/022,586

(22) Filed: Jun. 28, 2018

(65) Prior Publication Data

US 2019/0007901 A1 Jan. 3, 2019

Related U.S. Application Data

(60) Provisional application No. 62/527,984, filed on Jun. 30, 2017, provisional application No. 62/551,185, (Continued)

(51) Int. Cl.
*H04W 52/02* (2009.01)
*H04W 52/54* (2009.01)
(Continued)

(52) U.S. Cl.
CPC ... *H04W 52/0229* (2013.01); *H04W 52/0216* (2013.01); *H04W 52/0219* (2013.01);
(Continued)

(58) Field of Classification Search
CPC ......... H04W 52/0229; H04W 52/0235; H04W 52/0216; H04W 84/12; H04W 52/0219;
(Continued)

(56) References Cited

U.S. PATENT DOCUMENTS 9,485,733 B1 * 11/2016 Park ................ H04W 52/0235
2007/0177627 A1 8/2007 Raju et al.
(Continued)

FOREIGN PATENT DOCUMENTS

JP 2016171403 A 9/2016
WO PCT/KR2017/014220 * 6/2017 ............ H04W 84/12

OTHER PUBLICATIONS

Alfred Asterjadhi (Qualcomm Inc): "Considerations on WUR Frame Format", IEEE Draft, 11-17-1 004-00-00BA-Considerations-On-WUR Frame-Format, IEEE-SA Mentor, Piscataway, NJ USA vol. 802.11ba Jul. 10, 2017 (Jul. 10, 2017), XP068116421, pp. 1-15, Retrieved from the Internet: URL:https://mentor.ieee.org/802.11/dcn/17/11-17-1004-00-00baconsiderations-on-wur-frame-format.pptx [retrieved on Jul. 10, 2017].
(Continued)

*Primary Examiner* — Jung Liu
(74) *Attorney, Agent, or Firm* — Holland & Hart LLP

(57) ABSTRACT

This disclosure provides systems, devices, apparatus and methods, including computer programs encoded on storage media, for generating wake-up radio (WUR) frames formats and implementing WUR communications between transmitting and receiving wireless devices. A transmitting wireless device may identify one or more intended receiving wireless devices for which to send a WUR frame. The transmitting wireless device may generate the WUR frame, where the WUR frame has a first portion that includes a first field. The first field may indicate whether the WUR frame is a fixed length frame or a variable length frame. The transmitting wireless device may also determine a frame check sequence (FCS) type for use with a WUR frame for transmission. The FCS portion may be capable of being one of a plurality of FCS types. The transmitting wireless device may transmit
(Continued)

the WUR frame to the one or more intended receiving wireless devices.

30 Claims, 25 Drawing Sheets

Related U.S. Application Data filed on Aug. 28, 2017, provisional application No. 62/599,662, filed on Dec. 15, 2017, provisional application No. 62/627,186, filed on Feb. 6, 2018.

(51) Int. Cl.
*H04W 12/10* (2009.01)
*H04W 84/12* (2009.01)

(52) U.S. Cl.
CPC ... *H04W 52/0235* (2013.01); *H04W 52/0274* (2013.01); *H04W 52/54* (2013.01); *H04W 12/10* (2013.01); *H04W 84/12* (2013.01)

(58) Field of Classification Search
CPC . H04W 52/0274; H04W 52/54; H04W 12/10; H04W 52/0254; H04W 4/008; H04W 4/80; H04W 84/18; Y02D 70/1262; Y02D 70/00; Y02D 70/142; Y02D 70/144; Y02D 70/146; Y02D 70/26
See application file for complete search history.

(56) References Cited

U.S. PATENT DOCUMENTS

| | | | | |
|---|---|---|---|---|
| 2012/0155349 A1* | 6/2012 | Bajic | ............... | H04W 4/80 370/311 |
| 2014/0112226 A1* | 4/2014 | Jafarian | ............ | H04W 52/0229 370/311 |
| 2016/0128024 A1* | 5/2016 | Frederiks | ............. | H04B 7/0452 370/329 |
| 2016/0381638 A1* | 12/2016 | Min | ............... | H04W 52/0235 370/311 |
| 2017/0026907 A1* | 1/2017 | Min | ............... | H04W 52/0229 |
| 2018/0063788 A1* | 3/2018 | Yang | ............... | H04W 12/00502 |
| 2018/0242249 A1* | 8/2018 | Yang | ............... | H04W 52/028 |
| 2018/0255422 A1* | 9/2018 | Montemurro | ..... | H04W 52/0212 |
| 2018/0262865 A1* | 9/2018 | Lepp | ............... | H04W 4/80 |
| 2018/0324701 A1* | 11/2018 | Sun | ............... | H04W 52/0235 |
| 2018/0324717 A1* | 11/2018 | Zhou | ............... | H04W 52/54 |
| 2019/0007904 A1 | 1/2019 | Asterjadhi et al. | | |

OTHER PUBLICATIONS

Asterjadhi A., et al., "Considerations on WUR Frame Format", IEEE Draft; 11-17-1004-04-00BA-Considerations-on-WUR-Frame-Format, IEEE-SA Mentor, Piscataway, NJ USA, vol. 802.11ba, No. 4, Sep. 19, 2017 (Sep. 19, 2017), pp. 1-26, XP068121997, Retrieved from the Internet: URL: https://mentor.ieee.org/802.11/dcn/17/11-17-1004-04-00ba-considerations-on-wur-frame-format.pptx, [retrieved on Sep. 19, 2017].

IEEE: "Part 11: Wireless LAN Medium Access Control (MAC) and Physical Layer (PHY) Specifications Sponsored by the LAN/MAN Standards Committee", Mar. 29, 2012 (Mar. 29, 2012), XP055312651, 2791 pages, Retrieved from the Internet: URL:http://standards.ieee.org/getieee802/download/802.11-2012.pdf [retrieved on Oct. 20, 2016].

International Search Report and Written Opinion—PCT/US2018/040355—ISA/EPO—dated Nov. 16, 2018.

Liwen Chu (Marvell): "WUR MAC and Wakeup Frame", IEEE Draft, 11-17-0124-04-00BA-WUR-MAC-and-Wakeup-Frame, IEEE-SA Mentor, Piscataway, NJ USA vol. 802.11ba, No. 4, Jan. 16, 2017 (Jan. 16, 2017), XP068115186, pp. 1-14, Retrieved from the Internet: URL:https://mentor.ieee.org/802.11/dcn/17/11-17-0124-04-00ba-wur-mac-and-wakeup-frame.pptx [retrieved on Jan. 16, 2017].

Partial International Search Report—PCT/US2018/040355—ISA/EPO—dated Oct. 8, 2018.

Co pending U.S. Appl. No. 16/467,025, filed Jun. 21, 2019, 68 pages.

* cited by examiner

WAKE-UP RADIO FRAME FORMATS AND DEVICE COMMUNICATIONS

CROSS-REFERENCE TO RELATED APPLICATIONS

This patent application claims priority to U.S. Provisional Patent Application No. 62/527,984 filed 30 Jun. 2017 titled "Systems, Methods, and Apparatus For Implementing Wake-Up Radio (WUR) Device Communications," and to U.S. Provisional Patent Application No. 62/551,185 filed 28 Aug. 2017 titled "Systems, Methods, and Apparatus For Implementing Wake-Up Radio (WUR) Device Communications" and to U.S. Provisional Patent Application No. 62/599,662 filed 15 Dec. 2017 titled "Systems, Methods, and Apparatus For Implementing Wake-Up Radio (WUR) Device Communications" and to U.S. Provisional Patent Application No. 62/627,186 filed Feb. 6, 2018 titled "Systems, Methods, and Apparatus For Implementing Wake-Up Radio (WUR) Device Communications" and assigned to the assignee hereof. The disclosure of the prior Application is considered part of and is incorporated by reference in this Patent Application.

TECHNICAL FIELD

This disclosure relates generally to wireless communications, and more specifically to systems, methods, and devices for generating wake-up radio (WUR) frames formats and implementing WUR communications between transmitting and receiving devices.

DESCRIPTION OF THE RELATED TECHNOLOGY

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, as use of wireless networks increases, power constraints of wireless devices may become increasingly critical. Some devices may include a plurality of radios: zero or more "main" radios used for general communications and data transfer on the wireless networks and a secondary or "wake-up radio" for wake-up communications. In some cases, the WUR radio may be the only radio of the device. Specifically, the WUR may provide for communications when the main radio is in a power saving mode, as waking the WUR periodically to monitor communications on the wireless network may be more energy efficient than waking the main radio. Thus, improved systems, methods, and devices for communicating over wireless networks with WUR devices are desired.

SUMMARY

Various implementations of systems, methods and devices within the scope of the appended claims each have several aspects, no single one of which is solely responsible for the desirable attributes described herein. Without limiting the scope of the appended claims, some prominent features are described herein.

A method of wireless communication is described. The method may include identifying one or more intended receiving wireless devices for which to send a wake-up radio (WUR) frame, generating the WUR frame, and transmitting the WUR frame to the one or more intended receiving wireless devices.

An apparatus for wireless communication is described. The apparatus may include a processor, memory in electronic communication with the processor, and instructions stored in the memory. The instructions may be executable by the processor to cause the apparatus to identify one or more intended receiving wireless devices for which to send a WUR frame, generate the WUR frame, and transmit the WUR frame to the one or more intended receiving wireless devices.

Another apparatus for wireless communication is described. The apparatus may include means for identifying one or more intended receiving wireless devices for which to send a WUR frame, generating the WUR frame, and transmitting the WUR frame to the one or more intended receiving wireless devices.

A non-transitory computer-readable medium storing code for wireless communication is described. The code may include instructions executable by a processor to identify one or more intended receiving wireless devices for which to send a WUR frame, generate the WUR frame, and transmit the WUR frame to the one or more intended receiving wireless devices.

In some examples of the method, apparatuses, and non-transitory computer-readable medium described herein, the WUR frame includes a first portion that includes a first field and the first field indicates whether the WUR frame may be a fixed length frame or a variable length frame.

In some examples of the method, apparatuses, and non-transitory computer-readable medium described herein, the first field indicates to the one or more intended receiving wireless devices that a second portion of the WUR frame may be omitted based on a value of the first field and the first portion of the WUR frame may have a fixed length.

In some examples of the method, apparatuses, and non-transitory computer-readable medium described herein, the first field indicates to the one or more intended receiving wireless devices that a second portion of the WUR frame may be present based on a value of the first field and the first portion includes a second field that indicates a length of the second portion.

In some examples of the method, apparatuses, and non-transitory computer-readable medium described herein, the second portion may be a frame body.

In some examples of the method, apparatuses, and non-transitory computer-readable medium described herein, the length of the second portion may be an integer number of octets that may be based on a value of the second field.

In some examples of the method, apparatuses, and non-transitory computer-readable medium described herein, the first portion includes a second field that indicates (i) information different than a length of a second portion of the WUR frame or (ii) a length of a second portion of the WUR frame, the information or the length being indicated by the second field based on a value of the first field.

In some examples of the method, apparatuses, and non-transitory computer-readable medium described herein, the first portion includes a third field, the third field indicating a format type of the WUR frame and at least one of the second field or the third the value may be adjacent to the first field.

In some examples of the method, apparatuses, and non-transitory computer-readable medium described herein, the value of the first field indicates that the second field indicates information different than a length of a second portion of the WUR frame and a type of the information may be indicated based on one or both of a value of the second field and a value of the third field.

In some examples of the method, apparatuses, and non-transitory computer-readable medium described herein, the first portion may be a media access control (MAC) header.

In some examples of the method, apparatuses, and non-transitory computer-readable medium described herein, the first portion may be a PHY preamble.

In some examples of the method, apparatuses, and non-transitory computer-readable medium described herein, the first field may be positioned within a frame control field of the first portion.

In some examples of the method, apparatuses, and non-transitory computer-readable medium described herein, the first field may be positioned within type dependent (TD) control field of the first portion, the first field being positioned within the TD control field based on a protected field being positioned within a frame control field for a format type of the WUR frame.

In some examples of the method, apparatuses, and non-transitory computer-readable medium described herein, the first portion includes a common field that provides an identifier of the WUR frame.

In some examples of the method, apparatuses, and non-transitory computer-readable medium described herein, the first field indicates to the one or more intended receiving wireless devices that a second portion of the WUR frame may be present based on a value of the first field and the second portion includes a WUR identification value for each of the one or more intended receiving wireless devices.

In some examples of the method, apparatuses, and non-transitory computer-readable medium described herein, the first field indicates to the one or more intended receiving wireless devices that a second portion of the WUR frame may be present based on a value of the first field, the second portion includes a set of sequentially-ordered WUR identification values and each of the sequentially-ordered WUR identification values corresponds to at least one of the one or more intended receiving wireless devices.

In some examples of the method, apparatuses, and non-transitory computer-readable medium described herein, the set of sequentially-ordered WUR identification values may be provided in a decreasing order.

In some examples of the method, apparatuses, and non-transitory computer-readable medium described herein, the first field indicates to the one or more intended receiving wireless devices that a second portion of the WUR frame may be present based on a value of the first field, the second portion includes a control instructions field and the control instructions field includes a wake-up instruction associated with at least one of the one or more intended receiving wireless devices.

In some examples of the method, apparatuses, and non-transitory computer-readable medium described herein, the first portion includes signaling for a wake-up identifier.

In some examples of the method, apparatuses, and non-transitory computer-readable medium described herein, the wake-up identifier corresponds to the at least one of the one or more intended receiving wireless devices.

Some examples of the method, apparatuses, and non-transitory computer-readable medium described herein may further include operations, features, means, or instructions for receiving one or more instruction bits associated with the wake-up instruction from the at least one of the one or more intended receiving wireless devices.

In some examples of the method, apparatuses, and non-transitory computer-readable medium described herein, the wake-up instruction may be based on the received one or more instruction bits.

In some examples of the method, apparatuses, and non-transitory computer-readable medium described herein, the first portion includes signaling for at least two of a format type of the WUR frame, a presence of a second portion, or a wireless device identifier.

In some examples of the method, apparatuses, and non-transitory computer-readable medium described herein, the first portion includes signaling for a wireless device identifier that corresponds to the transmitting wireless device.

In some examples of the method, apparatuses, and non-transitory computer-readable medium described herein, at least one bit of the wireless device identifier may be positioned within a first two bytes of the first portion.

In some examples of the method, apparatuses, and non-transitory computer-readable medium described herein, the first portion includes signaling for a group identifier and the group identifier corresponds to at least two intended receiving wireless devices.

In some examples of the method, apparatuses, and non-transitory computer-readable medium described herein, the WUR frame includes a third portion and the third portion may be associated with a frame check sequence (FCS).

In some examples of the method, apparatuses, and non-transitory computer-readable medium described herein, the FCS may be a MIC based on a value of a protected field in the first portion.

In some examples of the method, apparatuses, and non-transitory computer-readable medium described herein, the first portion of the frame includes a TD control field that provides a partial timing synchronization function (TSF), the partial TFS included in the TD control field may be based on a format type of the WUR frame and the partial TFS included in the TD control field provides at least a portion of a monotonically increasing counter functionality.

A method of wireless communication is described. The method may include determining a frame check sequence FCS type for use with a WUR frame for transmission to one or more intended receiving wireless devices, generating the WUR frame, indicating an FCS type of the WUR frame corresponding to the FCS portion, and transmitting the WUR frame.

An apparatus for wireless communication is described. The apparatus may include a processor, memory in electronic communication with the processor, and instructions stored in the memory. The instructions may be executable by the processor to cause the apparatus to determine a frame check sequence FCS type for use with a WUR frame for transmission to one or more intended receiving wireless devices, generate the WUR frame, indicate an FCS type of the WUR frame corresponding to the FCS portion, and transmit the WUR frame.

Another apparatus for wireless communication is described. The apparatus may include means for determining a frame check sequence FCS type for use with a WUR frame for transmission to one or more intended receiving wireless devices, generating the WUR frame, indicating an FCS type of the WUR frame corresponding to the FCS portion, and transmitting the WUR frame.

A non-transitory computer-readable medium storing code for wireless communication is described. The code may include instructions executable by a processor to determine a frame check sequence FCS type for use with a WUR frame for transmission to one or more intended receiving wireless devices, generate the WUR frame, indicate an FCS type of the WUR frame corresponding to the FCS portion, and transmit the WUR frame.

In some examples of the method, apparatuses, and non-transitory computer-readable medium described herein, the WUR frame includes at least a first portion and an FCS portion.

In some examples of the method, apparatuses, and non-transitory computer-readable medium described herein, the FCS portion may be capable of being one of a plurality of FCS types.

In some examples of the method, apparatuses, and non-transitory computer-readable medium described herein, the FCS type may be a cyclic redundancy check (CRC) based on the WUR frame being an unprotected frame type.

In some examples of the method, apparatuses, and non-transitory computer-readable medium described herein, the FCS type may be a message integrity check (MIC) based on the WUR frame being a protected frame type.

In some examples of the method, apparatuses, and non-transitory computer-readable medium described herein, the indicating the FCS type of the WUR frame includes indicating the FCS type of the WUR frame to the one or more intended receiving wireless devices via information in a protected field receivable by the one or more intended receiving wireless devices prior to the FCS portion of the WUR frame.

In some examples of the method, apparatuses, and non-transitory computer-readable medium described herein, the first portion includes a frame control field and TD control field and the protected field may be positioned within one of the frame control field or the TD control field based on a format type of the WUR frame.

In some examples of the method, apparatuses, and non-transitory computer-readable medium described herein, the frame control field may have fewer bits than the TD control field.

In some examples of the method, apparatuses, and non-transitory computer-readable medium described herein, the indicating the FCS type of the WUR frame includes indicating the FCS type of the WUR frame to the one or more intended receiving wireless devices via one or more protection indicator bits of the WUR frame, the one or more protection bits may be positioned for transmission in a portion of the WUR frame prior to the FCS portion of the WUR frame and the portion of the WUR frame may be different than the first portion of the WUR frame.

In some examples of the method, apparatuses, and non-transitory computer-readable medium described herein, the indicating the FCS type of the WUR frame includes indicating the FCS type of the WUR frame to the one or more intended receiving wireless devices via a frame for transmission prior to transmission of the WUR frame.

Some examples of the method, apparatuses, and non-transitory computer-readable medium described herein may further include operations, features, means, or instructions for receiving protection type information indicating whether the WUR frame may be to be transmitted as one of an unprotected frame type or a protected frame type.

In some examples of the method, apparatuses, and non-transitory computer-readable medium described herein, the indicating the FCS type of the WUR frame may be based on the protection type information.

In some examples of the method, apparatuses, and non-transitory computer-readable medium described herein, the generating the WUR frame includes modifying a value of an FCS operation based on a partial BSS identifier to generate the FCS portion.

In some examples of the method, apparatuses, and non-transitory computer-readable medium described herein, the first portion may be a MAC header.

A method of wireless communication is described. The method may include receiving at least a portion of a WUR frame, decoding the at least the portion of the WUR frame that includes a first field of a first portion of the WUR frame, and determining that the WUR frame is a fixed length frame or a variable length frame based on the first field.

An apparatus for wireless communication is described. The apparatus may include a processor, memory in electronic communication with the processor, and instructions stored in the memory. The instructions may be executable by the processor to cause the apparatus to receive at least a portion of a WUR frame, decode the at least the portion of the WUR frame that includes a first field of a first portion of the WUR frame, and determine that the WUR frame is a fixed length frame or a variable length frame based on the first field.

Another apparatus for wireless communication is described. The apparatus may include means for receiving at least a portion of a WUR frame, decoding the at least the portion of the WUR frame that includes a first field of a first portion of the WUR frame, and determining that the WUR frame is a fixed length frame or a variable length frame based on the first field.

A non-transitory computer-readable medium storing code for wireless communication is described. The code may include instructions executable by a processor to receive at least a portion of a WUR frame, decode the at least the portion of the WUR frame that includes a first field of a first portion of the WUR frame, and determine that the WUR frame is a fixed length frame or a variable length frame based on the first field.

In some examples of the method, apparatuses, and non-transitory computer-readable medium described herein, the first field indicates to the receiving wireless device that a second portion of the WUR frame may be omitted based on a value of the first field and the first portion of the WUR frame may have a fixed length.

In some examples of the method, apparatuses, and non-transitory computer-readable medium described herein, the length of the second portion may be an integer number of octets that may be based on a value of the second field.

In some examples of the method, apparatuses, and non-transitory computer-readable medium described herein, the first field indicates to the receiving wireless device that a second portion of the WUR frame may be present based on a value of the first field and the first portion includes a second field that indicates a length of the second portion.

Some examples of the method, apparatuses, and non-transitory computer-readable medium described herein may further include operations, features, means, or instructions for decoding the at least the portion of the WUR frame that includes a second field of the first portion of the WUR frame.

In some examples of the method, apparatuses, and non-transitory computer-readable medium described herein, the second field indicates (i) information different than a length of a second portion of the WUR frame or (ii) a length of a second portion of the WUR frame, the information or the length being indicated by the second field based on a value of the first field.

Some examples of the method, apparatuses, and non-transitory computer-readable medium described herein may further include operations, features, means, or instructions for decoding the at least the portion of the WUR frame that includes a third field of the first portion of the WUR frame.

In some examples of the method, apparatuses, and non-transitory computer-readable medium described herein, the third field indicates a format type of the WUR frame and at least one of the second field or the third the value may be adjacent to the first field.

In some examples of the method, apparatuses, and non-transitory computer-readable medium described herein, the value of the first field indicates that the second field indicates information different than a length of a second portion of the WUR frame and a type of the information may be indicated based on one or both of a value of the second field and a value of the third field.

In some examples of the method, apparatuses, and non-transitory computer-readable medium described herein, the first portion may be a MAC header.

In some examples of the method, apparatuses, and non-transitory computer-readable medium described herein, the first portion may be a PHY preamble.

In some examples of the method, apparatuses, and non-transitory computer-readable medium described herein, the first field may be positioned within a frame control field of the first portion.

In some examples of the method, apparatuses, and non-transitory computer-readable medium described herein, the first field may be positioned within a TD control field of the first portion and the first field may be positioned within the TD control field based on a protected field being positioned within a frame control field for a format type of the WUR frame.

Some examples of the method, apparatuses, and non-transitory computer-readable medium described herein may further include operations, features, means, or instructions for decoding the at least the portion of the WUR frame that includes a common field of the first portion of the WUR frame.

In some examples of the method, apparatuses, and non-transitory computer-readable medium described herein, the common field provides an identifier of the WUR frame.

Some examples of the method, apparatuses, and non-transitory computer-readable medium described herein may further include operations, features, means, or instructions for ceasing to decode a remainder of the WUR frame based on the identifier of the WUR frame.

Some examples of the method, apparatuses, and non-transitory computer-readable medium described herein may further include operations, features, means, or instructions for decoding the at least the portion of the WUR frame that includes at least some of a set of sequentially-ordered WUR identification values of a second portion of the WUR frame.

In some examples of the method, apparatuses, and non-transitory computer-readable medium described herein, the first field indicates to the receiving wireless device that the second portion of the WUR frame may be present based on a value of the first field.

Some examples of the method, apparatuses, and non-transitory computer-readable medium described herein may further include operations, features, means, or instructions for determining that the WUR frame may be not intended for the receiving wireless device based on a comparison of a WUR identification value of the receiving wireless device and a WUR identification value of the set of sequentially-ordered WUR identification values that may be not a last value of the sequentially-ordered WUR identification values and ceasing to decode a remainder of the WUR frame based on the determining that the WUR frame may be not intended for the receiving wireless device.

In some examples of the method, apparatuses, and non-transitory computer-readable medium described herein, the set of sequentially-ordered WUR identification values may be provided in a decreasing order.

Some examples of the method, apparatuses, and non-transitory computer-readable medium described herein may further include operations, features, means, or instructions for decoding the at least the portion of the WUR frame that includes a control instructions field of a second portion of the WUR frame.

In some examples of the method, apparatuses, and non-transitory computer-readable medium described herein, the first field indicates to the receiving wireless device that a second portion of the WUR frame may be present based on a value of the first field and the control instructions field includes a wake-up instruction associated with the receiving wireless device.

Some examples of the method, apparatuses, and non-transitory computer-readable medium described herein may further include operations, features, means, or instructions for transmitting one or more instruction bits associated with the wake-up instruction to a transmitting wireless device.

In some examples of the method, apparatuses, and non-transitory computer-readable medium described herein, the wake-up instruction may be based on the transmitted one or more instruction bits.

Some examples of the method, apparatuses, and non-transitory computer-readable medium described herein may further include operations, features, means, or instructions for transmitting a response to the WUR frame to a transmitting wireless device based on the wake-up instruction.

Some examples of the method, apparatuses, and non-transitory computer-readable medium described herein may further include operations, features, means, or instructions for decoding the at least the portion of the WUR frame that includes a third portion of the WUR frame.

In some examples of the method, apparatuses, and non-transitory computer-readable medium described herein, the third portion associated with an FCS.

Some examples of the method, apparatuses, and non-transitory computer-readable medium described herein may further include operations, features, means, or instructions for determining that the FCS may be a MIC based on a value of a protected field in the first portion.

Some examples of the method, apparatuses, and non-transitory computer-readable medium described herein may further include operations, features, means, or instructions for decoding the at least the portion of the WUR frame that includes a TD control field of the first portion of the WUR frame.

In some examples of the method, apparatuses, and non-transitory computer-readable medium described herein, the TD control field provides a partial TSF, the partial TFS being included in the TD control field may be based on a format type of the WUR frame and the partial TFS being included in the TD control field provides at least a portion of a monotonically increasing counter functionality.

A method of wireless communication is described. The method may include receiving a WUR frame, determining an FCS type of the WUR frame corresponding to the FCS portion, and determining whether the WUR frame is a valid frame based on performing an FCS operation corresponding to the FCS type of the WUR frame.

An apparatus for wireless communication is described. The apparatus may include a processor, memory in electronic communication with the processor, and instructions stored in the memory. The instructions may be executable by the processor to cause the apparatus to receive a WUR frame, determine an FCS type of the WUR frame corresponding to the FCS portion, and determine whether the WUR frame is a valid frame based on performing an FCS operation corresponding to the FCS type of the WUR frame.

Another apparatus for wireless communication is described. The apparatus may include means for receiving a WUR frame, determining an FCS type of the WUR frame corresponding to the FCS portion, and determining whether the WUR frame is a valid frame based on performing an FCS operation corresponding to the FCS type of the WUR frame.

A non-transitory computer-readable medium storing code for wireless communication is described. The code may include instructions executable by a processor to receive a WUR frame, determine an FCS type of the WUR frame corresponding to the FCS portion, and determine whether the WUR frame is a valid frame based on performing an FCS operation corresponding to the FCS type of the WUR frame.

In some examples of the method, apparatuses, and non-transitory computer-readable medium described herein, the WUR frame includes at least a first portion and an FCS portion.

In some examples of the method, apparatuses, and non-transitory computer-readable medium described herein, the FCS portion may be capable of being one of a plurality of FCS types.

In some examples of the method, apparatuses, and non-transitory computer-readable medium described herein, the FCS type may be a CRC based on the WUR frame being an unprotected frame type.

In some examples of the method, apparatuses, and non-transitory computer-readable medium described herein, the FCS type may be a MIC based on the WUR frame being a protected frame type.

In some examples of the method, apparatuses, and non-transitory computer-readable medium described herein, the determining the FCS type of the WUR frame includes determining the FCS type of the WUR frame based on information in a protected field of the first portion of the WUR frame and the first portion of the WUR frame may be decoded prior to the FCS portion of the WUR frame.

In some examples of the method, apparatuses, and non-transitory computer-readable medium described herein, the first portion includes a frame control field and a TD control field, and where the protected field may be positioned within one of the frame control field or the TD control field based on a format type of the WUR frame.

In some examples of the method, apparatuses, and non-transitory computer-readable medium described herein, the frame control field may have fewer bits than the TD control field.

In some examples of the method, apparatuses, and non-transitory computer-readable medium described herein, the determining the FCS type of the WUR frame includes determining the FCS type of the WUR frame based on one or more protection indicator bits of the WUR frame, the one or more protection bits in a portion of the WUR frame may be decoded prior to the FCS portion of the WUR frame and the portion of the WUR frame may be different than the first portion of the WUR frame.

Some examples of the method, apparatuses, and non-transitory computer-readable medium described herein may further include operations, features, means, or instructions for receiving a frame prior to the WUR frame.

In some examples of the method, apparatuses, and non-transitory computer-readable medium described herein, the determining the FCS type of the WUR frame includes determining the FCS type of the WUR frame based on information in the frame prior to the WUR frame.

Some examples of the method, apparatuses, and non-transitory computer-readable medium described herein may further include operations, features, means, or instructions for transmitting protection type information indicating whether the WUR frame may be to be received as one of an unprotected frame type or a protected frame type.

In some examples of the method, apparatuses, and non-transitory computer-readable medium described herein, a value of the FCS portion may be based on a modification with a partial BSS identifier of a transmitting wireless device.

Some examples of the method, apparatuses, and non-transitory computer-readable medium described herein may further include operations, features, means, or instructions for discarding the WUR frame based on the value of the FCS portion.

In some examples of the method, apparatuses, and non-transitory computer-readable medium described herein, an unmodified value of the FCS portion corresponds to a valid FCS value for the first portion of the WUR frame.

In some examples of the method, apparatuses, and non-transitory computer-readable medium described herein, the first portion may be a MAC header.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Some of the drawings may not depict all of the components of a given system, method or device. Like reference numerals may be used to denote like features throughout the specification and figures.

DETAILED DESCRIPTION

Figure 1:
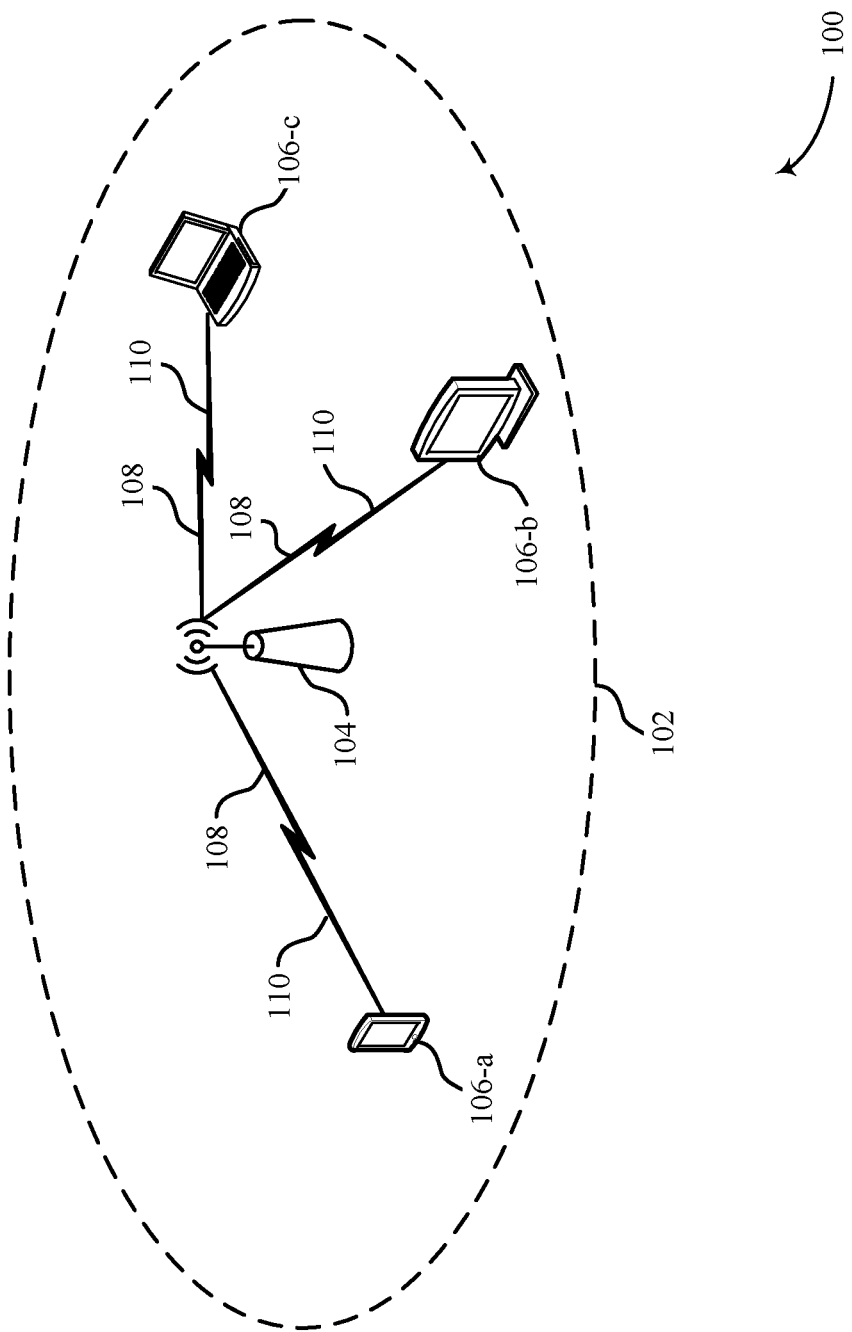
FIG. 1 illustrates an example of a wireless communication system that supports wake-up radio (WUR) frame formats in accordance with some implementations.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one of ordinary skill in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, a watch, etc. In an example, an STA connects to an AP via a WiFi (e.g., IEEE 802.11 protocol) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An AP may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram of an exemplary wireless communication system 100 in which aspects of the present disclosure may be employed. The wireless communication system 100 may operate pursuant to a wireless standard, for example a high-efficiency (HE) 802.11 standard, high throughput (HT) 802.11 standard, a very high throughput (VHT) standard, or any other wireless communication standard. The wireless communication system 100 may include an AP 104, which communicates with STAs 106 (referring generally to the STAs 106-a, 106-b, and 106-c).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a DL 108 may be referred to as a forward link or a forward channel, and an UL 110 may be referred to as a reverse link or a reverse channel. This communication link may be established via a single-input-single-output (SISO), multiple-input-single-output (MISO), single-input-multiple-output (SIMO), or a multiple-input-multiple output (MIMO) system.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network (e.g. TDLS, WiFi-Direct) between the STAs 106. Accordingly, the functions of the AP 104 described herein may alternatively be performed by one or more of the STAs 106.

In some aspects, a STA 106 may be required to associate with the AP 104 in order to send communications to or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN). In some aspects, the STA 106 may already be associated with AP 104 and may periodically monitor the communications from the AP 104 for communications directed to the STA 106.

In some implementations, one or more of the STAs 106 of the BSA 102 may include a plurality of radios. For example, these STAs may include a "main" radio that is used to perform communications within wireless communication system 100 and the low power radio or WUR that is used to monitor for "wake-up" or similar low power communications from the AP 104 when the STA 106 is in a low power or power saving mode. In some implementations, the STAs 106 may only include the WUR radio. In some implementations the STA may include more than one main radio, each of which may operate in different bands (e.g., 2.4, 5, 6, 18, 60 GHz, etc.) or with different wireless technologies (LTE, Bluetooth, 802.11). The STAs 106 including the WUR radio may be designated as WUR STAs. The WUR may be a transmitter or receiver circuit with minimal capabilities (e.g., minimal compatibility with communication frequencies and speeds) for communication over the communication system 100. In some implementations, the WUR may include fewer features than the main radio, for example lack of advanced encoder/decoder capabilities, etc. Accordingly, the WUR may be lower in cost than the main radio and may also consume less power than the main radio when in operation. Thus, the WUR may be used to monitor for communications to the STA more efficiently than using the main radio of the STA. In certain cases the WUR radio may be operating in a different channel/band compared to the one or more main radios. The WUR may be configured to receive instructions from the AP 104 (or other devices broadcasting on the wireless communication system 100). These instructions may include instructions to "wake-up" the main radio or perform other actions that do not require activation of the main radio.

In some implementations, the AP 104 or the STAs 106 may be configured to generate various WUR communications for WUR devices. For example, the AP 104 or the STAs 106 may be configured to synchronize devices based on a WUR beacon transmission. Additionally, or alternatively, the AP 104 or the STAs 106 may transmit unicast WUR messages to wake up a single WUR STA or multicast/broadcast WUR messages to wake up multiple or all WUR STAs. The AP 104 or the STAs 106 be configured to generate and transmit WUR Beacon frames/messages, WUR control frames/messages, etc. Similarly, the WUR STAs may be configured to perform various operations based on the received WUR communications. For example, the WUR STAs may synchronize based on WUR Beacon reception that includes timing information, wake up based on an individual or multicast/broadcast wakeup message, activate lights or perform actions, etc.

WUR communications may be generally based on typical IEEE802.11 communication structures. For example, communication frames may include preambles, addressing information, control information, and frame check information. However, the IEEE802.11 communication structures may be customized for WUR communication (e.g., WUR PPDUs) in order to reduce or minimize overhead and maintain signaling of essential information to enable various operations. In some implementations, the WUR PPDUs may provide flexibility for a wide range of use cases and scenarios.

Figure 2:
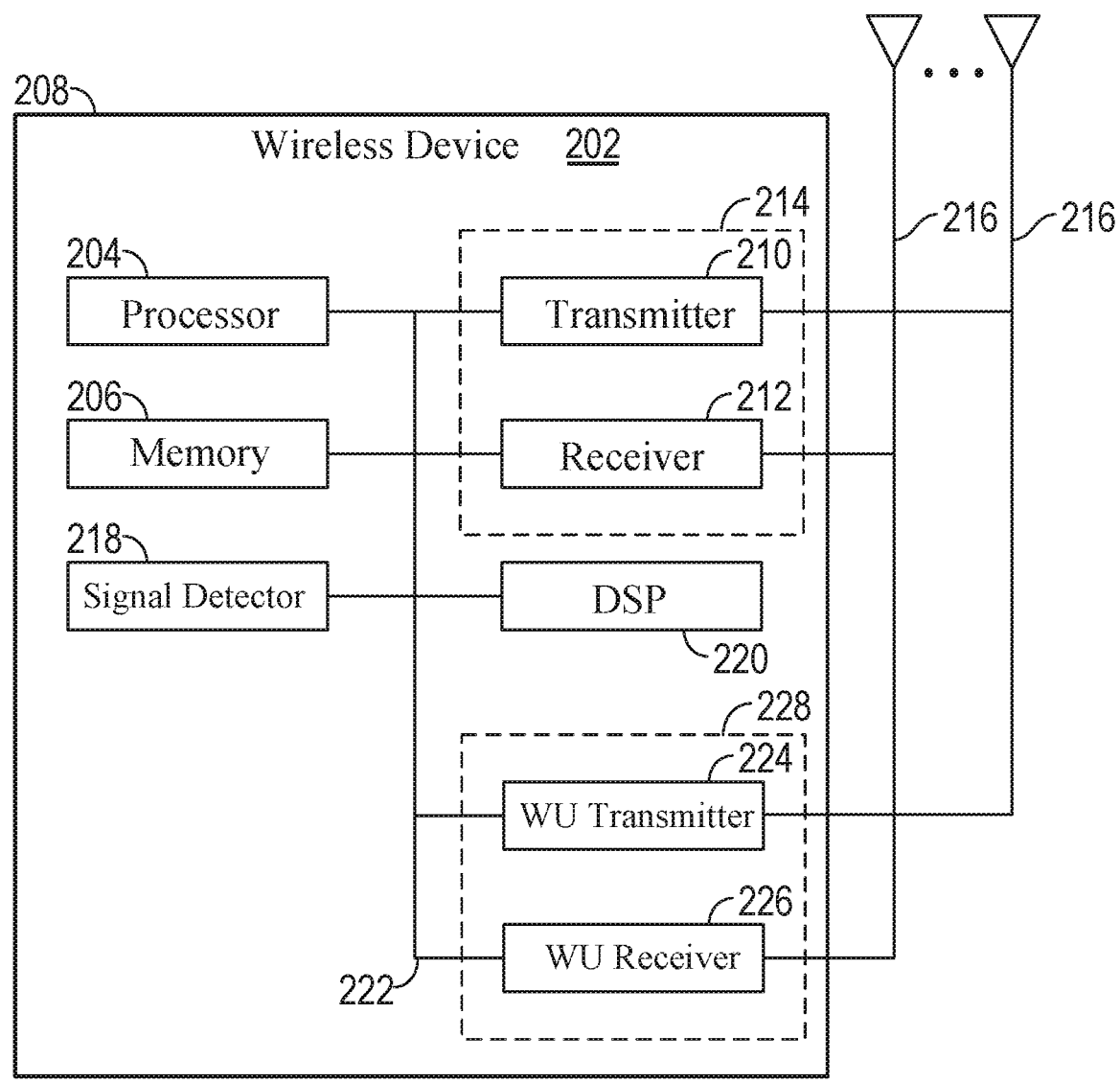
FIG. 2 illustrates various components that may be utilized in a wireless device that may be employed within the wireless communication system of FIG. 1, in accordance with some implementations.

FIG. 2 illustrates various components that may be utilized in a wireless device 202 that may be employed within the wireless communication system 100 of FIG. 1, in accordance with some implementations. The wireless device 202 is an example of a device that may be configured to implement the various methods described herein. The wireless device 202 may implement a WUR AP or a WUR STA. In some implementations, the wireless device 202 may implement an AP 104 or a STA 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location or device. The transmitter 210 and receiver 212 may be combined into a transceiver 214. A single or a plurality of transceiver antennas 216 may be attached to the housing 208 and electrically coupled to the transceiver 214. The wireless device 202 may also include multiple transmitters (e.g., WUR transmitter 224), multiple receivers (e.g., WUR receiver 226), and multiple transceivers (e.g., WUR transceiver 228).

The wireless device 202 may also include a signal detector 218 that may be used in an effort to detect and quantify the level of signals received by the transceiver 214 or the transceiver 228. The signal detector 218 may detect such signals as total energy, energy per subcarrier per symbol, power spectral density and other signals. The wireless device 202 may also include a digital signal processor (DSP) 220 for use in processing signals. In some aspects, the wireless device may also include one or more of a user interface component (not shown) and a wireless LAN (WLAN) modem (not shown). The WLAN modem may provide for communications using one or more WiFi technologies, such as any of the IEEE 802.11 protocol standards.

The various components of the wireless device 202 may be coupled together by a bus system 222, which may include a power bus, a control signal bus, and a status signal bus in addition to a data bus.

Certain aspects of the present disclosure support transmitting an uplink (UL) signal or a downlink (DL) signal between one or more STAs, WUR STAs, APs, and WUR APs. In some implementations, the signals may be transmitted in a multi-user MIMO (MU-MIMO) system. Alternatively, the signals may be transmitted in a multi-user FDMA (MU-FDMA) or similar FDMA system. In some aspects, these signals may be transmitted using one or more of the transmitter 210 and the WUR transmitter 224.

In some implementations, the WUR transmitter 224, the WUR receiver 226, or the WUR transceiver 228 may be configured to communicate with limited or minimal power consumption. Accordingly, the WUR transmitter 224, the WUR receiver 226, or the WUR transceiver 228 may be limited to operation at specific frequencies or bandwidths. For example, the WUR transmitter 224, the WUR receiver 226, or the WUR transceiver 228 may be configured to operation at one of 900 MHz, 2.4 GHz, or 5.0 GHz, 6 GHz, 18 Ghz or 60 GHz frequency bands at speeds of 62.5 Kbps or 250 Kbps, although not limited to these frequencies or speeds. In some implementations, the WUR devices may be limited to operation in heavy utilized the industrial, scientific, and medical (ISM) radio bands. Based on such speeds and limitations transmitting even a limited number of bytes would require significant amount of time, as an example transmitting seven (7) bytes of information may utilize ~1 ms transmission time assuming a speed of 62.5 kbps.

Furthermore, the WUR devices (e.g., WUR APs and WUR STAs) may be configured such that the corresponding radio systems operate in one of four states at any given time. For example, in a first state, both the WUR transceiver 228 and the transceiver 214 are off. In a second state, the WUR transceiver 228 is on while the transceiver 214 is off. In a third state, the WUR transceiver 228 is off while the transceiver 214 is on. In a fourth state both are on. And the number of states may increase proportionally with the number of main radios which may be greater than one. The WUR transmitter 224, the WUR receiver 226, or the WUR transceiver 228 and the transceiver 210, the receiver 212, and the transceiver 214 may share the same one or more antennas 216 and may operate in the same band or may operate in separate bands. Accordingly, the corresponding WUR components and "main radio" components may be configured to operate only one at a time so that only WUR communications or main radio communications are being transmitted/received at any given moment. In some implementations, when the device 202 includes multiple antennas 216 coupled to the WUR transmitter 224, the WUR receiver 226, or the WUR transceiver 228 and the transmitter 210, the receiver 212, and the transceiver 214, the processor 204 may be configured to dedicate one or more antennas 216 to the WUR transmitter 224, the WUR receiver 226, or the WUR transceiver 228 and one or more of the remaining 216 antennas to the transmitter 210, the receiver 212, and the transceiver 214 to allow simultaneous WUR and main channel communications. The STA may also turn off the WUR radio and allocate all antennas to the main radio.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 or the DSP 220. Further, each of the components illustrated in FIG. 2 may be implemented using a plurality of separate elements. Additionally, additional components not illustrated in FIG. 2 may be included in any of the devices 202.

The wireless device 202 may comprise an AP 104, a STA 106, an AP 204, or a STA 206, and may be used to transmit or receive communications. That is, either AP 104, STA 106, AP 204, or STA 206 may serve as transmitter or receiver devices. Certain aspects contemplate signal detector 318 being used by software running on memory 306 and processor 304 to detect the presence of a transmitter or receiver.

Figure 3:
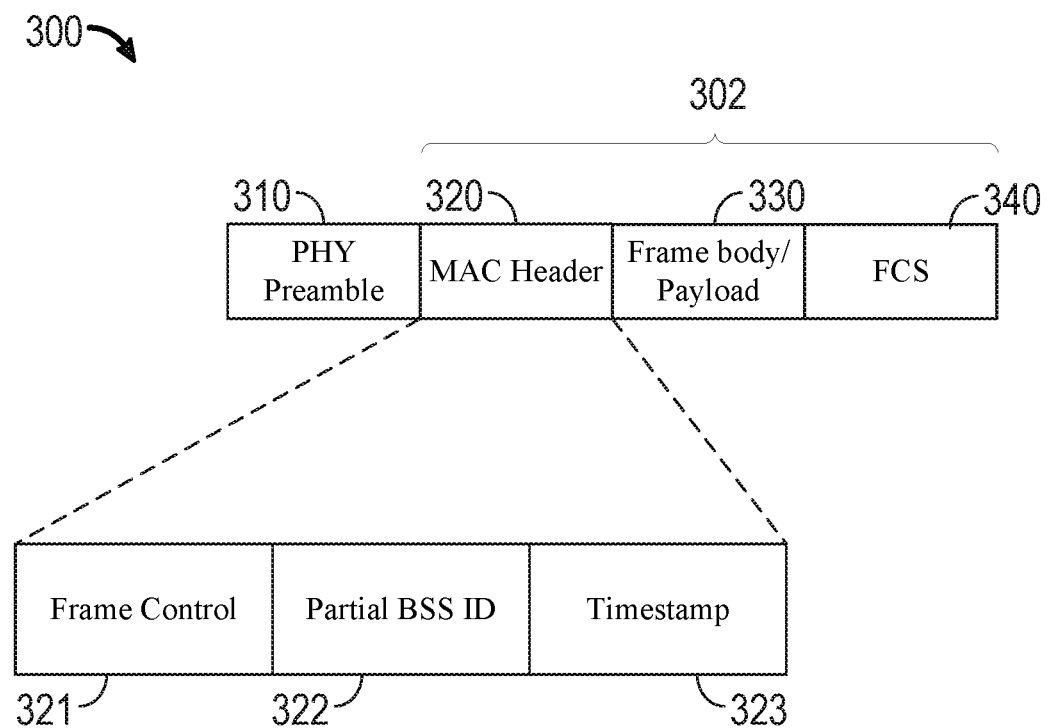
FIG. 3 illustrates an exemplary structure of a physical layer data unit (PPDU) for communicating with a WUR device, in accordance with some implementations.

FIG. 3 illustrates an exemplary structure of a physical layer data unit (PPDU) 300 for communicating with a WUR device 202 (FIG. 2), in accordance with some implementations. The four portions of the PPDU 300 illustrated are a PHY Preamble 310 portion, media access control (MAC) header 320 portion, a payload or frame body portion 330 (payload or frame body portion 330 may be used interchangeably), and a frame check sequence (FCS) 340 portion. The PHY preamble 310 is a portion of the PPDU 300 preamble that contains information for decoding the one or more physical layer service data unit (PSDU) or MAC protocol data unit (MPDU) 302 contained in the PPDU 300. More than one PSDUs or MPDUs may be contained in a PPDU that is sent in MU mode (e.g., using OFDMA multiplexing techniques). The MPDU 302 of the PPDU 300 may include one or more of a MAC header 320, payload or frame body portion 330, and FCS 340. The MAC header 320 may include one or more common fields that are present in all WUR frames or PPDUs 300. The payload or frame body portion 330 may include one or more frame type specific fields that may be present in select PPDUs 300 (e.g., based on the type of PPDU 300). In some implementations, the payload or frame body portion 330 may be optional in the PPDU 300, for example, based on a type of the WUR frame or based on an indication contained in the WUR frame. The FCS 340 may include cyclic redundancy check (CRC) or message integrity check depending on the type of PPDU 300 received (e.g., the CRC may be present if the frame is not secure, and a message integrity check (MIC) may be present if the frame is secured). The FCS 340 may be 8 bits, or 16 bits in length and it may contain one or more bits of a CRC-8, CRC-16, or CRC-32. In certain implementations, the MAC header 320 and the FCS 340 constitute a minimal WUR frame format and are present in all WUR frames, including reserved types.

As depicted in FIG. 3, the MAC header 320 may include one or more of the three separate fields: a frame control field 321, a partial basic service set identifier (BSS ID) field 322, and a timestamp field 322. Each of the frame control field 321, the partial BSS ID field 322, and the timestamp field 322 may have a length of one (1) Byte or octet. In some implementations some part of the contents of the Frame Control field may be carried in the PHY preamble of the WUR PPDU.

The 1 byte frame control field 321 may provide information that identifies details of the MPDU 302 type or length. In some implementations, the frame control field 321 may include a type subfield (not shown) and a length/subtype field (not shown). The type subfield may be configured to identify a frame type for the PPDU 300. In some implementations, the type subfield may indicate that the PPDU 300 is a WUR Beacon frame, a WUR control frame, a WUR sync frame, etc.). In some implementations the frame control may indicate whether the frame is a secure/protected frame or an unsecure/unprotected frame (MIC present or CRC present). For example, a first value in the type subfield may indicate the WUR Beacon frame while a second value in the type subfield may indicate the WUR control frame. In some implementations, the frame type indicated by the type subfield may help differentiate between constant length and variable length PPDUs 300. The length/subtype field may provide information indicating one or both of different frame subtypes or different payload or frame body sizes for the payload or frame body portion 330 of the PPDU 300. In some implementations, as will be described in more detail below, the payload or frame body portion 330 may be integrated with the MAC header portion 320, and the length of the payload or frame body portion 330 may not be indicated in the length/subtype subfield of the frame control field 321, but rather the length of the MAC header, or of the MPDU, or of the variable portion of the MPDU may be indicated by the length specified in the Frame Control field. When the length/subtype field is included, the length may provide lengths for variable length frames. Alternatively, or additionally, the subtype field may provide additional details of subtypes for constant length frames. In some implementations, the frame control field 321 may be moved to the PHY preamble 310 and may be part of a SIG field of the PHY preamble or encoded in the PHY preamble itself.

In some implementations, the constant length frame may not include the payload or frame body portion 330. A WUR frame that includes the payload or frame body portion 330 may be referred to as a variable-length (VL) WUR frame. In some implementations, a constant length WUR frame can be sent to any WUR STA while a variable length WUR frame can be sent only to a WUR STA that has declared support of reception of variable length WUR frames.

The partial BSS ID field 322 (may optionally be present and may be 1 byte) may provide identification of an identity (e.g., and ID) of a transmitting BSS. The transmitting BSS may correspond to the BSS from which the WUR communication is transmitted. For example, the partial BSS ID field 322 may include a partial address or identifier for the AP 104 or STA 106 that transmitted the PPDU 300. In some implementations, the receive WUR STA may use the partial BSS ID field (and the information contained therein) to determine whether or not the WUR STA is a potential intended recipient for the PPDU 300. For example, during association with the AP 104 or the wireless communication system 100, the WUR STA may be assigned or provided with a BSS ID for the BSS to which the WUR STA belongs (e.g., the BSS in the BSA 102). Accordingly, the WUR STA may store the BSS ID for its BSS in its memory (e.g., the memory 206 of FIG. 2). When the WUR STA compares the partial BSS ID 322 to the stored BSS ID, if the values match, then the WUR STA may determine that the received PPDU 300 does apply to the WUR STA and perform additional checks as described below. However, if the partial BSS ID 322 does not match the WUR STA stored BSS ID, then the WUR STA may determine that the received PPDU 300 does not apply to the WUR STA and may ignore the remainder of the PPDU 300. Accordingly, the partial BSS ID field 322 may be used to reduce unnecessarily computations, processing, and reception of the PPDU 300 by WUR STAB that do not need to pay attention to the PPDU 300. In some implementations the partial BSS ID may be a value that is known by both the AP and STA which may change in time according to a function (e.g., a random generator with a seed known at both devices) that is known at both the AP and STA.

In some implementations, the partial BSS ID 322 field may only include one octet of the BSS ID of the transmitting device. In some implementations, the single octet of the BSS ID (e.g., the partial BSS ID) is sufficient to provide adequate intra-PPDU power savings and discarding of PPDUs sent by other BSSs (APs) as compared to the added costs (e.g., time, bandwidth, etc.) of transmitting and processing the full BSS ID. Accordingly, the partial BSS ID field 322 may provide for reduced accuracy of identifying whether the WUR STA belongs to the same or different BSS as the transmitting AP 104 or STA 106 while providing for reduced communication costs (e.g., time, bandwidth, etc.). Additionally, in some implementations, the partial BSS ID field 322 may be used in some implementations of minimization of false alarms in the FCS, as discussed in further detail below.

The timestamp field 323 (may be 1 byte or 2 bytes in length, if present) may contain a partial timing synchronization function (TSF). The partial TSF may allow the WUR STA to synchronize its clock to match the clock of the transmitting AP 104. The partial TSF may also allow the WUR STA to prevent or avoid replay attacks, as will be described in further detail below.

Figure 4:
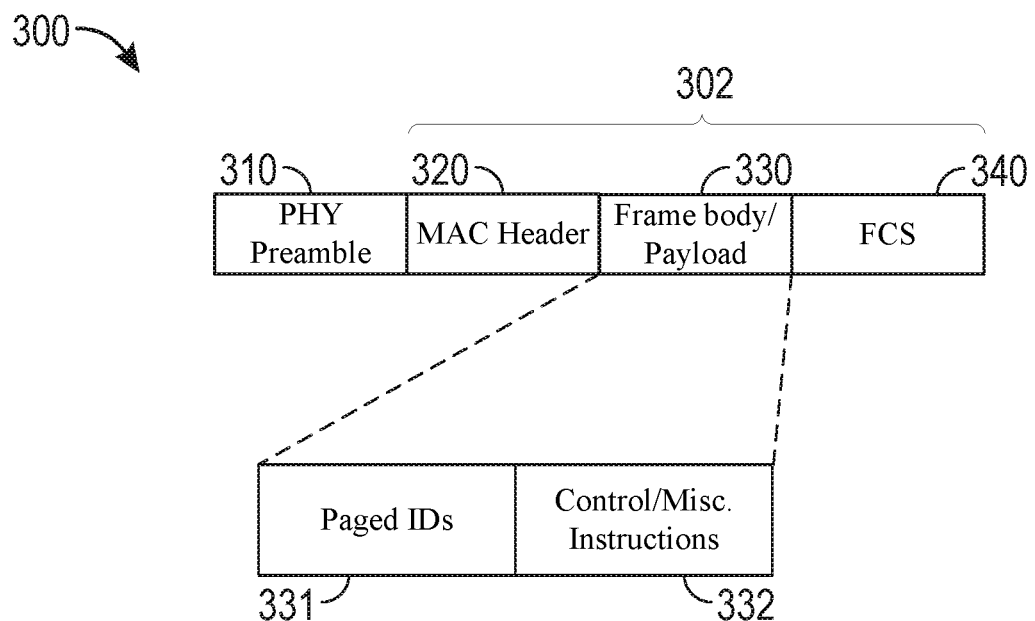
FIG. 4 illustrates further details of the exemplary structure of the PPDU of FIG. 3 for communicating with the WUR device, in accordance with some implementations.

FIG. 4 illustrates further details of the exemplary structure of the PPDU 300 of FIG. 3 for communicating with the WUR device 202 (FIG. 2), in accordance with some implementations. As depicted in FIG. 4, the payload or frame body portion 330 may include two separate fields: a paged identifiers (paged IDs, or wake-up identifiers, WIDs) field 331 and control/misc. instructions field 332. In some implementations, the control/misc. information may be interchangeable referred to as miscellaneous information or control information herein. The paged IDs field 331 may have a variable byte or octet length and the control/misc. instructions field 332 may have a length of 1 byte or octet. In another implementation the paged ID(s) field 331 or the control/misc. instructions field 332 may be part of the MAC header 320.

The paged IDs field 331 (may have one or more paged IDs, each of which may be 1 byte in length) may provide a list of intended receiving WUR STAs of the payload or frame body of the PPDU 300. In some implementations, the paged IDs field 331 may include identifiers, each of which may identify one STA or be assigned to a group of WUR STAs, or identify all WUR STAs associated to the device sending the PPDU 300. The paged IDs field 331 may be used in conjunction with the partial BSS ID field 322 of FIG. 3. For example, when a WUR STA determines that the partial BSS ID field 322 matches the BSS ID of the WUR STA, then the WUR STA may proceed to confirm that the ID of the WUR STA is included in the paged IDs field 331. If the ID of the WUR STA is not included in the paged IDs field 331, then the WUR STA can stop receiving the PPDU 300 and can ignore any received information. On the other hand, if the ID of the WUR STA is included in the paged IDs field 331, then the WUR STA proceeds to receive the remainder of the PPDU 300 and follows any instructions included in the PPDU 300. In some implementations each paged ID in the paged IDs field 331 may be mixed with a known portion of an identifier of the BSS (e.g., XORing with certain 8 bits of the BSS ID) so that the paged ID values are not concentrated in a certain portion of the range (e.g., if all APs 104 start allocating IDs in increasing order, then the likelihood that multiple APs assign low values (e.g., 1, 2, etc.) is high. If APs 104 apply this rule, then paged ID values can be uniformly spread across the 1-255 range). In certain implementations the APs 104 may use a random generator for selecting the paged IDs that they assign to their STAs and the selected paged IDs may be known by all APs that are within its range so that paged IDs assigned by APs 104 in the same area do not coincide.

In some implementations, the paged IDs field 331 may have a length of one byte. With a length of one byte, the paged IDs field 331 may indicate or identify a single WUR STA to or with which the PPDU 300 applies or is associated. The paged IDs field 331 may have a size of up to 16 bytes, allowing the PPDU 300 to apply or be associated with up to 16 different WUR STAs. In some implementations, the length subfield of the frame control field 321 may indicate a number of WUR STAs identified by the paged IDs field 331 and, accordingly, may indicate a number of bytes of the paged IDs field 331. In some implementations, when the length subfield is zero (0), the PPDU 300 may be intended to be a broadcast or multicast PPDU that applies to all WUR STAs or to all WUR STAs sharing the BSS ID of the partial BSS ID field 322. In such an implementation, the paged IDs field 331 may have a length of zero and may not include any WUR STA identifiers. In some implementations, when the length subfield is 0 for the broadcast PPDU, the pages IDs field 331 may have a length of one (1) byte without including any WUR STA identifiers (e.g., may have a value of zero indicating that the frame is broadcast).

The paged IDs subfield 331 of 1 byte length may be used to identify up to 256 unique STA identifiers (or if value 0 is used for broadcast than up to 255 unique STA identifiers) (if the Paged ID is 11 bits then may be identify up to 1024 and so on). However, if the AP 104 serves more than 256 STAs, then the AP 104 may be configured to utilize orthogonal scheduling to orthogonally schedule STAs that share the same paged IDs. If the paged IDs are obtained from the association identifier (AID), e.g., 8 LSBs of the AID provide the Paged ID, then the AP may make such scheduling using one or more of the remaining MSBs of the AID. For example, STAs having an association identifier of "1" and "257" may share the LSB of 0000 0001. Accordingly, if the paged IDs field 331 identifies the STA having the identifier 0000 0001, then both the STA "1" and the STA "257" will determine, based on the partial BSS ID field 321 and the paged IDs field 331, that the PPDU 300 is intended for the STA. Accordingly, the STA "1" and the STA "257" may be considered "clones." During association of the STA "1" and the STA "257," the AP 104 may schedule clones to have orthogonal wake times or allocated in orthogonal groups. For example, the STA "1," during association, may be provided to have a scheduled wake times and wake time durations (SPs) such that they do not coincide with the scheduled wake times and wake time durations of STA 257 (e.g., STA 1 may be scheduled the first 10 ms of a 20 ms wake time duration and STA 257 may be scheduled the second 20 ms of a wake time duration. Accordingly, the clone STAs (e.g., the WUR STAs having the same LSB identifiers or paged ID) will not wake up simultaneously and unintended WUR STAs will not be awakened just because they share an LSB identifier of paged ID with an intended WUR STA.

Alternatively, or additionally, a most significant bit (MSB) of the identifier for the paged IDs may be masked in one or more other fields of the PPDU 300 or the MPDU 302. For example, the paged IDs in the paged IDs field 331 may be associated with between one and four groups of MSBs. For example, for the STA "1" and the STA "257," the STAs will be associated with two groups of MSBs. The STA "1" will be associated with an MSB of "0" while the STA "257" will be associated with an MSB of "1." Accordingly, the MSB identifiers may be communicated to the WUR STA to allow the WUR STA to determine if the PPDU is intended for it or for another WUR STA having the same LSB identifier in the paged ID field 331.

In some implementations, the AP 104 may desire to send instructions or page more than 16 WUR STAs. In such an implementation, the AP 104 may send a multicast or broadcast PPDU 300 (e.g., having the length of 0, as described herein). Alternatively, or additionally, the AP 104 may transmit back-to-back (e.g., consecutive) WUR PPDUs 300. When multiple PPDUs 300 are transmitted back-to-back, the AP 104 may include STA identifiers in the paged IDs field 331 in only increasing or ascending (or any other) order, which may allow STAs to know when they will not be paged in later PPDUs 300. For example, when a first PPDU 300 of two or more back-to-back PPDUs 300 includes paged IDs for WUR STA 1, 3, and 8, the WUR STA 5 may know that later PPDUs 300 of the two or more back-to-back PPDUs 300 will not page the STA 5 because the lowest WUR STA that can be paged by subsequent PPDUs 300 is 9 (e.g., the STA identifiers only ascend between PPDUs). Such an ascending order may allow WUR STAs to optimize their sleep patterns by determining when they will not be paged without having to wait for all back-to-back PPDUs 300 from being received and reviewed. In some implementations, one or more bits may be included in the MPDU 302 to indicate that a train of one or more other PPDUs 300 is following the current PPDU 300.

The control/misc. instructions field 332 may include one or more instructions for the one or more paged IDs identified in the paged IDs field 331. In some implementations, the control/misc. instructions field 332 may provide special instructions for the WUR STA(s) to perform once they are awakened. In some implementations, the control/misc. instructions field 332 may include special commands if the PPDU 300 is used for controlling external states. In some implementations, the special commands may instruct which main radio to turn on (e.g., by identifying a radio number, technology, or band). In some implementations, the special commands may indicate which bandwidth to use or may specify one or more receive or transmit parameters.

In some implementations, the one or more control/misc. instructions field 332 may be common to all of the identified WUR STAs in the paged IDs field 331. In some implementations, one or more of the identified WUR STAs in the paged IDs field 331 may have unique instructions from others of the identified WUR STAs in the paged IDs field 331. The association of WUR STAs to particular control instructions may be identified in the frame control field 321, e.g., the length subfield. For example, the length subfield may indicate that each identified WUR STA has a respective control instruction field. In this implementation, the length subfield may provide the length of both page IDs and control IDs (e.g., the unit of the length subfield may be 2 bytes because one paged ID may be one byte and one control ID one byte) and the length will have a range between 2 and 14 bytes. Other lengths for the length subfield in the frame control field 321 may be used (e.g., 3 or 4 or more).

In some implementations, the two byte paged ID and control field may include a combination of AID identifier bits and control/misc. instructions bits. For example, the two byte paged ID and control field may include 12 AID identifier bits and 4 control/misc. instructions bits. In some implementations, the combination may be 8 AID identifier bits and 8 control/misc. instructions bits. In some implementations, the various combinations of the AID identifier bits and the control/misc. instructions bits are negotiated in advance between the AP 104 and the WUR STA. In some implementations, the combination of AID identifier bits and the control/misc. instructions bits may be vendor specific (e.g., different vendors may have different numbers of AIDs identifier bits and different numbers of control/misc. instructions bits, etc.).

In some implementations, the commands or instructions associated with the control/misc. instructions bits may be negotiated in advance between the AP 104 and the WUR STA. For example, these bits and the corresponding instructions may be negotiated during association of the WUR STA with the AP 104. For example, the control/misc. instructions bits may be stored in a table-type format with each bit corresponding to a particular action, command, or instruction.

Figure 5:
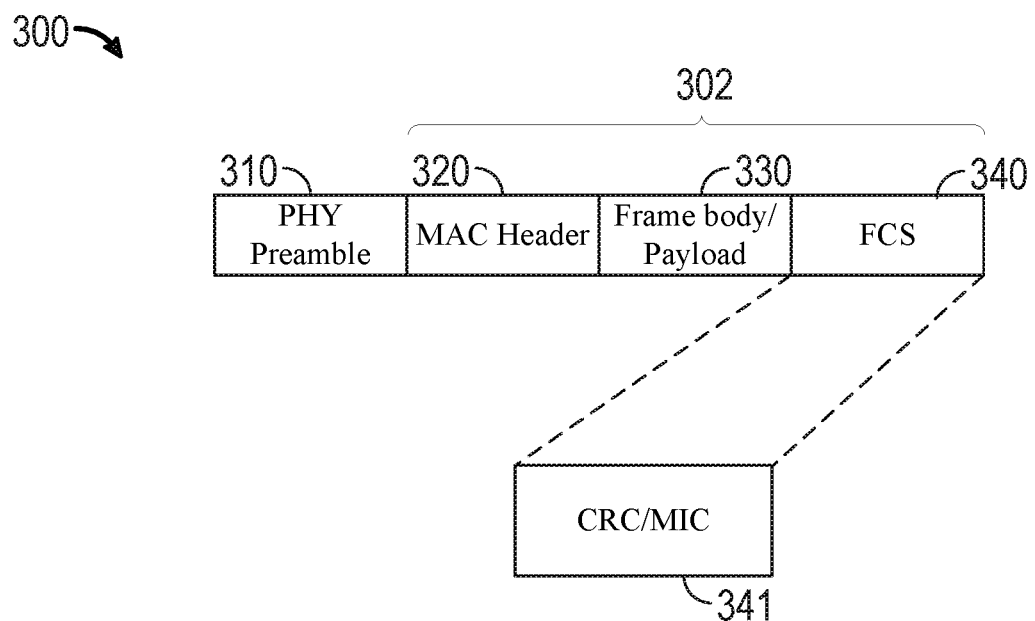
FIG. 5 illustrates further details of the exemplary structure of the PPDU of FIG. 3 for communicating with the WUR device, in accordance with some implementations.

FIG. 5 illustrates further details of the exemplary structure of the PPDU 300 of FIG. 3 for communicating with the WUR device 202 of FIG. 2, in accordance with some implementations. As depicted in FIG. 5, the FCS 340 may be a two byte portion that includes a cyclic redundancy check (CRC) or a mic. The CRC may be used to detect errors in unsecured PPDUs 300. The MIC may be used to detect errors or replay attacks in secure PPDUs 300.

In some implementations, the AP 104 may logically combine the FCS 340 with portions of the BSS ID of the AP 104 or known sequences prior to transmission of the PPDU 300. For example, the AP 104 may XOR the FCS with the two LSBs of the 3 MSBs of the BSS ID of the AP 104. Because the BSS ID of the AP 104 is known to the associated STAs from the initial association process, when the FCS is decoded by the receiving WUR STAs, successful decoding may mean that the WUR STA is receiving the PPDU 300 that was generated by the AP 104 of the WUR STA. For WUR STAs that belong to a different BSS ID than the transmitting AP 104, the PPDU 300 may be decrypted as being corrupted. In some implementations, the AP 104 may compute the CRC and the MIC assuming that the BSS ID is present in the PPDU 300 (e.g., immediately after the FCS or prior to the FCS and omit it from transmission, i.e., compute but do not transmit). The receiver, when it receives the PPDU 300, may check the FCS or MIC under the assumption that the BSS ID was present (e.g., MAC address of the AP transmitting the PPDU 300).

In some implementations, the CRC/MIC fields of the FCS 340 may be used to ensure that WUR STAs are not woken up by PPDUs from an attacker or non-friendly AP 104. For example, a security protocol with low overhead may be used to avoid CCMP-like signaling, where the MIC has 8 or 16 bytes and the CCMP header has 8 bytes). Accordingly, the PPDUs 300 or MPDUs 302 may be unsecure when the FCS 340 contains the CRC and secure when the FCS 340 contains the MIC. In some implementations, the frame control field 321 may be used to signal whether CRC or MIC is used for a particular PPDU 300 or MPDU 302.

In some implementations, the MIC computation may be based on the entire MPDU 302. For example, the MPDU 302 may be intended for a single WUR STA or a plurality of WUR STAs. In some implementations, the MIC is generated by the AP 104 based on a group key known by both AP and the one or more WUR STAs. The group key may be known by all STAs associated with the AP 104 that are intended receivers for the PPDU 300. In some implementations, the timestamp field 323 may provide part of a monotonically increasing counter. For example, an absolute TSF timer at the WUR STA may be updated based on the partial TSF of the timestamp field 323. The absolute TSF timer may be used as an input parameter for the MIC computation, which may be further used to protect the WUR STA from replay attacks.

In some implementations, the MPDU 302 may have a minimum length and a maximum length. The length may be signaled or determined based on a frame type of the PPDU 300 (e.g., in the frame control field 321, as described herein). For example, the MPDU 302 may have a minimum length of six (6) bytes. The MPDU 302 may include one or more of the following fields: the frame control field 321 of 1 byte, the partial BSS ID field 322 of 1 byte, the timestamp field 323 of 1 byte, the control/misc. instructions field 322, and the CRC/MIC field 341 of 2 bytes. In some implementations, as described above, the MPDU 302 may have a minimum length of seven (7) bytes when the frame control fields 321 indicates no length (e.g., no paged IDs) but where the paged IDs field 331 is included with a length of 1 byte but a zero value. In some implementations, constant length PPDUs 300 may have minimum MPDU 302 sizes of 6 or 7 bytes. The minimum sized MPDUs 302 may utilize ~1 ms of time to transmit at 62.5 Kbps.

The MPDU 302 may have a maximum length of twenty-two (22) bytes. For example, the MPDU 302 may include the minimum 6 bytes described above and then also include 16 bytes for 16 identifiers in the paged ID field 331. Thus, the maximum length for the MPDU 302 may be the 6 bytes of the non-paged IDs fields plus the maximum of 16 bytes for the paged IDs field 331. In some implementations, variable length PPDUs 300 may be signaled or determined based on the frame type and length in the frame control field 321. The maximum MPDU 302 length of 22 bytes may use ~3 ms of transmission time at 62.5 Kbps. In some implementations, the MPDU 302 may have a length anywhere between 6 bytes and 22 bytes.

Figure 6:
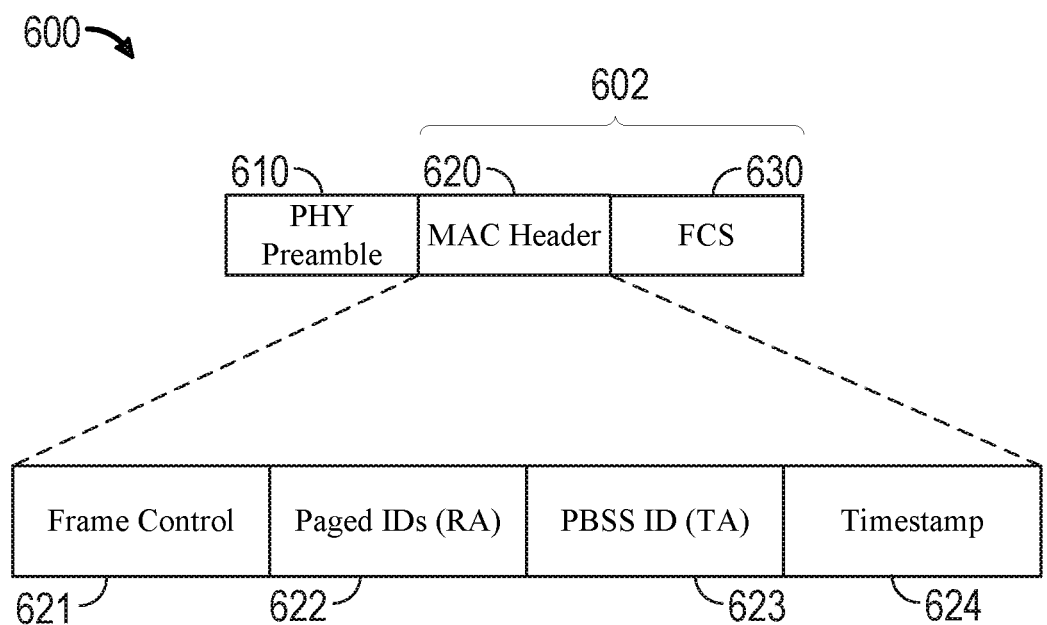
FIG. 6 illustrates another exemplary structure of a physical layer data unit (PPDU) for communicating with the WUR device, in accordance with some implementations.

FIG. 6 illustrates another exemplary structure of a physical layer data unit (PPDU) 600 for communicating with the WUR device 202 (FIG. 2), in accordance with some implementations. The three portions of the PPDU 600 illustrated are a PHY Preamble 610 portion, media access control (MAC) header 620 portion, and an FCS 630 portion. The PHY preamble 610 is a portion of the PPDU 600 preamble that contains information for decoding the one or more PSDUs or MPDUs 602 contained in the PPDU 600. More than one MPDU 602 may be contained in a PPDU 600 that is sent in MU mode (e.g., using OFDMA multiplexing techniques). The MPDU 602 contained in the PPDU 600 may include one or more of the MAC header 620 and the FCS 630. The MAC header 620, as compared to the MAC header 320, may include one or more common fields that are present in all PPDUs 600 or it may include one or more type specific fields that may not be present in every WUR PPDU 600. Accordingly, in some implementations, the contents of the MAC header 620 may depend on a type of WUR PPDU frame in which the MAC header 620 is included. The FCS 630 may include a CRC or a MIC, depending on the type of WUR PPDU frame received (e.g., the CRC may be present if the PPDU 600 is not secure, and the MIC may be present if the PPDU 600 is secured). No payload or frame body portion may exist in the PPDU 600, as the PPDU frames do not carry any payloads and the type specific fields may not be included in the MAC header 620 portion. Other aspects of communicating the PPDU 600 (e.g., speeds, frequency bands, etc.) may be similar to those described above in relation to FIG. 3 and the PPDU 300.

As depicted in FIG. 6, the MAC header 620 may include one or more of four separate fields: a frame control field 621, a paged IDs (RA) field 622, a partial BSS ID (TA) field 623, and a timestamp field 624. The frame control field 321 may have a length of one (1) byte or octet. The paged IDs (RA) field 622, partial BSS ID (TA) field 623, and timestamp field 624 may have lengths not fully established but estimated as described below. In some implementations, some part of the contents of the frame control field 621 may be carried in the PHY preamble of the PPDU 600.

The 1 byte frame control field 621 may provide information that identifies details of the MPDU 602 type or length. In some implementations, the frame control field 621 may include a one bit protocol version field (not shown), where zero (0) is currently used and one (1) is saved for future development. The frame control field 621 also includes a type subfield of a two bit length. The type a type subfield (not shown) may identify a type of PPDU 600 frame. In some implementations, the type subfield may indicate that the PPDU 600 is a WUR Beacon frame, a WUR control frame, a WUR sync frame, etc. In some implementations, the frame control field 621 may indicate whether the PPDU 600 is a secure/protected PPDU 600 or an unsecure/unprotected PPDU 600 (e.g., MIC present or CRC present). For example, a first value in the type subfield may indicate the WUR Beacon frame while a second value in the type subfield may indicate the WUR control frame. In some implementations, the frame type indicated by the type subfield may help or may implicitly differentiate between constant length and variable length PPDUs 600. For example, WUR broadcast frames may be constant length while Beacon or control frames may be variable length. The length/subtype field (not shown) may be a 3 bit field that may provide information indicating one or both of different frame subtypes or payload or frame body sizes for a payload or frame body of the PPDU 600 and MPDU 602. In some implementations, as will be described in more detail below, the payload or frame body may be integrated with the MAC header portion 620. In some implementations, the length/subtype field may have a length of four bits. In some implementations, the length of the MAC header 620, or of the MPDU 602, or of the variable portion of the MPDU may be indicated by the length specified in the frame control field 621. When the length/subtype field is included, the length may provide lengths for variable length frames. Alternatively, or additionally, the subtype field may provide additional details of subtypes for constant length frames. The frame control field 621 may further include two bits for future use (one or both of these two bits may be used for security purposes, as described in further detail below). In some implementations, the frame control field 621 may be moved to the PHY preamble 610 and may be part of a SIG field of the PHY preamble or encoded in the PHY preamble itself. The possible breakdown above of the frame control field 621 may also apply to the frame control field 321 of FIG. 3.

The partial BSS ID field 623 (may optionally be present with a length TBD) may provide identification of an identity (e.g., and ID) of a transmitting BSS. The transmitting BSS may correspond to the BSS from which the WUR communication is transmitted. For example, the partial BSS ID field 623 may include a partial address or identifier for the AP 104 or STA 106 that transmitted the PPDU 600. In some implementations, the receive WUR STA may use the partial BSS ID field (and the information contained therein) to determine whether or not the WUR STA is a potential intended recipient for the PPDU 600. For example, during association with the AP 104 or the wireless communication system 100, the WUR STA may be assigned or provided with a BSS ID for the BSS to which the WUR STA belongs (e.g., the BSS in the BSA 102). Accordingly, the WUR STA may store the BSS ID for its BSS in its memory (e.g., the memory 206 of FIG. 2). When the WUR STA compares the partial BSS ID 623 to the stored BSS ID, if the values match, then the WUR STA may determine that the received PPDU 600 does apply to the WUR STA and perform additional checks as described below. However, if the partial BSS ID 623 does not match the WUR STA stored BSS ID, then the WUR STA may determine that the received PPDU 600 does not apply to the WUR STA and may ignore the remainder of the PPDU 600. Accordingly, the partial BSS ID field 623 may be used to reduce unnecessarily computations, processing, and reception of the PPDU 600 by WUR STAB that do not need to pay attention to the PPDU 600. In some implementations the partial BSS ID 623 may be a value that is known by both the AP 104 and the WUR STA, which may change in time according to a function (e.g., a random generator with a seed known at both devices) that is known at both the AP 104 and WUR STA.

In some implementations, the partial BSS ID 623 field may only include one octet of the BSS ID of the transmitting device. In some implementations, the single octet of the BSS ID (e.g., the partial BSS ID) is sufficient to provide adequate intra-PPDU power savings and discarding of PPDUs 600 sent by other BSSs (APs) as compared to the added costs (e.g., time, bandwidth, etc.) of transmitting and processing the full BSS ID. Accordingly, the partial BSS ID field 623 may provide for reduced accuracy of identifying whether the WUR STA belongs to the same or different BSS as the transmitting AP 104 or STA 106 while providing for reduced communication costs (e.g., time, bandwidth, etc.). Additionally, in some implementations, the partial BSS ID field 623 may be used in some implementations of minimization of false alarms in the FCS, as discussed in further detail below. Additionally, or alternatively, the partial BSS ID may be masked or hidden in another field of the MPDU 602, for example the FCS 630. Additionally, or alternatively, the paged IDs may be scrambled or masked with the partial BSS ID, as will be discussed in further detail below.

The timestamp field 624 (optional with a length TBD) may contain a partial timing synchronization function (TSF). The partial TSF may allow the WUR STA to synchronize its clock to match the clock of the transmitting AP 104. The partial TSF may also allow the WUR STA to prevent or avoid replay attacks, as will be described in further detail below. The timestamp field 624 may have a length of 1 byte. Alternatively, or additionally, the timestamp field 624 may include a sequence number (e.g., the timestamp field 624 may be the timestamp/sequence number field 624). The sequence number pay provide an alternative for a counter of secure frames and provide other purposes, such as BSS parameter updates, etc. In some implementations, the timestamp field 624 may include change sequence information or control information. For example, control information may be carried in the timestamp field 624 in the timestamp information (e.g., scrambled or masked) or prior to or after the timestamp information. In some implementations, if control information is desired for each paged ID, then the paged IDs field 622 may be followed by a control field (not shown). Thus, each paged ID may have a dedicated or shared control field. The control field may have a variable length based on the control information or the number of paged IDs. In some implementations, the control field may provide for special signaling to one or more WUR STA. For example, the control information may include application layer commands. Alternatively, or additionally, the control information may include indications of which WUR STAs should turn on their main radio or which radio to turn on in dual/tri-band radios or which antennas to activate in multi-antenna STAs. In some implementations, the control field application may be dependent on the type of the PPDU 600. In some implementations, the special commands may instruct which main radio to turn on (e.g., by identifying a radio number, technology, or band). In some implementations, the special commands may indicate which bandwidth to use or may specify one or more receive or transmit parameters.

In some implementations, the control information may be common to all of the identified WUR STAs in the paged IDs field 621. In some implementations, one or more of the identified WUR STAs in the paged IDs field 621 may have unique instructions from others of the identified WUR STAs in the paged IDs field 621. The association of WUR STAs to particular control instructions may be identified in the frame control field 621, e.g., the length subfield. For example, the length subfield may indicate that each identified WUR STA has a respective control instruction field. In this implementation the length field may provide the length of both page ids and control Ids (unit of 2 bytes as an example because one paged id may be one byte and control another one) and the length will have a range between 2 to 14 bytes. This is an example but we may want to cover different lengths of the length field in the frame control field (3 or 4 or more).

In some implementations, the two byte paged ID and control field may include a combination of AID identifier bits and control/misc. instructions bits. For example, the two byte paged ID and control field may include 12 AID identifier bits and 4 control/misc. instructions bits. In some implementations, the combination may be 8 AID identifier bits and 8 control/misc. instructions bits. In some implementations, the various combinations of the AID identifier bits and the control/misc. instructions bits are negotiated in advance between the AP 104 and the WUR STA. In some implementations, the combination of AID identifier bits and the control/misc. instructions bits may be vendor specific (e.g., different vendors may have different numbers of AIDs identifier bits and different numbers of control/misc. instructions bits, etc.).

In some implementations, the commands or instructions associated with the control/misc. instructions bits may be negotiated in advance between the AP 104 and the WUR STA. For example, these bits and the corresponding instructions may be negotiated during association of the WUR STA with the AP 104. For example, the control/misc. instructions bits may be stored in a table-type format with each bit corresponding to a particular action, command, or instruction.

The paged IDs field 622 (may include one or more paged IDs each of which may be 1 byte in length) may provide a list of intended receiving WUR STAs of the payload or frame body or of the WUR PPDU 600. In some implementations, the paged IDs field 624 may include identifiers, each of which may identify one WUR STA or assigned to a group of WUR STAs, or identify all WUR STAs associated to the device sending the PPDU 600. The paged IDs field 622 may be used in conjunction with the partial BSS ID field 623 of FIG. 6. For example, when a WUR STA determines that the partial BSS ID field 622 (or BSS ID stored or retrieved from elsewhere, e.g., masked with FCS 630 or paged ID) matches the BSS ID of the WUR STA, then the WUR STA may proceed to confirm that the ID of the WUR STA is included in the paged IDs field 622. If the ID of the WUR STA is not included in the paged IDs field 331, then the WUR STA can stop receiving the PPDU 600 and can ignore any received information. On the other hand, if the ID of the WUR STA is included in the paged IDs field 622, then the WUR STA proceeds to receive the remainder of the PPDU 600 and follows any instructions included in the PPDU 600. In some implementations each paged ID in the paged IDs field 622 may be mixed, scrambled, coded, or masked with a known portion of an identifier of the BSS of the AP 104 (e.g., XORed with certain 8 bits of the BSS ID of the AP 104 and the WUR STA) so that the paged ID values are not concentrated in a certain portion of the range of available IDs. For example, if all APs 104 start allocating IDs in increasing (or any other) order, then the likelihood that multiple APs 104 assign low values (e.g., 1, 2, etc.) is high. If APs 104 apply this rule, then paged ID values can be uniformly spread across the 1-255 range. In certain implementations, the APs 104 may use a random generator for selecting the paged IDs that are assigned to associated STAs. The random generator and selected/assigned paged IDs may be known by all APs 104 that are within range so that paged IDs assigned by APs 104 in the same area do not coincide or overlap.

In some implementations, the paged IDs field 622 may have a length of one byte. With a length of one byte, the paged IDs field 622 may indicate or identify a single WUR STA to or with which the PPDU 600 applies or is associated. The paged IDs field 622 may have a size of up to 8 bytes, allowing the PPDU 600 to apply or be associated with up to 8 different WUR STAs. For example, when the length subfield in the frame control field 621 is 3 bits, then only 8 paged IDs can be included. Thus, length subfield of the frame control field 621 may indicate the number of WUR STAs identified by the paged IDs field 622 and, accordingly, may indicate a number of bytes of the length of the paged IDs field 622 (maximum of 8). In some implementations, when the length subfield is zero (0), the PPDU 600 may be intended to be a broadcast or multicast PPDU that applies to all WUR STAs or to all WUR STAs sharing the BSS ID of the partial BSS ID field 622. In such an implementation, the paged IDs field 622 may have a length of zero and may not include any WUR STA identifiers. In some implementations, when the length subfield is 0 for the broadcast PPDU, the pages IDs field 622 may have a length of one (1) byte without including any WUR STA identifiers (e.g., may have a value of zero, indicating that the PPDU is a broadcast PPDU). In some implementations, the paged IDs field 622 is included in multicast or broadcast PPDUs 600. Only a single paged ID may be present in the paged IDs field 622 (length of 1 byte) for a unicast PPDU 600.

The paged IDs subfield 622 of 1 byte length may be used to identify one of up to 256 unique STA identifiers (or if value 0 is used for broadcast than up to 255 unique STA identifiers). The number of STAs that can be identified depends on the size of the paged ID. For example, if the paged ID is 11 bits in length, then the paged ID may be identify up to 1024 STA (assuming value of 0 is used for broadcast), and so on. However, if the AP 104 serves more than 256 STAs, then the AP 104 may be configured to orthogonally schedule STAs that share the same paged IDs. If the paged IDs are obtained from an association identifier (AID), e.g., 8 LSBs of the AID provided the paged ID, then the AP 104 may make such scheduling using one or more of the remaining MSBs of the AID. For example, STAs having an association identifier of "1" and "257" may share the LSB of 0000 0001. Accordingly, if the paged IDs field 622 identifies the STA having the identifier 0000 0001, then both the STA "1" and the STA "257" will determine, based on the partial BSS ID field 623 and the paged IDs field 622, that the PPDU 600 is intended for the STA. Accordingly, the STA "1" and the STA "257" may be considered "clones." During association of the STA "1" and the STA "257," the AP 104 may schedule clones to have orthogonal wake times or allocated in orthogonal groups. For example, the STA "1," during association, may be provided to have a scheduled wake times and wake time durations (SPs) such that they do not coincide with the scheduled wake times and wake time durations of STA 257 (e.g., STA 1 may be scheduled the first 10 ms of a 20 ms wake time duration and STA 257 may be scheduled the second 10 ms of the 20 ms wake time duration). Accordingly, the clone STAs (e.g., the WUR STAs having the same LSB identifiers or paged ID) will not wake up simultaneously and unintended WUR STAs will not be awakened just because they share an LSB identifier or paged ID with an intended WUR STA.

Alternatively, or additionally, a most significant bit (MSB) of the identifier for the paged IDs may be masked in one or more other fields of the PPDU 600 or the MPDU 602. For example, the paged IDs in the paged IDs field 622 may be associated with between one and four groups of MSBs. For example, for the STA "1" and the STA "257," the STAs will be associated with two groups of MSBs. The STA "1" will be associated with an MSB of "0" while the STA "257" will be associated with an MSB of "1." Accordingly, the MSB identifiers may be communicated to the WUR STA to allow the WUR STA to determine if the PPDU 600 is intended for it or for another WUR STA having the same LSB identifier in the paged ID field 622.

In some implementations, the AP 104 may desire to send instructions or page more than 8 WUR STAs. In such an implementation, the AP 104 may send a multicast or broadcast PPDU 600 (e.g., having the length of 0, as described herein). Alternatively, or additionally, the AP 104 may transmit back-to-back (e.g., consecutive) PPDUs 600. When multiple PPDUs 600 are transmitted back-to-back, the AP 104 may include STA identifiers in the paged IDs field 622 in only ascending order, which may allow STAs to know when they will not be paged in later PPDUs 600. For example, when a first PPDU 600 of two or more back-to-back PPDUs 300 includes paged IDs for WUR STA 1, 3, and 8, the WUR STA 5 may know that later PPDUs 600 of the two or more back-to-back PPDUs 600 will not page the STA 5 because the lowest WUR STA that can be paged by subsequent PPDUs 600 is 9 (e.g., the STA identifiers only ascend between PPDUs). Such an ascending order may allow WUR STAs to optimize their sleep patterns by determining when they will not be paged without having to wait for all back-to-back PPDUs 600 from being received and reviewed. In some implementations, one or more bits may be included in the MPDU 602 to indicate that a train of one or more other PPDUs 600 is following the current PPDU 600.

In some implementations, the no paged ID field 622 is included in broadcast PPDUs 600 as noted above. In such an implementation, each receive WUR STA will decode the PPDU 600, independent of the BSS of the WUR STA. Thus, in some implementations, the partial BSSID field 623 and the paged IDs field 622 may be eliminated from the MAC header 620 (further reducing the minimum MPDU 602 size to 3 bytes). In some implementations, one paged ID may be included in the paged ID field 622 for broadcast frames. Accordingly, the AP 104 may allocate a single WUR STA ID for inclusion in the paged IDs field 622. In some implementations, this WUR STA may drop other BSS IDs. Additionally, or alternatively, the AP 104 may scramble or mask a portion of the BSS identifier of the AP 104 with the paged IDs included in the paged ID field 622. For example, the AP 104 may mask its (or a portion thereof, e.g., BSSID[40:47]) of its BSS ID with the target paged IDs as stored in the paged IDs field 622. The receive WUR STAs can descramble the paged IDs in the paged IDs field 622 and determine if any of the obtained paged IDs match the WUR STA's identifier or if it is a broadcast value (e.g., paged ID value of 0). If the WUR STA determines that one of the descrambled paged IDs matches the WUR STA identifier, or that the broadcast value was included, then the WUR STA receives the remainder of the packet and performs any necessary actions. If the WUR STA determines that the descrambled paged ID does not match the WUR STA identifier and that the broadcast value is not included, then the WUR STA may discard the PPDU 600.

Figure 7:
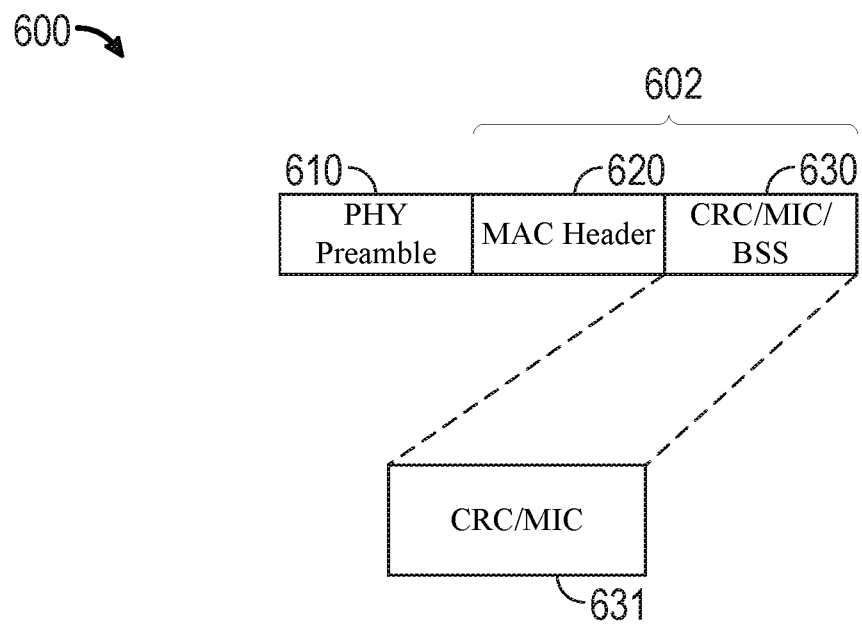
FIG. 7 illustrates further details of the exemplary structure of the PPDU of FIG. 6 for communicating with the WUR device, in accordance with some implementations.

FIG. 7 illustrates further details of the exemplary structure of the PPDU 600 of FIG. 6 for communicating with the WUR device 202 (FIG. 2), in accordance with some implementations. As depicted in FIG. 7, the FCS 630 (length TBD) may include CRC or a MIC. The CRC may be used to detect errors in unsecured PPDUs 600. The MIC may be used to detect errors and replay attacks in secure PPDUs 600. In some implementations, there may not be any need for an explicit CRC for the PPDU 600.

In some implementations, the AP 104 may hide, scramble, or mask its partial BSS ID in the FCS 630. For example, the AP 104 may XOR its partial BSS ID (e.g., BSSID[23:38]) with the FCS 630. Accordingly, the WUR STA will only successfully decode received PPDUs 600 generated by its AP 104 because only those WUR STAs will have the proper BSS ID values to successfully decode the FCS 630. PPDUs generated by other APs 104 will decode as being corrupted because the improper BSS ID decoder value will result in an incorrect FCS 630. By using such a scrambling or coding method, the partial BSSID may not need to be included as a separate field, saving communication time, power, and bandwidth. In some implementations, the FCS field 630 may have a length of 2 bytes, which may provide for better security and protection, fewer false alarms, and greater prevention of replay attacks. In some implementations, the AP 104 may compute the CRC and the MIC assuming that the BSS ID of the AP 104 is present in the PPDU 600 (e.g., immediately after the FCS or prior to the FCS) and omit the BSS ID from transmission (i.e., compute but do not transmit). The WUR STA, when it receives the PPDU 600, may check the FCS or MIC under the assumption that the BSS ID was present (e.g., MAC address of the AP 104 transmitting the PPDU 600).

In some implementations, the CRC/MIC/BSS fields of the FCS 630 may be used to ensure that WUR STAs are not woken up by PPDUs from an attacker or non-friendly AP 104. For example, a security protocol with low overhead may be used to avoid CCMP-like signaling, where the MIC has 8 or 16 bytes and the CCMP header has 8 bytes). Accordingly, the PPDUs 300 or MPDUs 302 may be unsecure when the FCS 340 contains the CRC and secure when the FCS 340 contains the MIC. In some implementations, the frame control field 321 may be used to signal whether CRC or MIC is used for a particular PPDU 300 or MPDU 302. In some implementations, the MIC is a truncated output of a selected cipher suite (e.g., baseline) and the timestamp field 624 TSF timer may act as a packet number. Accordingly, the PPDUs 600 may be unsecure PPDUs when the FCS 630 contains the CRC with a scrambled/coded/masked/camouflaged/etc. BSS ID of the AP 104 and may be secure PPDUs when the FCS 630 contains the MIC with scrambled/coded/masked/camouflaged/etc. BSS ID of the AP 104. In some implementations, the frame control field 621 may signal differences between the secure and unsecure PPDUs 600.

In some implementations, the MIC computation may be based on the entire MPDU 602. For example, the MPDU 602 may be intended for a single WUR STA or a plurality of WUR STAs. In some implementations, the MIC is generated by the AP 104 based on a group key known by both the AP 104 and the one or more WUR STAs. For example, the group key may be a PCR group key, etc., IGTK. The group key may be known by all STAs associated with the AP 104 that are intended receivers for the PPDU 600. In some implementations, the timestamp field 624 may provide part of a monotonically increasing counter. For example, the timestamp field 624 may contain the MSB of the 2 LSBs of the TSF timer, which may provide 256 us steps in time and a wraparound of the timestamp every 65536 ms. In some implementations, a full TSF timer at the WUR STA is updated using the partial TSF included in the timestamp field 624. In some implementations, the absolute TSF timer may be used as an input parameter for the MIC computation, which may be further used to protect the WUR STA from replay attacks.

In some implementations, the MPDU 602 may have a minimum length and a maximum length. The length may be signaled or determined based on a frame type of the PPDU 600 (e.g., in the frame control field 621, as described herein). For example, the MPDU 602 may have a minimum length of five (5) bytes. The MPDU may include one or more of the frame control field 621 of 1 byte, the paged IDs (RA) field 622, the partial BSS ID (TA) field 623, the timestamp field 624, and the CRC/MIC/BSS field 631, assuming that the paged IDs (RA) field 622 has a length of zero bytes (e.g., for a broadcast or multicast PPDU 600) and each of the remaining TBD fields have a minimum length of 1 byte. In some implementations, as described above, the MPDU 602 may have a minimum length of six (6) bytes when the frame control fields 621 indicates no length (e.g., no paged IDs) but where the paged IDs field 622 is included with a length of 1 byte but a zero value. In some implementations, constant length PPDUs 600 may have minimum MPDU 602 sizes of 5 or 6 bytes. The minimum sized MPDUs 602 may utilize ~0.77 ms of time to transmit at 62.5 Kbps.

The MPDU 602 may have a maximum length of twelve (12) bytes. For example, the MPDU 602 may include the minimum 5 bytes described above and then also include 7 bytes for 16 identifiers in the paged ID field 622. Thus, the maximum length for the MPDU 602 may be the 5 bytes of the non-paged IDs fields plus the maximum of 8 bytes for the paged IDs field 622. In some implementations, variable length PPDUs 600 may be signaled or determined based on the frame type and length in the frame control field 621. The maximum MPDU 602 length of 12 bytes may use ~1.66 ms of transmission time at 62.5 Kbps. In some implementations, the MPDU 602 may have a length anywhere between 5 bytes and 12 bytes.

Figure 8:
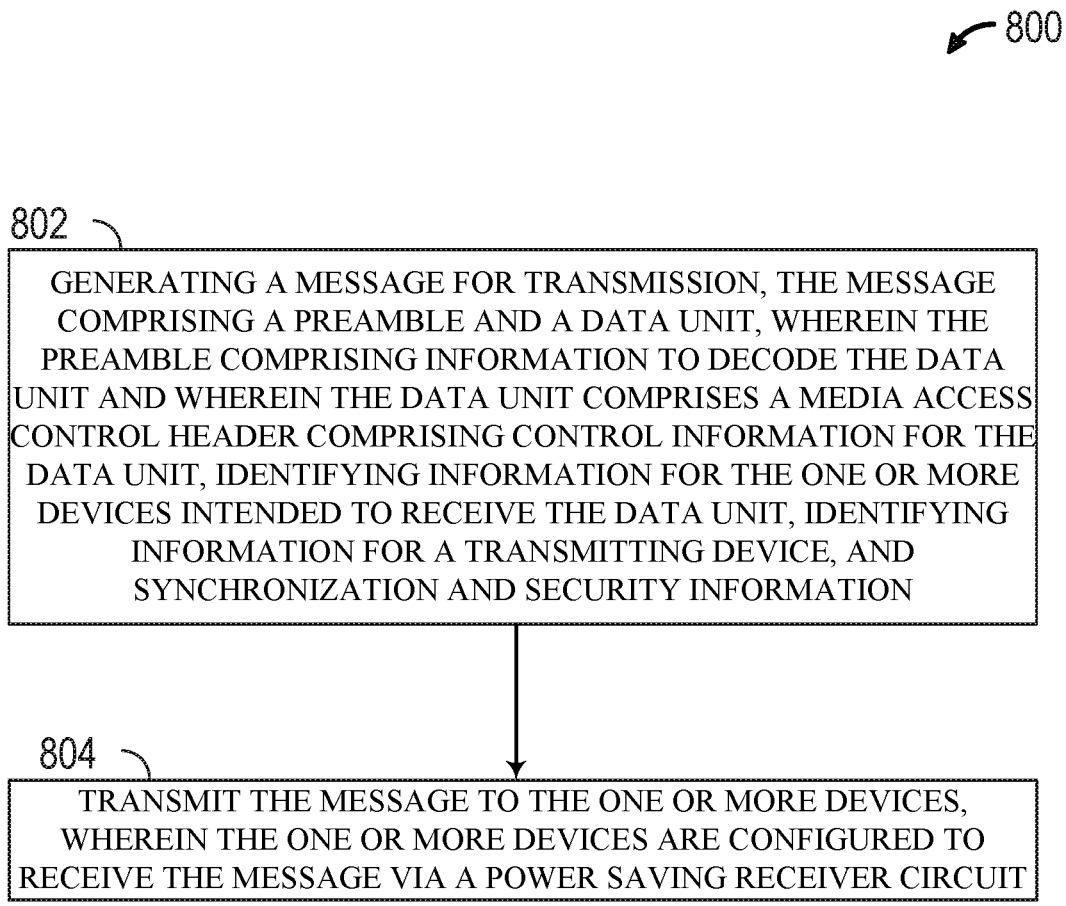
FIG. 8 illustrates a flowchart of an exemplary method of wireless communication, in accordance with some implementations.

FIG. 8 is a flow chart of an exemplary method 800 of wireless communication, in accordance with some implementations. Although the method 800 is described herein with reference to communications among an AP 104 and STAs 106 as discussed above with respect to FIG. 1, a person having ordinary skill in the art will appreciate that the method 800 may be implemented by other suitable devices and systems. For example, the method 800 may be performed by a STA 106 or a plurality of APs 104. Although the method 800 is described herein with reference to a particular order, in various implementations, blocks herein may be performed in a different order, or omitted, and additional blocks may be added.

In operation block 802 the method comprises generating a message for transmission, the message comprising a preamble and a data unit. The preamble may comprise information to decode the data unit. The data unit may comprise control information for the data unit, identifying information for the one or more devices intended to receive the data unit, identifying information for a transmitting device, and synchronization and security information. In operational block 804, the method further comprises transmitting the message to the one or more devices from the transmitting device, wherein the one or more devices are configured to receive the message via a power saving receiver circuit.

In some implementations, an apparatus for wireless communication may perform some of the implementations described herein. In some implementations, the apparatus comprises means for generating a message transmission, the message comprising a preamble and a data unit. The preamble may comprise information to decode the data unit. The data unit may comprise control information for the data unit, identifying information for the one or more devices intended to receive the data unit, identifying information for a transmitting device, and synchronization and security information. The apparatus further comprises means for transmitting the message to the one or more devices from the transmitting device, wherein the one or more devices are configured to receive the message via a power saving receiver circuit.

Figure 9:
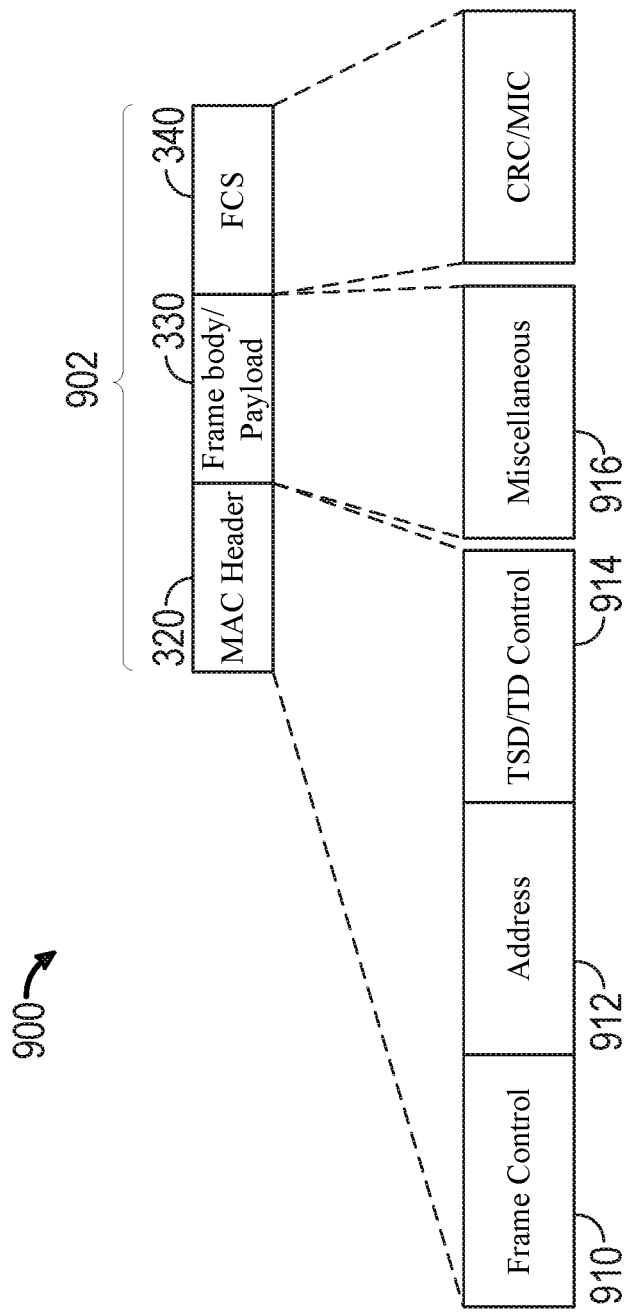
FIG. 9 illustrates further details of the exemplary structure of the PPDU of FIG. 3 for communicating with the WUR device (FIG. 2), in accordance with some implementations.

FIG. 9 illustrates further details of the exemplary structure of the PPDU 300 of FIG. 3 for communicating with the WUR device 202 (FIG. 2), in accordance with some implementations. FIG. 9 illustrates an exemplary structure of a physical layer data unit (PPDU) 300 for communicating with a WUR device 202 (FIG. 2), in accordance with some implementations. FIG. 9 illustrates only the three portions of the one or more MPDU 902 contained in the PPDU 300. More than one MPDU may be contained in a PPDU that is sent in MU mode (e.g., using OFDMA multiplexing techniques). The MPDU 902 may include one or more of a MAC header 320, payload or frame body portion 330, and FCS 340. The MAC header 320 may include one or more common fields that are present in all WUR frames or PPDUs. For example, the MAC header 320 may include one or more of a frame control field 910, an address field 912, and a TSD (type subtype dependent)/TD (type dependent) control 914. Either one of the TSD or TD may be present in the WUR frame. In some implementations, TSD and TD may be used interchangeably. The payload or frame body portion 330 may contain miscellaneous information and may have a length of zero ("0") or more bits. In certain implementations, the length may be a multiple of one octet, or two octets, etc., and the length may be indicated in the Frame Control field. The FCS 340 may include a CRC or a MIC depending on the type of PPDU 300 received (e.g., the CRC may be present if the frame is not secure, and the MIC may be present if the frame is secured). The FCS field 340 may be a 16 bit field. The FCS 340 may additionally be computed accounting for the BSSID address if the frame is sent to one or more STAs that are associated with the BSS. The FCS 340 may not be computed accounting for the BSSID address if the frame is sent to one or more STAs that are not associated with the BSS.

As depicted in FIG. 9, the MAC header 320 may include one or more of the three separate fields: a frame control field 910, an address field 912, and a TSD/TD control field 914. The frame control field 910 may be an 8 bit field, the address field 912 may be a 12 bit field, and the TSD/TD control frame 914 may be a 12 bit field. In some implementations some part of the contents of the Frame Control field may be carried in the PHY preamble of the WUR PPDU. Additionally, the payload or frame body portion 330 may have a variable length and the FCS may have a length of 8, 16, 24, and 32 bits. For example, the maximum lengths for the frame body field 912 may be 8, 16, 32 or 64 bytes. In certain implementations, the length of the frame body field 912 is indicated in the frame control field 910, and is in units of 1 octet, 2 octet, etc.

The 1 byte frame control field 910 may provide information that identifies details of the MPDU 902 type or length, and additional information that may be necessary to decode the MPDU. In some implementations, the frame control field 910 may include a one bit protocol version field (not shown), where zero (0) is currently used and one (1) is saved for future development. In some implementations, the frame control field 910 may include a type subfield (not shown) and a length/subtype field (not shown). The type subfield may be configured to identify a frame type for the MPDU 902. In some implementations, the type subfield may indicate that the MPDU 902 is a WUR Beacon frame, a WUR control frame, a WUR sync frame, a WUR paging frame, etc.). In some implementations the type subfield may be used to differentiate between constant or variable length frames. For example, a first value in the type subfield may indicate the WUR Beacon frame with a constant length while a second value in the type subfield may indicate the WUR control frame with a varied length. The length/subtype field may provide information indicating one or both of different frame subtypes or different payload or frame body sizes for the payload or frame body portion 330 portion of the MPDU 902. Alternatively, or additionally, the length/subtype field may provide a parity bit which may indicate validity or lack of corruption in the frame. Alternatively, or additionally, a bit (e.g., the first bit or the last bit of the frame control field 910) may be a parity bit that indicates validity or corruption of one or more of the subfields of the MPDU 902. In one implementation the parity bit may be computed to cover only the frame control field 910, or the frame control field 910 or the address field 912. Alternatively or additionally, the length/subtype field may indicate a frame subtype for constant length frames or a length for variable length frames. In some implementations, the parity bit may be any bit in the frame control field 910. For example, the parity bit may be either bit 1 of the frame control field 910 or the last bit of the frame control field 910. Alternatively, or additionally, the parity bit could also be one of the bits of the address field 912 (e.g., the last bit).

The address field 912 may optionally be present and may be 8 or 12 bits in length and may provide identification of an identity (e.g., an ID) of a transmitting device. The transmitting device may be identified by the transmitting BSS, which may correspond to the BSS from which the WUR communication is transmitted. For example, the address field 912 may contain a partial BSS ID field 322 or it may include a partial address or identifier for the AP 104 or STA 106 that transmitted the PPDU 300. Alternatively, the address field 912 may include a portion of the BSS ID or a portion of the service set identifier (SSID). In some implementations, the receive WUR STA may use the address field 912 (and the information contained therein) to determine whether or not the WUR STA is a potential intended recipient for the PPDU 300. For example, during association with the AP 104 or the wireless communication system 100, the WUR STA may be assigned or provided with a BSS ID for the BSS to which the WUR STA belongs (e.g., the BSS in the BSA 102). Accordingly, the WUR STA may store the BSS ID for its BSS in its memory (e.g., the memory 206 of FIG. 2). When the WUR STA compares the partial BSS ID 322 to at least a portion of the stored BSS ID (or the portion to be compared may be stored rather than the full BSSID), if the values match, then the WUR STA may determine that the received PPDU 300 does apply to the WUR STA and perform additional checks as described below. However, if the partial BSS ID 322 does not match the WUR STA stored BSS ID or SSID, then the WUR STA may determine that the received PPDU 300 does not apply to the WUR STA and may ignore the remainder of the PPDU 300. Accordingly, the partial BSS ID field 322 may be used to reduce unnecessarily computations, processing, and reception of the PPDU 300 by WUR STAs that do not need to pay attention to the PPDU 300. In some implementations the partial BSS ID may be a value that is known by both the AP and STA which may change in time according to a function (e.g., a random generator with a seed known at both devices, or in line with a time reference common at the AP and STA) that is known at both the AP and STA. In some implementations, the address field 912 may contain an identifier for the WUR frame, which may be selected from Table 1 below. The identifier included in the address field 912 may be dependent on the type of WUR frame (identified below in relation to Table 2).

TABLE 1

Identifiers of WUR frames

| Address field | Identifier description |
| --- | --- |
| Transmit ID | Identifier of the transmitting AP (may be provided by the AP to the WUR STAs) |
| Group ID | Identifier of a group of receiving WUR STAs (may be provided by the AP to the group of WUR STAs) |

TABLE 1-continued

Identifiers of WUR frames

| Address field | Identifier description |
| --- | --- |
| Wake Up ID | Identifier of an individual receiving WUR STA (may be provided by the AP to the WUR STA) |
| OUI1 | The 12 MSBs of the OUI |

In some implementations, the address field 912 of a WUR frame contains the Wake-Up ID when the WUR frame is individually addressed, the Group ID when the WUR frame is group addressed, and the Transmit ID when the WUR frame is broadcast. In the descriptions below, other implementations for the identifiers contained in the address field or in other fields of the WUR frame are provided.

In some implementations, the partial BSS ID 322 field may only include one octet of the BSS ID of the transmitting device or 12 bits of the BSS ID (or SSID). In some implementations, the single octet or 12 bits of the BSS ID (e.g., the partial BSS ID) is sufficient to provide adequate intra-PPDU power savings and discarding of PPDUs sent by other BSSs (APs) as compared to the added costs (e.g., time, bandwidth, etc.) of transmitting and processing the full BSS ID. Accordingly, the partial BSS ID field 322 may provide for reduced accuracy of identifying whether the WUR STA belongs to the same or different BSS as the transmitting AP 104 or STA 106 while providing for reduced communication costs (e.g., time, bandwidth, etc.). Additionally, in some implementations, the partial BSS ID field 322 may be used in some implementations of minimization of false alarms in the FCS, as discussed in further detail below. In some implementations, the frame control field 910 can be moved to the PHY preamble if there is a SIG field in the PHY preamble.

The type or subtype dependent (TSD/TD) control field 914 contains control information that depends on the type or subtype of the MPDU 902, as discussed in more detail below. For example the TSD/TD control field 914 may contain a partial TSF if the MPDU 902 is a beacon, a packet number if the MPDU 902 is paging one or more STAs to wake up and the frame is protected, other control information may be carried in this case such as partial TSF etc. In another example, the TSD/TD control field 914 may contain additional portions of the transmitter identifier. This may be useful for frames sent prior to association (e.g., for locationing, discovery, and ranging purposes) as these frames may require a lower false alarm probability. In this implementation the Address field and the TSD/TD control field 914 may be such that a portion of the transmitter identifier is stored in the Address field and another portion of the transmitter identifier is stored in the TSD/TD control field 914. Alternatively the TSD/TD control field 914 may contain a portion of the receiver identifier when the Address field contains a portion of the transmitter identifier, or vice versa. While we refer to a portion of the identifier in this implementation it should be clear that these values may be identifiers that are assigned, or negotiated between the peer STAs using the main radio.

The payload or frame body portion 330 may be of variable length, and its content may be dependent of the MPDU type/subtype or other settings of fields that precede it in the MPDU 902. The payload or frame body portion 330 may contain information specific to particular individual WUR frame types. Additionally, the payload or frame body portion 330 may not be present in constant length WUR frames and may be present in variable length WUR frames. In some implementations, the length of the payload or frame body portion 330 may be equal to X*(L+1), where L is the value of the length subfield in the frame control field 910 and X is the unit in octets (e.g., if unit is 1 octet and the length field is 3 bits, or if unit is 2 octets and the length field is 2 bits), 16 octets (similar considerations playing with the possible X, L values), 24 octets, or 32 octets. Examples of the possible miscellaneous fields are provided below in relation to FIG. 10.

Figure 10:
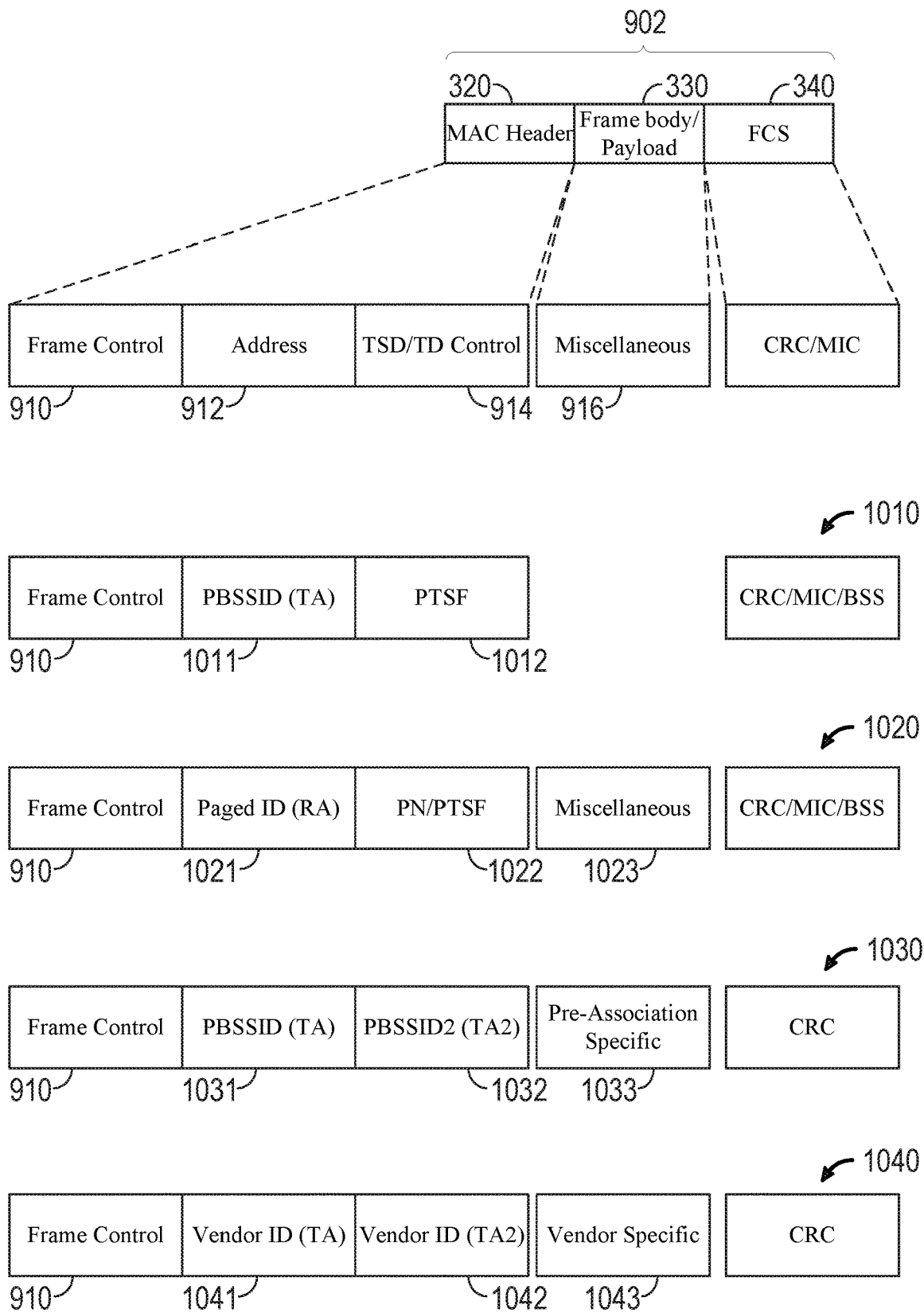
FIG. 10 illustrates further details of the exemplary structure of the MPDU of FIG. 9, in accordance with some implementations.

FIG. 10 illustrates further details of the exemplary structure of the MPDU 902 of FIG. 9, in accordance with some implementations. FIG. 10 illustrates four specific MPDU formats of the general MPDU format 902: a beacon format 1010, a paging format 1020, a pre-association format 1030, and an exemplary vendor specific format 1040. As shown, each of these formats may be associated with a particular "type" value (or subtype value) which may correspond to a value to be used in the type subfield of the frame control field 910 described herein. Accordingly, the beacon format 1010 may be identified by the type field value being "0", the paging format 1010 may be identified by the type field value being "1", the pre-association format 1030 may be identified by the type field value being "2", and the vendor specific format 1040 may be identified by the type field value being "3".

As shown, the beacon format 1010 includes the 8 bit frame control field 910 as described above in relation to FIG. 9. The 12 bit address field 912 referenced in relation to FIG. 9 is a partial BSSID (PBSSID) 1011 for the transmitting device, as described herein. For the beacon format 1010, the 12 bit TSD/TD control field 914 is a partial timestamp function (PTSF) field, 1011, and contains 12 bits of the timing synchronization function of the AP (e.g., the 12 LSBs of the Timestamp field that the AP would include in a transmitted beacon, or a certain window of size 12 bits of the Timestamp field). The PTSF field helps the receiver to synchronize its internal clock to that of the AP (peer STA) with which the receiver is interacting. For the beacon format 1010, no payload or frame body portion 330 may be included, and the FCS 340 is the CRC/MIC/BSS field described herein. Thus, the beacon format 1010 may have a length of 6 bytes.

In some implementations, the beacon format 1010 may be constant or variable length. The constant length may be most used and may be required for use by all WUR devices. The enhanced or extended length beacon formats may be optional. In some implementations, a beacon format 1010 may have a subtype identifier (e.g., in the length/subtype field) of 0, indicating a constant length. If the length bits are not used to indicate the length of the payload or frame body portion 330, then this field (e.g., the remaining bits of the length/subtype field) may not be used and can be repurposed. In such an implementation, the bits may be used as extended control bits, such as a change sequence number that can indicate to the receiver STAs that a BSS system update has occurred if the change sequence number has increased.

As shown, the paging format 1020 includes the 8 bit frame control field 910 as described above in relation to FIG. 9. The 12 bit address field 912 referenced in relation to FIG. 9 is a paged ID field 1021 for the receiving device, as described herein, and may contain the 11 LSBs of the association identifier of the receiving device. For the paging format 1020, the 12 bit TSD/TD control field 914 may be any of the following: a packet number field which is an increasing number that identifies the packet and may be used to identify replay attacks for protected frames, or may be used to identify the packet for which an acknowledgment is needed; a PTSF field which contains a portion of the timing synchronization function, which is useful for synchronizing the internal clock of the receiver to that of the transmitter, and additionally can be used as a counter to detect replay attacks over secure frames. For the paging format 1020, a frame body field 1023 of variable length may be included, and presence of the frame body field 1023 may be indicated by a nonzero length field in the frame control field 910, and the FCS 340 is the CRC/MIC/BSS field described herein. Thus, the paging format 1020 may have a minimum length of 6 bytes and a maximum length of 13 bytes, depending on the presence or length of the frame body field 1023.

The paging format 1020 may be basic or advanced. When the paging format 1020 is advanced, it may have a variable length based on the presence and length of the frame body field 1023 itself. Accordingly, the length/subtype field of the frame control field 910 may be used to indicate a length of the frame body field 1023 in units of 1 byte, in units of 2 bytes, 3 bytes, 4 bytes, and so on (unit known at both transmitter and receiver, and can be a default value). For example, when the length/subtype field indicates "2", the frame body field 1023 may have a length of 2 bytes. In some implementations, the 2 byte frame body field 1023 may indicate two addresses in reference to the paged ID in the paged ID field 1021. For example, the frame body field 1023 may include a range of addresses in relation to the paged ID in the paged ID field 1021. For example, when the frame body field 1023 is 2 bytes then it may contain a STA list of an additional 2 paged ID fields, identifying a second and a third STA, wherein the first STA is identified by the Address field itself of the WUR Paging frame. In this example the first STA is identified by the AID contained in the Address field, the second STA is identified by the AID (identifier) that is obtained from the 3 MSBs of the Address field and the first 8 bits of the STA list, while the third STA is identified by the AID (identifier) that is obtained from the 3 MSBs of the Address field and the second 8 bits of the STA list. As shown, the pre-association format 1030 includes the 8 bit frame control field 910 as described above in relation to FIG. 9. The 12 bit address field 912 referenced in relation to FIG. 9 is a partial BSS ID field 1031 or a partial identifier for the transmitting device (e.g., PBSSID (TA)). For the pre-association format 1030, the 12 bit TSD/TD control field 914 is a second partial BSS ID field 1032 (e.g., PBSSID2 (TA2)), as described herein. The presence of two identifiers in the frame reduces significantly the false alarm probability. For the pre-association format 1030, the payload or frame body portion 330 may be specific to pre-association frames (e.g., a pre-association specific field 1033) and may be of variable length. The FCS 340 is the CRC field described herein. Thus, the pre-association format 1030 may have a minimum length of 6 bytes and a maximum length of 13 bytes, depending on the length of the pre-association specific field 1033. In some implementations, the vendor specific field 1043 may include a receiver address (e.g., an address of the receiving device for the vendor specific format 1040 frame.

In some implementations, the pre-association format 1030 may not be encrypted because the communicating devices may not be aware of encryption methods used by the other device until they are associated. Furthermore, the pre-association format 1030 may be transmitted by a transmitting device for locationing by the receiving device, to convey timing information, or to convey discovery information. In some situations, the CRC of the FCS 340 may be replaced with another PBSSID field (e.g., PBSSID3 (TA3))

to further reduce the false alarm probability (from 24 bits now it becomes 32 bits identifier of that transmitter). In some implementations, the pre-association specific field 1033 may have a length indicated by the length/subtype field of the frame control field 910. For example, when the length field indicates a length of 2, then the pre-association specific field 1033 may have a length of 2 bytes and may be used to provide for fine timing synchronization, locationing, etc. In some implementations, the PBSSID field 1031 and the PBSSID2 field 1032 may include a hash of an SSID of the for the transmitting device (and the receiving device). For example, the 6-byte MAC address of an associated AP may be hashed down to 3 bytes and included in the PBSSID and PBSSID2 fields 1031 and 1032, respectively.

As shown, the vendor specific format 1040 includes the 8 bit frame control field 910 as described above in relation to FIG. 9. The 12 bit address field 912 referenced in relation to FIG. 9 is a vendor ID 1041 for the transmitting device, which may identify a particular vendor, etc. For the vendor specific format 1040, the 12 bit TSD/TD control field 914 is a second vendor ID field 1024, which may identify a second transmitting device. In some implementations, the vendor specific format contains two partial identifiers, one in the address field (e.g., the vendor ID field 1041) and one in the TSD/TD control field 914 (e.g., the second vendor ID field 1024). The vendor ID field 1041 may contain the 12 least significant bits (LSBs) of the organizationally unique identifier (OUI), and the second vendor ID field 1042 contains another 12 bits of the OUI. The vendor ID fields 1041 and 1042 may identify the vendor of the device generating the frame. For the vendor specific format 1040, the payload or frame body portion 330 may include a vendor specific field 1043 of miscellaneous length, and the FCS 340 is the CRC field described herein. Thus, the vendor specific format 1040 may have a minimum length of 6 bytes and a maximum length of 13 bytes, depending on the length of the vendor specific field 1043. In some implementations, the vendor specific field 1043 may include a receiver address (e.g., an address of the receiving device) for the vendor specific format 1040 frame.

Figure 11:
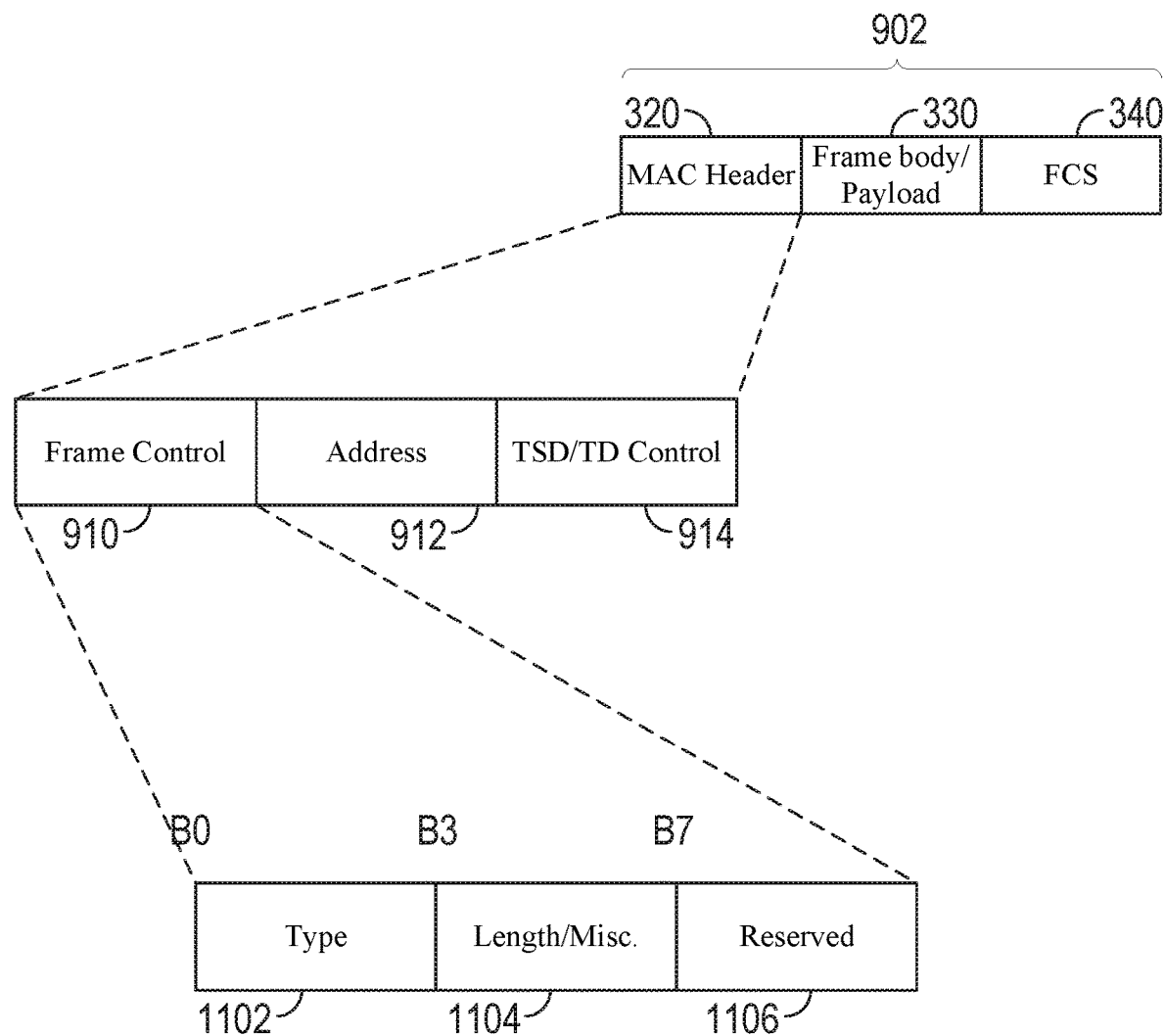
FIG. 11 illustrates further details of the exemplary structure of the MPDU of FIG. 9, in accordance with some implementations.

FIG. 11 illustrates further details of the exemplary structure of the MPDU 902 of FIG. 9, including details of the frame control field 910 of the MPDU 902. As shown, the frame control field 910 may include a type (or subtype) field 1102, a length or miscellaneous field 1104, and a reserved field(s) 1106. In some implementations, the type field 1102 may be 3-4 bits in length and the length/miscellaneous field 1104 may be 3-4 bits in length. The reserved field(s) 1106 may be the remainder bits of the 8-bit frame control field. The type field 1102 may indicate a type of the MPDU 902. Exemplary types for the MPDU 902 are provided below in Table 2:

TABLE 2

WUR frame types

| Type | Type description |
| --- | --- |
| 0 | WUR Beacon |
| 1 | WUR Wake Up |
| 2 | WUR Vendor Specific |
| 3 | WUR Discovery |
| 4-7 (if 3 bits) or 15 (if 4 bits | Reserved |

For example, when the type field 1102 includes a value of "0", the MPDU 902 may be a WUR beacon frame. When the type field 1102 includes a value of "1", the MPDU 902 may be a WUR Wake Up frame. When the type field 1102 includes a value of "2", the MPDU 902 may be a WUR vendor specific frame. When the type field 1102 includes a value of "3", the MPDU 902 may be a WUR discovery frame. When the type field 1102 includes a value of "4" or greater, the MPDU 902 may be another specific type of frame(s).

The length/miscellaneous field 1104 may include or act as a length field for the MPDU 902 when the length is variable and as a miscellaneous field for the MPDU 902 when the length is constant. In some implementations, whether or not the MPDU 902 is variable length or constant length may be indicated by a bit (e.g., a variable length or constant length bit). When the bit is set to "1", the MPDU 902 may be of variable length. When the bit is set to "0", the MPDU 902 may be of constant length. The bit may be indicated in various locations. As an example, this bit can be the most significant bit or the least significant bit of either the Type field or the length/miscellaneous field itself. Alternatively, this bit may be in the B0 or B2 or B3 or any other bit position of the type field 1102. The bits shown in FIG. 11 are exemplary to the type field 1102 and the length/miscellaneous field 1104 being 4-bits in length.

When the length/miscellaneous field 1104 is operating as the length field for a variable length MPDU 902, the length field 1104 may contain the length of the payload or frame body portion 330. When the length/miscellaneous field 1104 is operating as the miscellaneous field, the miscellaneous field 1104 may contain bits that are expected to be used to indicate or convey various other information, for example, as discussed above.

As described herein, each WUR frame including the MPDU 902 may consist of the following components: a MAC header 320 (which includes the frame control 910, the address field 912, and the type or subtype dependent (e.g., TSD/TD) control field 914), a payload or frame body portion 330 (which is variable length and contains information specific to the frame type), and an FCS 340 (which contains for example an 8-bit or 16-bit CRC). In some implementations, the FCS may contain a different CRC. For example, the FCS 340 may include a CRC-16 FCS, which may include a degree 16 polynomial and corresponding computation(s), or a CRC-8 FCS, which may include a degree 8 polynomial and corresponding computation(s). In some implementations, another CRC polynomial or computation may be used or provided.

In some implementations, the frame control field 910 may include 4 bits. The TSD/TD control field 914 may by two bytes. In some cases, information and fields from the frame control field 910 illustrated in FIG. 11 may be included in the TSD/TD control field 914. In some implementations, the address field 912 may be positioned prior to the frame control field 910. In this manner, the address field 912 may be positioned earlier in the MAC header 320.

Figure 12:
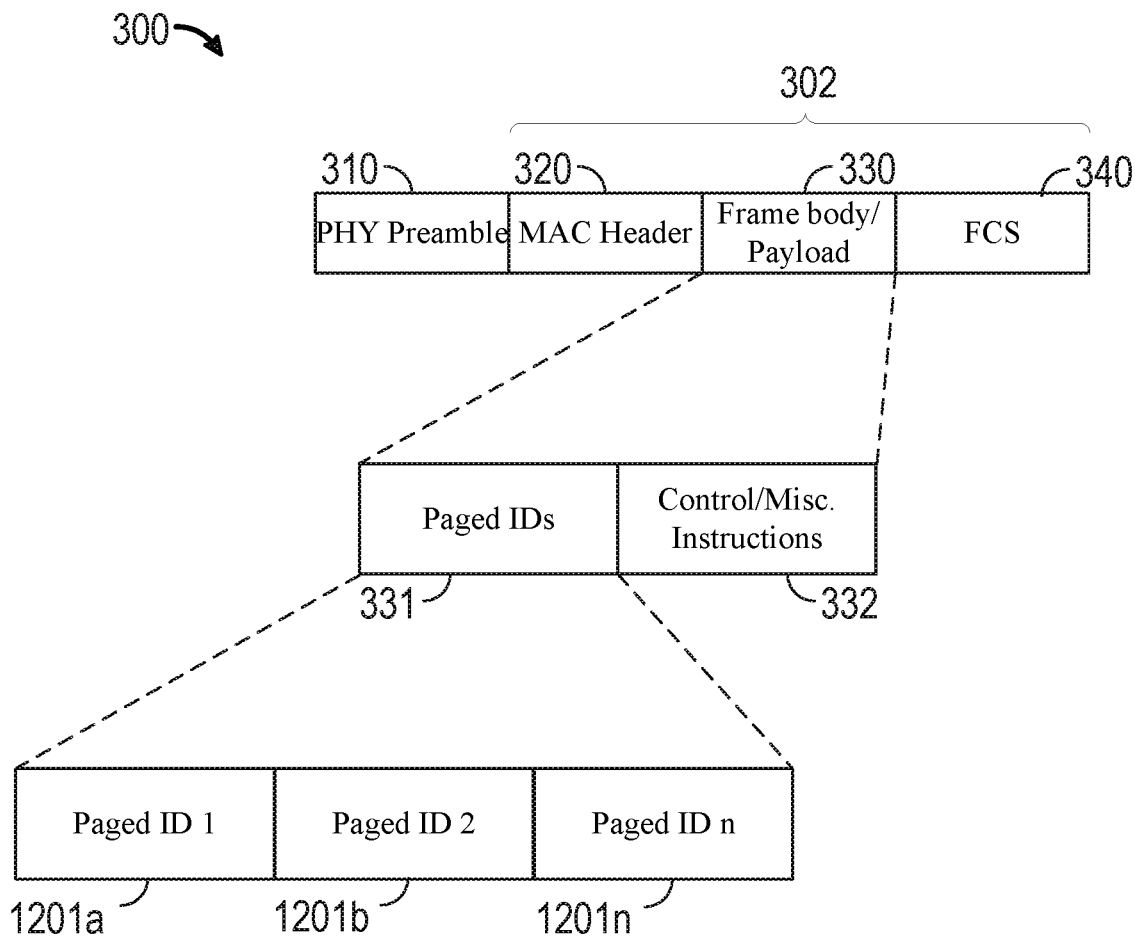
FIG. 12 illustrates further details of the exemplary structure of the PPDU of FIG. 4, in accordance with some implementations.

FIG. 12 illustrates further details of the exemplary structure of the PPDU 300 of FIG. 4, in accordance with some implementations. In some implementations, the WUR frame or PPDU 300, as described above, may include the paged IDs or WIDs in the paged IDs field 331. In some implementations, the paged IDs field 331 may include information regarding the one or more STAs to which the PPDU 300 applies or is addressed. For example, when the PPDU 300 is a unicast frame or of constant length, the PPDU 300 need not include information regarding the one or more STAs to which the PPDU 300 applies or is addressed. When the PPDU 300 is a broadcast frame or of variable length, the PPDU 300 may include information regarding the one or more STAs to which the PPDU applies or is addressed. In some implementations, the information may include one or more of a bitmap, and STA identifier list, etc. As shown, the paged IDs field 331 may include STA identifiers for three STAs in paged ID 1 field 1201a, paged ID 2 field 1201b, and paged ID 3 field 1201n.

In some implementations, when the payload or frame body portion 330 of the PPDU 300 includes an address field (e.g., address field 912) set to zero, the payload or frame body portion 330 may include the multiple paged identifiers (e.g., paged IDs 1201a-1201n) for STAs for which the PPDU 300 is intended or directed. For example, in a variable length, broadcast or multicast WUR wake-up frame with a payload or frame body portion 330, each receiving STA may determine that the payload or frame body portion 330 includes one or more paged IDs in the paged ID field 331 (e.g., the paged IDs 1201a-1201n) and may parse the WUR wake-up frame to determine whether the PPDU 300 applies to or is directed to the receiving STA based on the identifiers in the paged ID field 331. In some implementations, the STA identifiers in the paged IDs field 331 (e.g., paged IDs 1201a-1201n) may be in a preselected order. In such implementations, each STA receiving the PPDU 300 may parse the entire payload or frame body portion 330 to determine if the PPDU 300 is directed to or applies to the STA, even though the PPDU 300 is likely intended for only a small subset of the receiving STAs.

In some implementations, as described herein, the STA identifiers may be listed in increasing order. In some implementations, the STA identifiers maybe listed in decreasing order In such an implementation, the receiving STAs may be provided with a simple method of discarding frames not intended for or applying to them with minimal or reduced processing as compared when the STA identifiers in the paged IDs field 331 are not arranged in a deterministic or preselected order. For example, when the paged IDs are listed in increasing order, each receiving STA may parse the paged IDs field 331 and, if the parsed paged ID in the paged ID field 331 is greater than the ID of the STA, the STA may discard or drop the PPDU 300 because each of the remaining IDs in the paged ID field 331 will be greater than the ID of the STA and the PPDU 300 will not apply to or be directed to the STA. Thus, by utilizing deterministic or preselected ordering schemes of the paged IDs 1201a-1201n in the paged ID field 331, receiving STAs may be provided with a mechanism for discarding or dropping PPDUs 300 generated by non-associated APs that are not intended for or directed to those STAs. Accordingly, the STAs that drop the PPDUs 300 may re-synchronize with concurrent WUR frames generated by the AP with which the STAs are associated. This also allows the STAs to refrain from processing frames generated by an AP that are intended for other STAs, thereby reducing power consumption by providing a mechanism for early termination of the receiving and processing of such multicast, variable length WUR frames.

In some implementations, WUR APs 104 that generate multicast, variable length WUR frames may order a list of paged IDs 1201a-1201n in the paged ID field 331 in increasing order. In some implementations, WUR APs 104 may utilize such increasing order in other multicast or variable length WURs that include a list of paged IDs 1201a-1201n. Accordingly, receiving STAs may discard or drop the received WUR frame (or other WUR frame) when the STA identifies a paged ID 1201 that is greater than its own ID without finding its ID in the paged IDs field 331 or immediately after locating the last paged ID 1201a-1201n in the paged IDs field 331 and the paged ID 1201a-1201n is less than the ID of the receiving STA.

Figure 13:
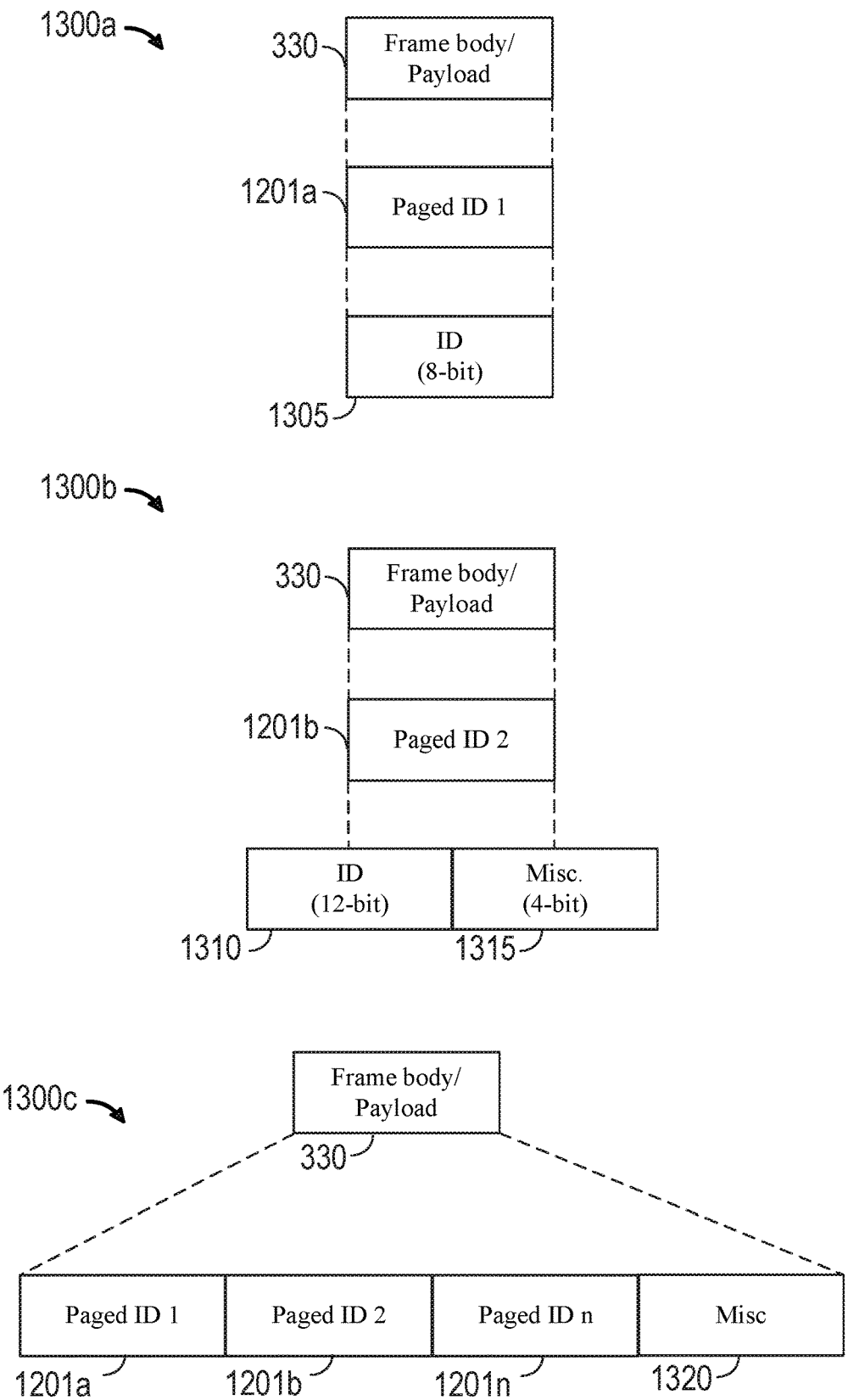
FIG. 13 illustrates further details of the exemplary structure of the paged IDs field of the PPDU of FIG. 12, in accordance with some implementations.

FIG. 13 illustrates further details of the exemplary structure of the payload or frame body portion 330 of the PPDU of FIG. 12, in accordance with some implementations. In some implementations, the payload or frame body portion 330 may only include the paged IDs field 331 or the paged IDs 1201 in the frame body 330. In some implementations, the payload or frame body portion 330 may include paged IDs field 331 or the paged IDs 1201 in the payload or frame body portion 330 along with control/misc. information 332. Three optional implementations of the paged ID structure 1300 of the payload or frame body portion 330 are included as 1300a, 1300b, and 1300c.

In a first option for the paged ID structure 1300a, the payload or frame body portion 330 includes the paged IDs 1201 (e.g., paged ID 1201a) which has a length of 8 bits. A paged ID 1201a of 8-bit length may be sufficient to identify up to 256 unique STAs. In some implementations, up to 4096 stations may be indicated by utilizing the address field (having a length of 12 bits) and its MSBs (or another quantity of MSBs) in conjunction with the paged IDs 1201 in the paged IDs field 331. For example, when the address fields includes 12 bits, the 4 MSBs of the address field may be used with or in conjunction with the paged IDs 1201 to identify a specific STA. In some implementations, the first listed STA for which the WUR frame is directed or to which the WUR frame applies may be identified in an address field of the PPDU 300. All additional STAs to which the WUR frame is directed or to which the WUR frame applies may be identified in the paged IDs field 331. When parsing the received WUR frame, a STA may determine whether or not the ID in the address field of the received WUR frame matches the ID of the STA. When the ID in the address field does match the ID of the STA, the STA continues parsing the received WUR frame through the FCS. When the ID in the address field does not match the ID of the STA, the STA determines whether the 4 MSBs of the ID in the address field match the 4 MSBs of the ID of the STA. If they do match, then the STA continues parsing the WUR frame to determine if the IDs listed in the paged IDs field 331 include the ID of the STA to determine whether the WUR frame is applied to or directed to the STA, as described herein. If the 4 MSBs do not match, then the STA may discard the received WUR frame. One skilled in the art may appreciate that this procedure may be applicable to any combination of address field and paged IDs field 331 lengths, wherein the address field or the address identified in the address field has a length that is greater than or equal to a corresponding length of the paged ID 1201 in the paged IDs field or the paged IDs field itself and wherein the number of MSBs is equal to a difference of the size or length of the address field and the size or length of one of the paged IDs field 331. For example, if the address field is 16 bits in length and the paged IDs field is 10 bits, then 6 MSBs are to be compared (16−10=6 MSBs). In some implementations, more than 256 unique STAs may be identified using orthogonal scheduling, as described herein. Such scheduling may allow use of the smaller, 8-bit length paged ID 1201 while avoiding waking of unintended STAs, thereby reducing field size and potential overhead. However, some flexibility and may be lost as compared to being able to uniquely identify each STA.

In a second option for the paged ID structure (e.g., paged ID structure 1300b), the payload or frame body portion 330 includes the paged IDs 1201 (e.g., paged ID 1201b) which has a length of 16-bits. A paged ID 1201b of 16-bit length may include a 12-bit ID field or portion 1310 and a 4-bit miscellaneous field or portion 1315. The 12-bit ID field 1310 may be sufficient to uniquely identify 2048 STAs. Such a structure may allow the WUR to utilize the same or similar signaling as the main radio and provides for additional flexibility as compared to the single octet of option 1300*a*. Additionally, the larger 16-bit structure may provide for communication of extra control information between the STA and the AP with a potential cost of increased overhead as compared to option 1300*a*.

In a third option for the paged ID structure (e.g., paged ID structure 1300*c*), the payload or frame body portion 330 includes the paged IDs 1201*a*-1201*n* and a miscellaneous field 1320. In this option, each of the paged IDs 1201*a*, 1201*b*, and 1201*n* may be listed adjacently (e.g., contiguously or back-to-back) in the payload or frame body portion 330, where the payload or frame body portion 330 has a length that is a multiple of 8. Accordingly, the paged IDs 1201*a*, 1201*b*, and 1201*n* may have any length (e.g., 8-bits, 12-bits, etc.) and the payload or frame body portion y 330 will be filled or padded with additional bits to obtain a total length that is a multiple of 8. The padding or additional bits may include vendor specific bits, bits used for additional FCS, control bits, miscellaneous bits, etc. Such an arrangement may maximize a number of identifiers included in the frame body while maintaining the constraints on the payload or frame body portion 330. In some implementations, the paged IDs 1201*a*-1201*n* may be of mixed length (e.g., mix of 8-bits, 12-bits, 16-bits, etc.) when such mixing of lengths is indicated in the PPDU 300.

In some implementations, the payload or frame body portion 330 may have a maximum length of 8 or 16 octets. Accordingly, with option 1300*a*, up to 8 WUR STAs (8-octets) or 16 WUR STAs (16-octets) may be paged with a single WUR frame. With option 1300*b*, up to 4 WUR STAs (8-octets) or 8 WUR STAs (16-octets) may be paged with a single WUR frame.

In some implementations, the payload or frame body portion 330 may include one or more paged IDs, where each paged ID contains a single 8-bit identifier (e.g., option 1300*a*), where the 8-bit identifier is equal to the 8 LSBs of the recipient STA identifier. In some implementations, the payload or frame body portion 330 may include one or more paged IDs (e.g., option 1300*b*), where each paged ID contains a 12-bit identifier 1310 and a 4-bit miscellaneous field 1315, where the 12-bit identifier 1310 is equal to the recipient STA identifier.

Figure 14:
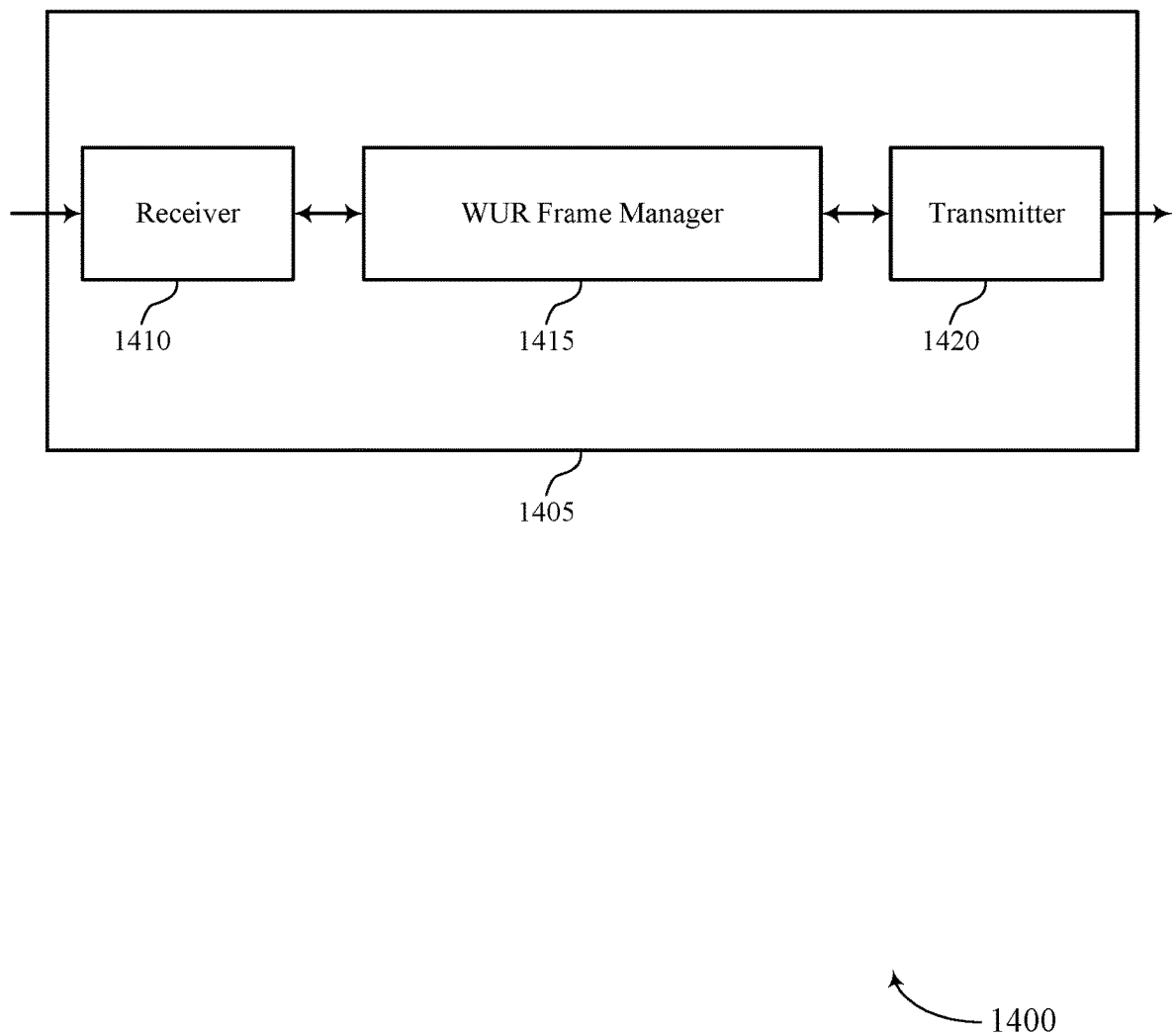
FIGS. 14 and 15 show block diagrams of devices that support WUR frame formats and device communications in accordance with some implementations.

FIG. 14 shows a block diagram 1400 of a device 1405 that supports WUR frame formats and device communications in accordance with some implementations. The device 1405 may be an example of aspects of a AP as described herein. The device 1405 may include a receiver 1410, a WUR frame manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to WUR frame formats, etc.). Information may be passed on to other components of the device. The receiver 1410 may be an example of aspects of the transceiver 1720 described with reference to FIG. 17. The receiver 1410 may utilize a single antenna or a set of antennas.

The WUR frame manager 1415 may identify one or more intended receiving wireless devices for which to send a WUR frame, generate the WUR frame, and transmit the WUR frame to the one or more intended receiving wireless devices. The WUR frame manager 1415 may also determine a frame check sequence FCS type for use with a WUR frame for transmission to one or more intended receiving wireless devices, indicate an FCS type of the WUR frame corresponding to the FCS portion, generate the WUR frame, and transmit the WUR frame. The WUR frame manager 1415 may be an example of aspects of the WUR frame manager 1710 described herein.

The WUR frame manager 1415, or its sub-components, may be implemented in hardware, code (e.g., software or firmware) executed by a processor, or any combination thereof. If implemented in code executed by a processor, the functions of the WUR frame manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The WUR frame manager 1415, or its sub-components, may be physically located at different locations, including being distributed such that portions of functions are implemented at different physical locations by one or more physical components. In some examples, the WUR frame manager 1415, or its sub-components, may be a separate and distinct component in accordance with some implementations. In some examples, the WUR frame manager 1415, or its sub-components, may be combined with one or more other hardware components, including but not limited to an input/output (I/O) component, a transceiver, a network server, another computing device, one or more other components described in the present disclosure, or a combination thereof in accordance with some implementations.

The transmitter 1420 may transmit signals generated by other components of the device. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
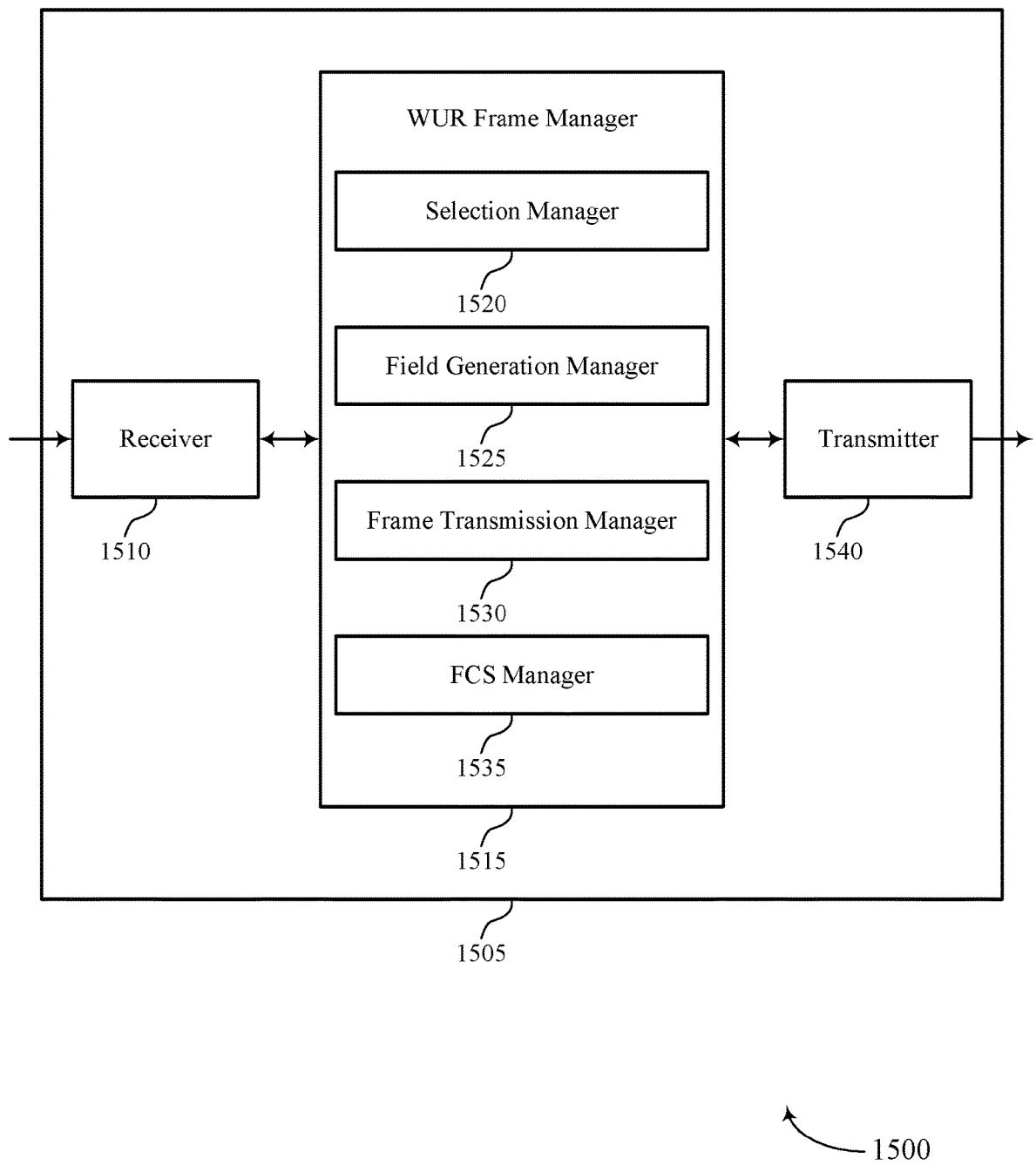

FIG. 15 shows a block diagram 1500 of a device 1505 that supports WUR frame formats and device communications in accordance with some implementations. The device 1505 may be an example of aspects of a device 1405 or a AP 104 as described herein. The device 1505 may include a receiver 1510, a WUR frame manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related to WUR frame formats, etc.). Information may be passed on to other components of the device. The receiver 1510 may be an example of aspects of the transceiver 1720 described with reference to FIG. 17. The receiver 1510 may utilize a single antenna or a set of antennas.

The WUR frame manager 1515 may be an example of aspects of the WUR frame manager 1415 as described herein. The WUR frame manager 1515 may include a selection manager 1520, a field generation manager 1525, a frame transmission manager 1530, and a FCS manager 1535. The WUR frame manager 1515 may be an example of aspects of the WUR frame manager 1710 described herein.

The selection manager 1520 may identify one or more intended receiving wireless devices for which to send a WUR frame.

The field generation manager 1525 may generate the WUR frame.

The frame transmission manager 1530 may transmit the WUR frame to the one or more intended receiving wireless devices.

The FCS manager 1535 may determine a frame check sequence FCS type for use with a WUR frame for transmission to one or more intended receiving wireless devices and indicate an FCS type of the WUR frame corresponding to the FCS portion.

The field generation manager 1525 may generate the WUR frame.

The frame transmission manager 1530 may transmit the WUR frame.

The transmitter 1540 may transmit signals generated by other components of the device. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
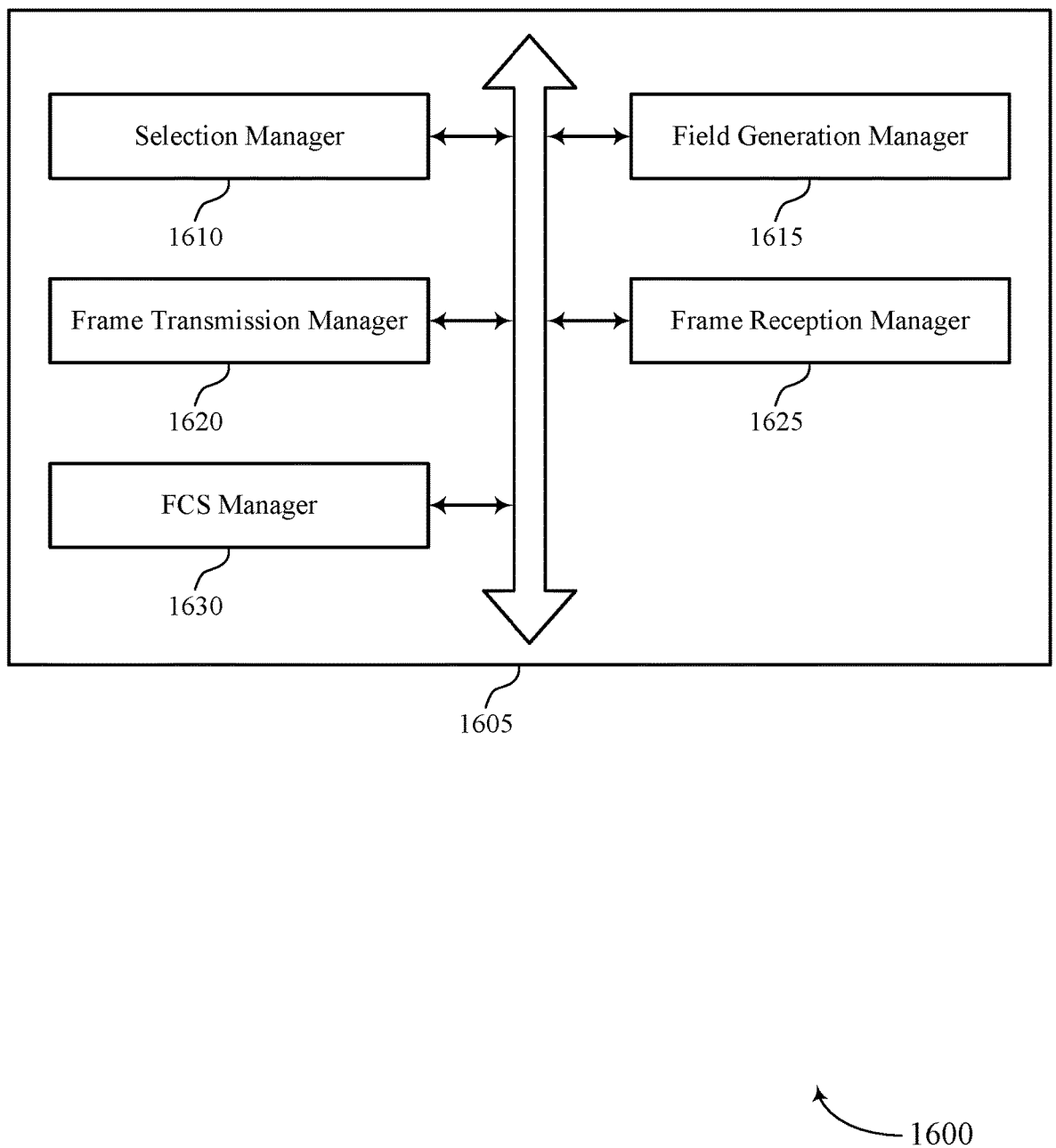
FIG. 16 shows a block diagram of a WUR frame manager that supports WUR frame formats and device communications in accordance with some implementations.

FIG. 16 shows a block diagram 1600 of a WUR frame manager 1605 that supports WUR frame formats and device communications in accordance with some implementations. The WUR frame manager 1605 may be an example of aspects of a WUR frame manager 1415, a WUR frame manager 1515, or a WUR frame manager 1710 described herein. The WUR frame manager 1605 may include a selection manager 1610, a field generation manager 1615, a frame transmission manager 1620, a frame reception manager 1625, and a FCS manager 1630. Each of these modules may communicate, directly or indirectly, with one another (e.g., via one or more buses).

The selection manager 1610 may identify one or more intended receiving wireless devices for which to send a WUR frame.

The field generation manager 1615 may generate the WUR frame. In some examples, the field generation manager 1615 may generate the WUR frame. In some cases, the WUR frame includes a first portion that includes a first field. In some implementations, the first field may correspond to one or more bits in a length/miscellaneous field 1104 as described with respect to FIG. 11. For example, the first field may be the most significant bit of a four-bit length/miscellaneous field 1104.

In some cases, the first field indicates whether the WUR frame is a fixed length frame or a variable length frame. In some cases, the first field indicates to the one or more intended receiving wireless devices that a second portion of the WUR frame is omitted based on a value of the first field. In some cases, the first portion has a fixed length. In some cases, each additional portion of the WUR frame may also have a fixed length. In some cases, the first field indicates to the one or more intended receiving wireless devices that a second portion of the WUR frame is present based on a value of the first field. In some cases, the first portion includes a second field that indicates a length of the second portion. In some implementations, the second field may correspond to one or more bits in a length/miscellaneous field 1104 as described with respect to FIG. 11. For example, the second field may be the three least significant bits of a four-bit length/miscellaneous field 1104.

In some cases, the second portion is a frame body. In some cases, the length of the second portion is an integer number of octets that is based on a value of the second field. In some cases, the first portion includes a second field that indicates (i) information different than a length of a second portion of the WUR frame or (ii) a length of a second portion of the WUR frame, the information or the length being indicated by the second field based on a value of the first field.

In some cases, the first portion includes a third field, the third field indicating a format type of the WUR frame. In some implementations, the third field may correspond to a type (or subtype) field 1102 as described with respect to FIG. 11.

In some cases, at least one of the second field or the third the value is adjacent to the first field. In some cases, the value of the first field indicates that the second field indicates information different than a length of a second portion of the WUR frame. In some cases, a type of the information is indicated based on one or both of a value of the second field and a value of the third field. For example, the type of the information may be indicated based on the value of the second field. The type of the information may be indicated based on the value of the third field. In some implementations, type of the information may be indicated based on the value of the second field and the value of the third field.

In some cases, the first portion is a MAC header. In some cases, the first portion is a PHY preamble. In some cases, the first field is positioned within a frame control field of the first portion. In some cases, the first field is positioned within a TD control field of the first portion, the first field being positioned within the TD control field based on a protected field being positioned within a frame control field for a format type of the WUR frame. In some cases, the first portion includes a common field that provides an identifier of the WUR frame. For example, the identifier of the WUR frame may be a partial BSS identifier. In some cases, the second portion includes a WUR identification value for each of the one or more intended receiving wireless devices. In some cases, the second portion includes a set of sequentially-ordered WUR identification values. In some cases, each of the sequentially-ordered WUR identification values corresponds to at least one of the one or more intended receiving wireless devices. In some cases, the set of sequentially-ordered WUR identification values are provided in a decreasing order. In some cases, the second portion includes a control instructions field. In some cases, the control instructions field includes a wake-up instruction associated with at least one of the one or more intended receiving wireless devices.

In some cases, the first portion includes signaling for a wake-up identifier. In some cases, the wake-up identifier corresponds to the at least one of the one or more intended receiving wireless devices. In some cases, the wake-up instruction is based on the received one or more instruction bits. In some cases, the first portion includes signaling for at least two of a format type of the WUR frame, a presence of a second portion, or a wireless device identifier. In some cases, the first portion includes signaling for a wireless device identifier that corresponds to the transmitting wireless device. In some cases, at least one bit of the wireless device identifier is positioned within a first two bytes of the first portion. In some cases, the first portion includes signaling for a group identifier. In some cases, the group identifier corresponds to at least two intended receiving wireless devices. In some cases, the first portion includes signaling for a subset of bits associated with an OUI. In some cases, the subset of bits associated with the OUI corresponds to a number of most significant bits of the OUI. In some cases, the first portion of the frame includes a TD control field that provides a partial TSF. In some cases, the partial TFS included in the TD control field is based on a format type of the WUR frame. In some cases, the partial TFS included in the TD control field provides at least a portion of a monotonically increasing counter functionality.

In some cases, the WUR frame includes at least a first portion and an FCS portion. In some cases, the FCS portion is capable of being one of a plurality of FCS types. In some cases, the indicating the FCS type of the WUR frame includes indicating the FCS type of the WUR frame to the one or more intended receiving wireless devices via information receivable by the one or more intended receiving wireless devices prior to the FCS portion of the WUR frame. In other words, the first portion of the WUR frame is positioned for transmission prior to the FCS portion of the WUR frame in some implementations. In some cases, the protected field is a single bit. In some implementations, the protected field may be positioned in the first portion of the WUR frame.

In some cases, the first portion includes a frame control field and TD control field. In some cases, the protected field is positioned within one of the frame control field or the TD control field based on a format type of the WUR frame. In some cases, the frame control field has fewer bits than the TD control field. In some cases, the indicating the FCS type of the WUR frame includes indicating the FCS type of the WUR frame to the one or more intended receiving wireless devices via one or more protection indicator bits of the WUR frame. In some cases, the one or more protection bits are positioned for transmission in a portion of the WUR frame prior to the FCS portion of the WUR frame. In some cases, the portion of the WUR frame is different than the first portion of the WUR frame. In some cases, the first portion is a MAC header.

The frame transmission manager 1620 may transmit the WUR frame to the one or more intended receiving wireless devices. In some examples, the frame transmission manager 1620 may transmit the WUR frame. In some cases, the WUR frame is a WUR beacon frame. In some cases, the indicating the FCS type of the WUR frame includes indicating the FCS type of the WUR frame to the one or more intended receiving wireless devices via a frame for transmission prior to transmission of the WUR frame. In some cases, the indicating the FCS type of the WUR frame is based on the protection type information.

The FCS manager 1630 may determine a frame check sequence FCS type for use with a WUR frame for transmission to one or more intended receiving wireless devices. In some examples, the FCS manager 1630 may indicate an FCS type of the WUR frame corresponding to the FCS portion. In some cases, the WUR frame includes a third portion. In some cases, the third portion is associated with an FCS. In some cases, the FCS is a MIC based on a value of a protected field in the first portion. In some cases, the FCS is a CRC based on a value of a protected field in the first portion. In some cases, the FCS type is a CRC based on the WUR frame being an unprotected frame type. In some cases, the FCS type is a MIC based on the WUR frame being a protected frame type. In some cases, the generating the WUR frame includes modifying a value of an FCS operation based on a partial BSS identifier to generate the FCS portion.

The frame reception manager 1625 may receive one or more instruction bits associated with the wake-up instruction from the at least one of the one or more intended receiving wireless devices. In some examples, the frame reception manager 1625 may receive protection type information indicating whether the WUR frame is to be transmitted as one of an unprotected frame type or a protected frame type.

Figure 17:
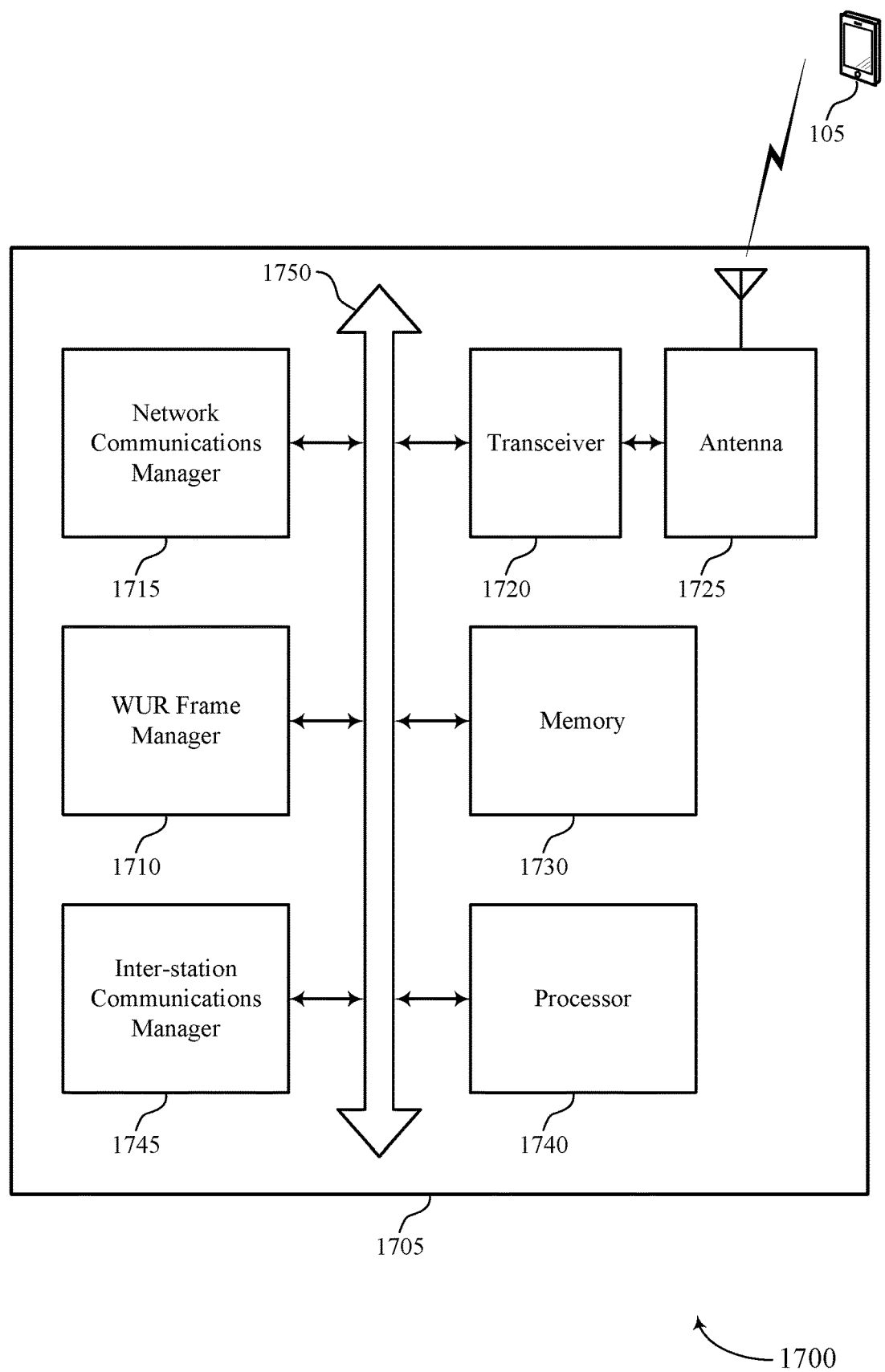
FIG. 17 shows a diagram of a system including a device that supports WUR frame formats and device communications in accordance with some implementations.

FIG. 17 shows a diagram of a system 1700 including a device 1705 that supports WUR frame formats and device communications in accordance with some implementations. The device 1705 may be an example of or include the components of device 1405, device 1505, or a AP as described herein. The device 1705 may include components for bi-directional voice and data communications including components for transmitting and receiving communications, including a WUR frame manager 1710, a network communications manager 1715, a transceiver 1720, an antenna 1725, memory 1730, a processor 1740, and an inter-station communications manager 1745. These components may be in electronic communication via one or more buses (e.g., bus 1750).

The WUR frame manager 1710 may identify one or more intended receiving wireless devices for which to send a WUR frame, generate the WUR frame, and transmit the WUR frame to the one or more intended receiving wireless devices. The WUR frame manager 1710 may also determine a frame check sequence FCS type for use with a WUR frame for transmission to one or more intended receiving wireless devices, indicate an FCS type of the WUR frame corresponding to the FCS portion, generate the WUR frame, and transmit the WUR frame.

The network communications manager 1715 may manage communications with the core network (e.g., via one or more wired backhaul links). For example, the network communications manager 1715 may manage the transfer of data communications for client devices, such as one or more STAs 106.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM and ROM. The memory 1730 may store computer-readable, computer-executable code 17 35 including instructions that, when executed, cause the processor to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into processor 1740. The processor 1740 may be configured to execute computer-readable instructions stored in a memory to perform various functions (e.g., functions or tasks supporting WUR frame formats).

The inter-station communications manager 1745 may manage communications with other APs 104, and may include a controller or scheduler for controlling communications with STAs 106 in cooperation with other APs 104. For example, the inter-station communications manager 1745 may coordinate scheduling for transmissions to STAs 106 for various interference mitigation techniques such as beamforming or joint transmission.

The various aspects of FIGS. 14 through 17 may be implemented with reference to FIGS. 1 through 13.

Figure 18:
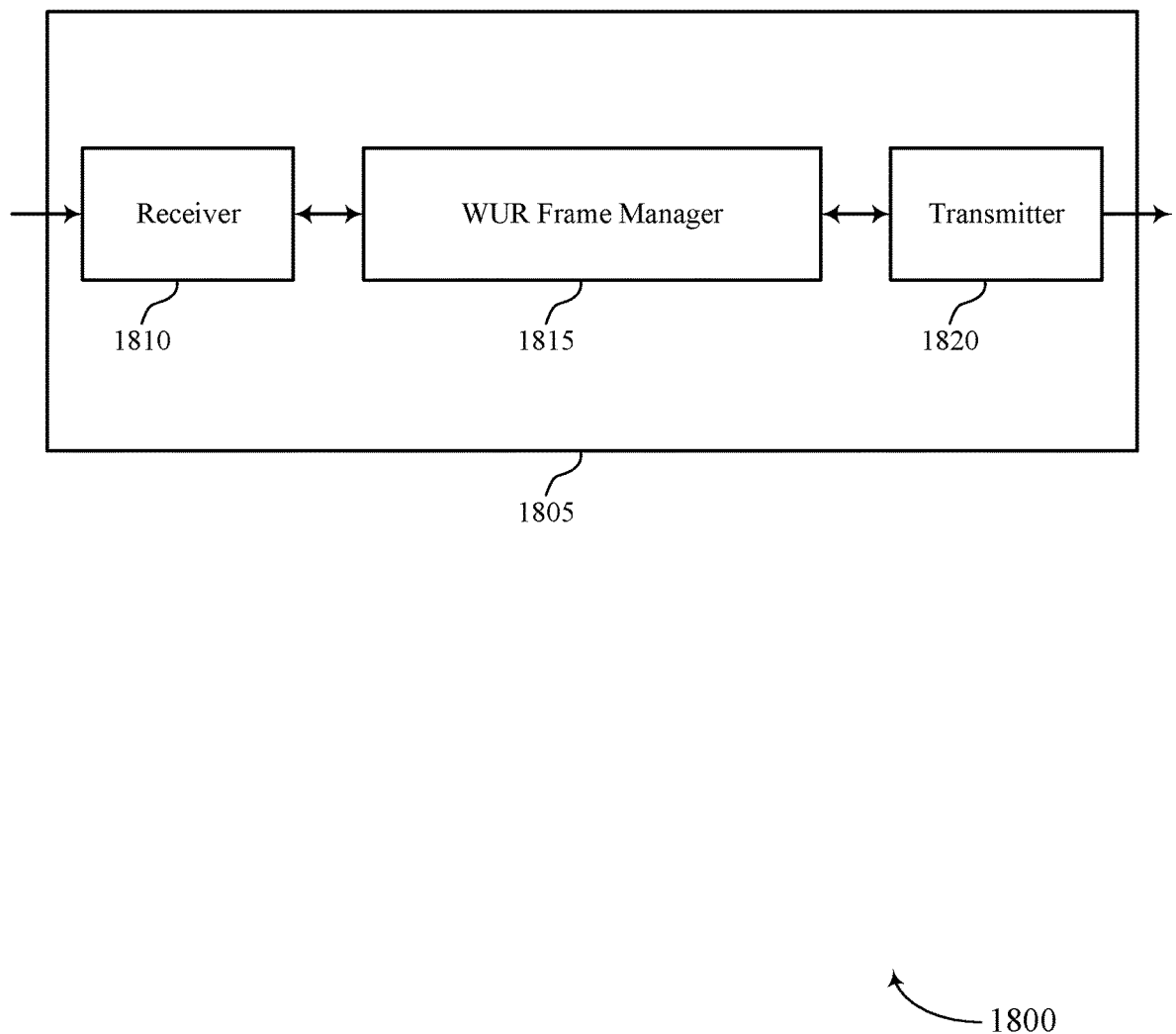
FIGS. 18 and 19 show block diagrams of devices that support WUR frame formats and device communications in accordance with some implementations.

FIG. 18 shows a block diagram 1800 of a device 1805 that supports WUR frame formats and device communications in accordance with some implementations. The device 1805 may be an example of aspects of a STA as described herein. The device 1805 may include a receiver 1810, a WUR frame manager 1815, and a transmitter 1820. The device 1805 may also include a processor. Each of these components may be in communication with one another (e.g., via one or more buses).

Receiver 1810 may receive information such as packets, user data, or control information associated with various information channels (e.g., control channels, data channels, and information related to WUR frame formats, etc.). Information may be passed on to other components of the device. The receiver 1810 may be an example of aspects of the transceiver 2120 described with reference to FIG. 21. The receiver 1810 may utilize a single antenna or a set of antennas.

The WUR frame manager 1815 may receive at least a portion of a WUR frame, decode the at least the portion of the WUR frame that includes a first field of a first portion of the WUR frame, and determine that the WUR frame is a fixed length frame or a variable length frame based on the first field. The WUR frame manager 1815 may also receive a WUR frame, determine an FCS type of the WUR frame corresponding to the FCS portion, and determine whether the WUR frame is a valid frame based on performing an FCS operation corresponding to the FCS type of the WUR frame. The WUR frame manager 1815 may be an example of aspects of the WUR frame manager 2110 described herein.

The WUR frame manager 1815, or its sub-components, may be implemented in hardware, code (e.g., software or firmware) executed by a processor, or any combination thereof. If implemented in code executed by a processor, the functions of the WUR frame manager 1815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The WUR frame manager 1815, or its sub-components, may be physically located at different locations, including being distributed such that portions of functions are implemented at different physical locations by one or more physical components. In some examples, the WUR frame manager 1815, or its sub-components, may be a separate and distinct component in accordance with some implementations. In some examples, the WUR frame manager 1815, or its sub-components, may be combined with one or more other hardware components, including but not limited to an input/output (I/O) component, a transceiver, a network server, another computing device, one or more other components described in the present disclosure, or a combination thereof in accordance with some implementations.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2120 described with reference to FIG. 21. The transmitter 1820 may utilize a single antenna or a set of antennas.

Figure 19:
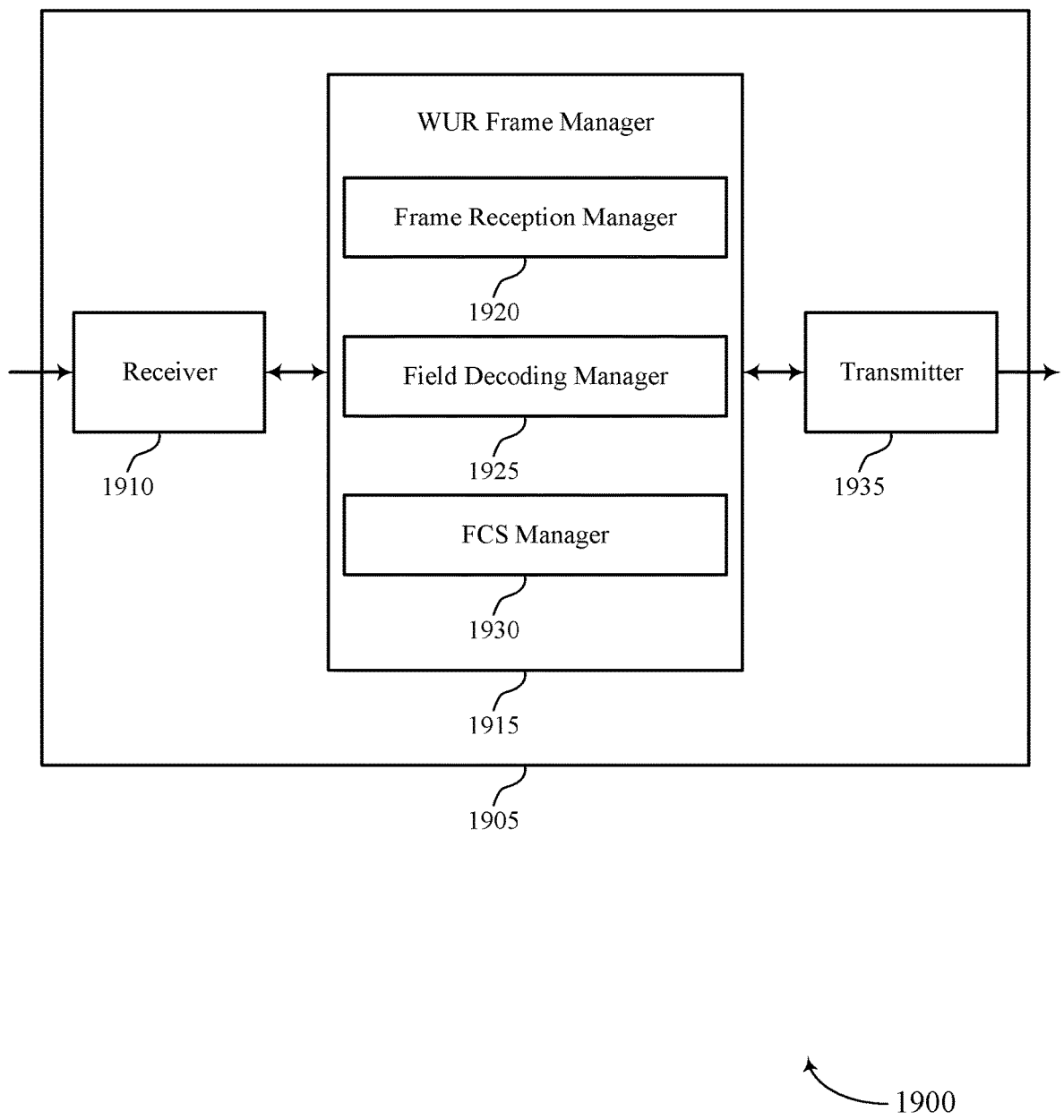

FIG. 19 shows a block diagram 1900 of a device 1905 that supports WUR frame formats and device communications in accordance with some implementations. The device 1905 may be an example of aspects of a device 1805 or a STA 106 as described herein. The device 1905 may include a receiver 1910, a WUR frame manager 1915, and a transmitter 1935. The device 1905 may also include a processor. Each of these components may be in communication with one another (e.g., via one or more buses).

Receiver 1910 may receive information such as packets, user data, or control information associated with various information channels (e.g., control channels, data channels, and information related to WUR frame formats, etc.). Information may be passed on to other components of the device. The receiver 1910 may be an example of aspects of the transceiver 2120 described with reference to FIG. 21. The receiver 1910 may utilize a single antenna or a set of antennas.

The WUR frame manager 1915 may be an example of aspects of the WUR frame manager 1815 as described herein. The WUR frame manager 1915 may include a frame reception manager 1920, a field decoding manager 1925, and a FCS manager 1930. The WUR frame manager 1915 may be an example of aspects of the WUR frame manager 2110 described herein.

The frame reception manager 1920 may receive at least a portion of a WUR frame. The field decoding manager 1925 may decode the at least the portion of the WUR frame that includes a first field of a first portion of the WUR frame and determine that the WUR frame is a fixed length frame or a variable length frame based on the first field. The frame reception manager 1920 may receive a WUR frame. The FCS manager 1930 may determine an FCS type of the WUR frame corresponding to the FCS portion and determine whether the WUR frame is a valid frame based on performing an FCS operation corresponding to the FCS type of the WUR frame.

Transmitter 1935 may transmit signals generated by other components of the device. In some examples, the transmitter 1935 may be collocated with a receiver 1910 in a transceiver module. For example, the transmitter 1935 may be an example of aspects of the transceiver 2120 described with reference to FIG. 21. The transmitter 1935 may utilize a single antenna or a set of antennas.

Figure 20:
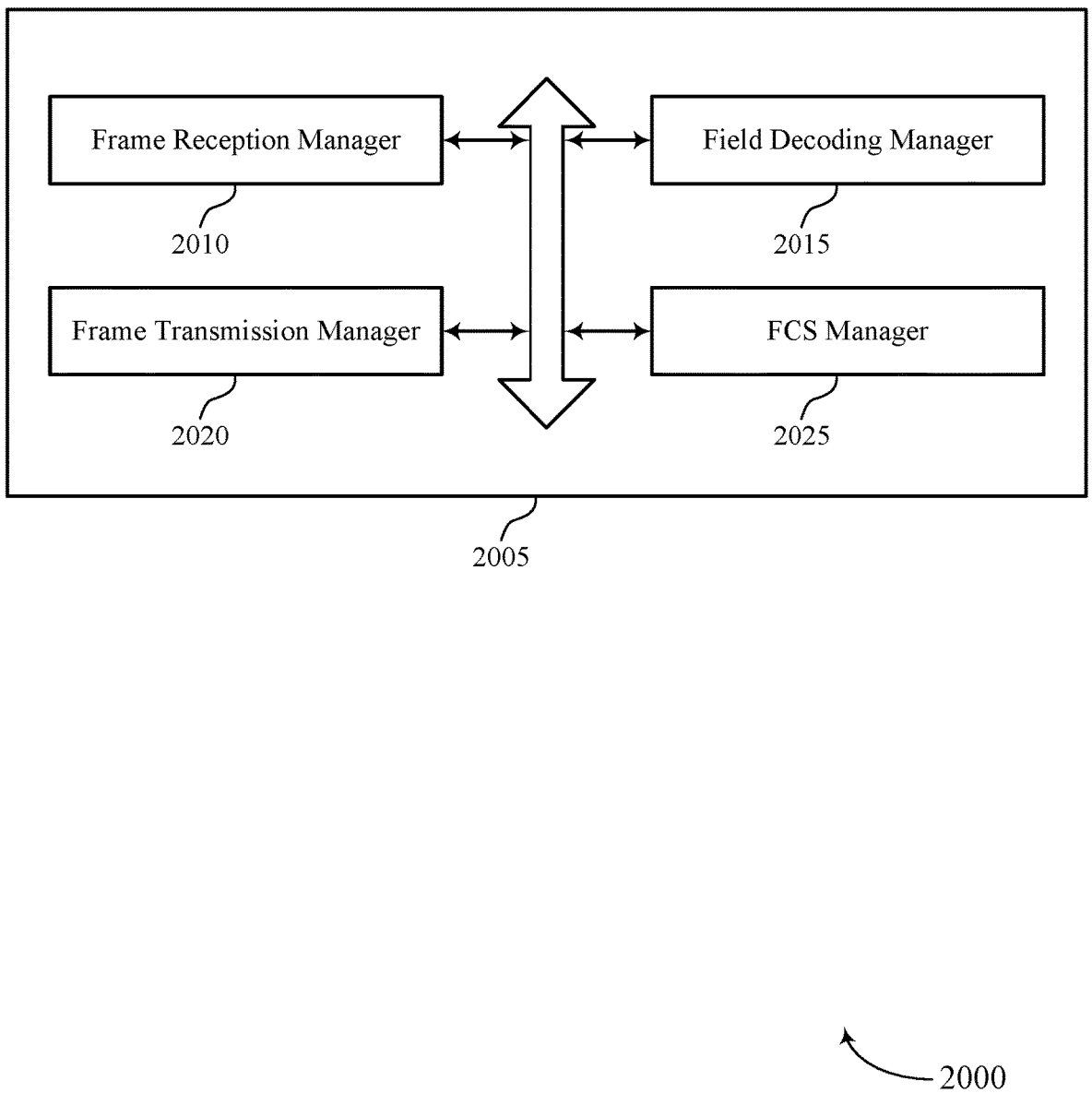
FIG. 20 shows a block diagram of a WUR frame manager that supports WUR frame formats and device communications in accordance with some implementations.

FIG. 20 shows a block diagram 2000 of a WUR frame manager 2005 that supports WUR frame formats and device communications in accordance with some implementations. The WUR frame manager 2005 may be an example of aspects of a WUR frame manager 1815, a WUR frame manager 1915, or a WUR frame manager 2110 described herein. The WUR frame manager 2005 may include a frame reception manager 2010, a field decoding manager 2015, a frame transmission manager 2020, and a FCS manager 2025. Each of these modules may communicate, directly or indirectly, with one another (e.g., via one or more buses).

The frame reception manager 2010 may receive at least a portion of a WUR frame. In some examples, the frame reception manager 2010 may receive a WUR frame. In some examples, the frame reception manager 2010 may receive a frame prior to the WUR frame. In some cases, the WUR frame is a WUR beacon frame.

The field decoding manager 2015 may decode the at least the portion of the WUR frame that includes a first field of a first portion of the WUR frame. In some examples, the field decoding manager 2015 may determine that the WUR frame is a fixed length frame or a variable length frame based on the first field. In some examples, the field decoding manager 2015 may decode the at least the portion of the WUR frame that includes a second field of the first portion of the WUR frame. In some examples, the field decoding manager 2015 may decode the at least the portion of the WUR frame that includes a third field of the first portion of the WUR frame. In some examples, the field decoding manager 2015 may decode the at least the portion of the WUR frame that includes a common field of the first portion of the WUR frame. In some examples, the field decoding manager 2015 may cease to decode a remainder of the WUR frame based on the identifier of the WUR frame. In some examples, the field decoding manager 2015 may decode the at least the portion of the WUR frame that includes at least some of a set of sequentially-ordered WUR identification values of a second portion of the WUR frame.

In some examples, the field decoding manager 2015 may determine that the WUR frame is not intended for the receiving wireless device based on a comparison of a WUR identification value of the receiving wireless device and a WUR identification value of the set of sequentially-ordered WUR identification values that is not a last value of the sequentially-ordered WUR identification values. In some examples, the field decoding manager 2015 may cease to decode a remainder of the WUR frame based on the determining that the WUR frame is not intended for the receiving wireless device. In some examples, the field decoding manager 2015 may decode the at least the portion of the WUR frame that includes a control instructions field of a second portion of the WUR frame. In some examples, the field decoding manager 2015 may decode the at least the portion of the WUR frame that includes a third portion of the WUR frame. In some examples, the field decoding manager 2015 may decode the at least the portion of the WUR frame that includes a TD control field of the first portion of the WUR frame. In some cases, the first field indicates to the receiving wireless device that a second portion of the WUR frame is omitted based on a value of the first field. In some cases, the first portion of the WUR frame has a fixed length. In some cases, each additional portion of the WUR frame may also have a fixed length. In some cases, the length of the second portion is an integer number of octets that is based on a value of the second field. In some cases, the first field indicates to the receiving wireless device that a second portion of the WUR frame is present based on a value of the first field. In some cases, the first portion includes a second field that indicates a length of the second portion. In some cases, the second field indicates (i) information different than a length of a second portion of the WUR frame or (ii) a length of a second portion of the WUR frame, the information or the length being indicated by the second field based on a value of the first field. In some cases, the third field indicates a format type of the WUR frame. In some cases, at least one of the second field or the third the value is adjacent to the first field. In some cases, the value of the first field indicates that the second field indicates information different than a length of a second portion of the WUR frame.

In some cases, a type of the information is indicated based on one or both of a value of the second field and a value of the third field. For example, the type of the information may be indicated based on the value of the second field. The type of the information may be indicated based on the value of the third field. In some implementations, type of the information may be indicated based on the value of the second field and the value of the third field. In some cases, the first portion is a MAC header. In some cases, the first portion is a PHY preamble. In some cases, the first field is positioned within a frame control field of the first portion. In some cases, the first field is positioned within a TD control field of the first portion. In some cases, the first field is positioned within the TD control field based on a protected field being positioned within a frame control field for a format type of the WUR frame. In some cases, the common field provides an identifier of the WUR frame. For example, the identifier of the WUR frame may be a partial BSS identifier. In some cases, the first field indicates to the receiving wireless device that the second portion of the WUR frame is present based on a value of the first field. In some cases, the set of sequentially-ordered WUR identification values are provided in a decreasing order. In some cases, the control instructions field includes a wake-up instruction associated with the receiving wireless device. In some cases, the wake-up instruction is based on the transmitted one or more instruction bits. In some cases, the TD control field provides a partial TSF. In some cases, the partial TFS being included in the TD control field is based on a format type of the WUR frame. In some cases, the partial TFS being included in the TD control field provides at least a portion of a monotonically increasing counter functionality.

In some cases, the WUR frame includes at least a first portion and an FCS portion. In some cases, the FCS portion is capable of being one of a plurality of FCS types. In some cases, the first portion of the WUR frame is decoded prior to the FCS portion of the WUR frame. In some cases, the first portion includes a frame control field and a TD control field, and where the protected field is positioned within one of the frame control field or the TD control field based on a format type of the WUR frame. In some cases, the frame control field has fewer bits than the TD control field. In some cases, the one or more protection bits in a portion of the WUR frame are decoded prior to the FCS portion of the WUR frame. In some cases, the portion of the WUR frame is different than the first portion of the WUR frame. In some cases, the first portion is a MAC header.

The FCS manager 2025 may determine an FCS type of the WUR frame corresponding to the FCS portion. In some examples, the FCS manager 2025 may determine whether the WUR frame is a valid frame based on performing an FCS operation corresponding to the FCS type of the WUR frame. In some examples, the FCS manager 2025 may determine that the FCS is a MIC based on a value of a protected field in the first portion. In some examples, the FCS manager 2025 may determine that the FCS is a CRC based on a value of a protected field in the first portion. In some examples, the FCS manager 2025 may discard the WUR frame based on the value of the FCS portion. In some cases, the third portion associated with an FCS.

In some cases, the FCS type is a CRC based on the WUR frame being an unprotected frame type. In some cases, the FCS type is a MIC based on the WUR frame being a protected frame type. In some cases, the determining the FCS type of the WUR frame includes determining the FCS type of the WUR frame based on information in a protected field of the first portion of the WUR frame. In some cases, the determining the FCS type of the WUR frame includes determining the FCS type of the WUR frame based on one or more protection indicator bits of the WUR frame. In some cases, the determining the FCS type of the WUR frame includes determining the FCS type of the WUR frame based on information in the frame prior to the WUR frame. In some cases, a value of the FCS portion is based on a modification with a partial BSS identifier of a transmitting wireless device. In some cases, an unmodified value of the FCS portion corresponds to a valid FCS value for the first portion of the WUR frame.

The frame transmission manager 2020 may transmit one or more instruction bits associated with the wake-up instruction to a transmitting wireless device. In some examples, the frame transmission manager 2020 may transmit a response to the WUR frame to a transmitting wireless device based on the wake-up instruction. In some examples, the frame transmission manager 2020 may transmit protection type information indicating whether the WUR frame is to be received as one of an unprotected frame type or a protected frame type.

Figure 21:
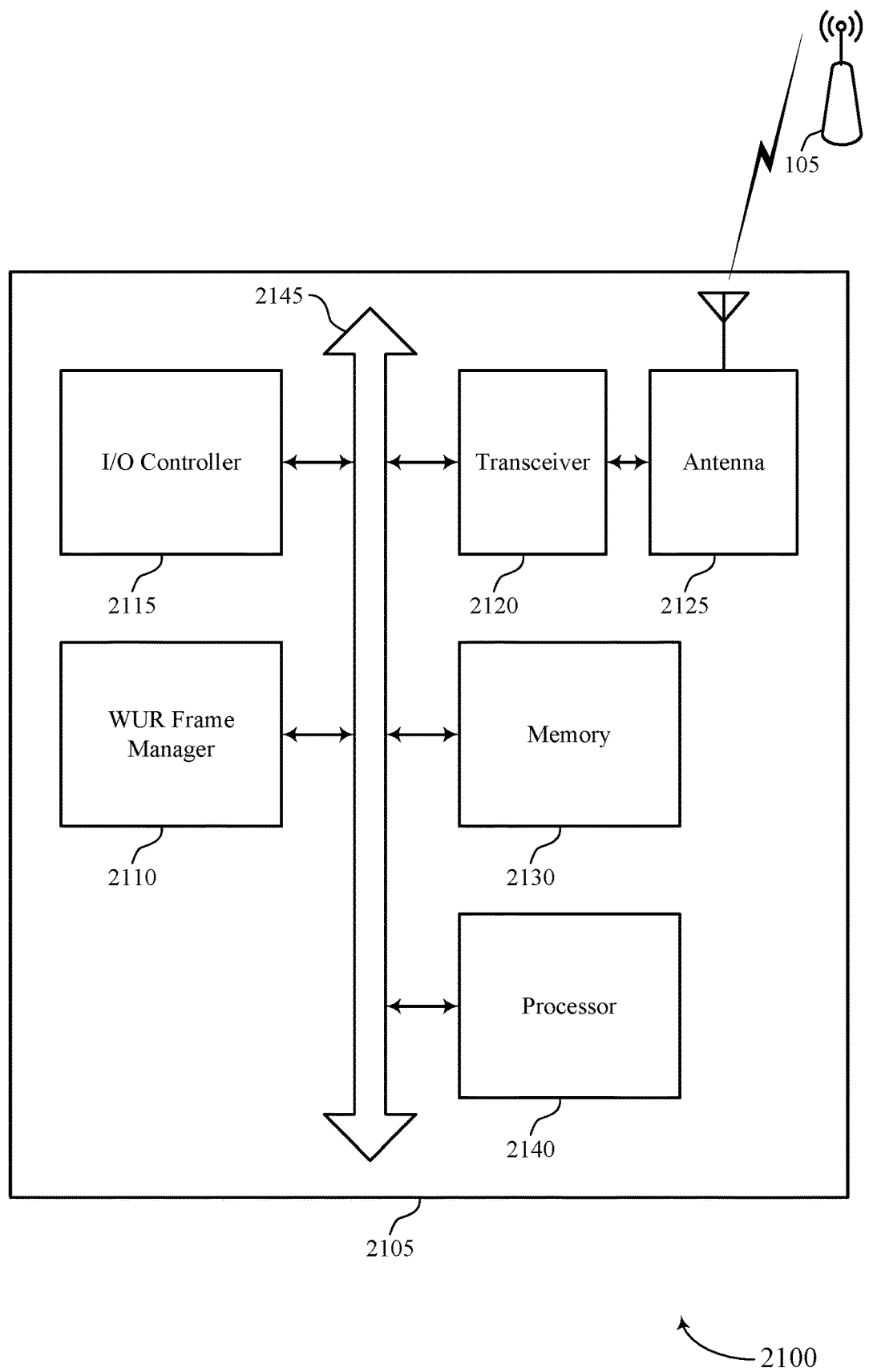
FIG. 21 shows a diagram of a system including a device that supports WUR frame formats and device communications in accordance with some implementations.

FIG. 21 shows a diagram of a system 2100 including a device 2105 that supports WUR frame formats and device communications in accordance with some implementations. The device 2105 may be an example of or include the components of device 1805, device 1905, or a STA as described herein. The device 2105 may include components for bi-directional voice and data communications including components for transmitting and receiving communications, including a WUR frame manager 2110, an I/O controller 2115, a transceiver 2120, an antenna 2125, memory 2130, and a processor 2140. These components may be in electronic communication via one or more buses (e.g., bus 2145).

The WUR frame manager 2110 may receive at least a portion of a WUR frame, decode the at least the portion of the WUR frame that includes a first field of a first portion of the WUR frame, and determine that the WUR frame is a fixed length frame or a variable length frame based on the first field. The WUR frame manager 2110 may also receive a WUR frame, determine an FCS type of the WUR frame corresponding to the FCS portion, and determine whether the WUR frame is a valid frame based on performing an FCS operation corresponding to the FCS type of the WUR frame.

I/O controller 2115 may manage input and output signals for device 2105. I/O controller 2115 may also manage peripherals not integrated into device 2105. In some cases, I/O controller 2115 may represent a physical connection or port to an external peripheral. In some cases, I/O controller 2115 may utilize an operating system such as iOS®, ANDROID®, MS-DOS®, MS-WINDOWS®, OS/2®, UNIX®, LINUX®, or another known operating system. In other cases, I/O controller 2115 may represent or interact with a modem, a keyboard, a mouse, a touchscreen, or a similar device. In some cases, I/O controller 2115 may be implemented as part of a processor. In some cases, a user may interact with device 2105 via I/O controller 2115 or via hardware components controlled by I/O controller 2115.

Transceiver 2120 may communicate bi-directionally, via one or more antennas, wired, or wireless links as described above. For example, the transceiver 2120 may represent a wireless transceiver and may communicate bi-directionally with another wireless transceiver. The transceiver 2120 may also include a modem to modulate the packets and provide the modulated packets to the antennas for transmission, and to demodulate packets received from the antennas.

In some cases, the wireless device may include a single antenna 2125. However, in some cases the device may have more than one antenna 2125, which may be capable of concurrently transmitting or receiving multiple wireless transmissions.

Memory 2130 may include RAM and ROM. The memory 2130 may store computer-readable, computer-executable software 2135 including instructions that, when executed, cause the processor to perform various functions described herein. In some cases, the memory 2130 may contain, among other things, a BIOS which may control basic hardware or software operation such as the interaction with peripheral components or devices.

Processor 2140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2140 may be configured to operate a memory array using a memory controller. In other cases, a memory controller may be integrated into processor 2140. Processor 2140 may be configured to execute computer-readable instructions stored in a memory to perform various functions (e.g., functions or tasks supporting WUR frame formats).

The various aspects of FIGS. 18 through 21 may be implemented with reference to FIGS. 1 through 13.

Figure 22:
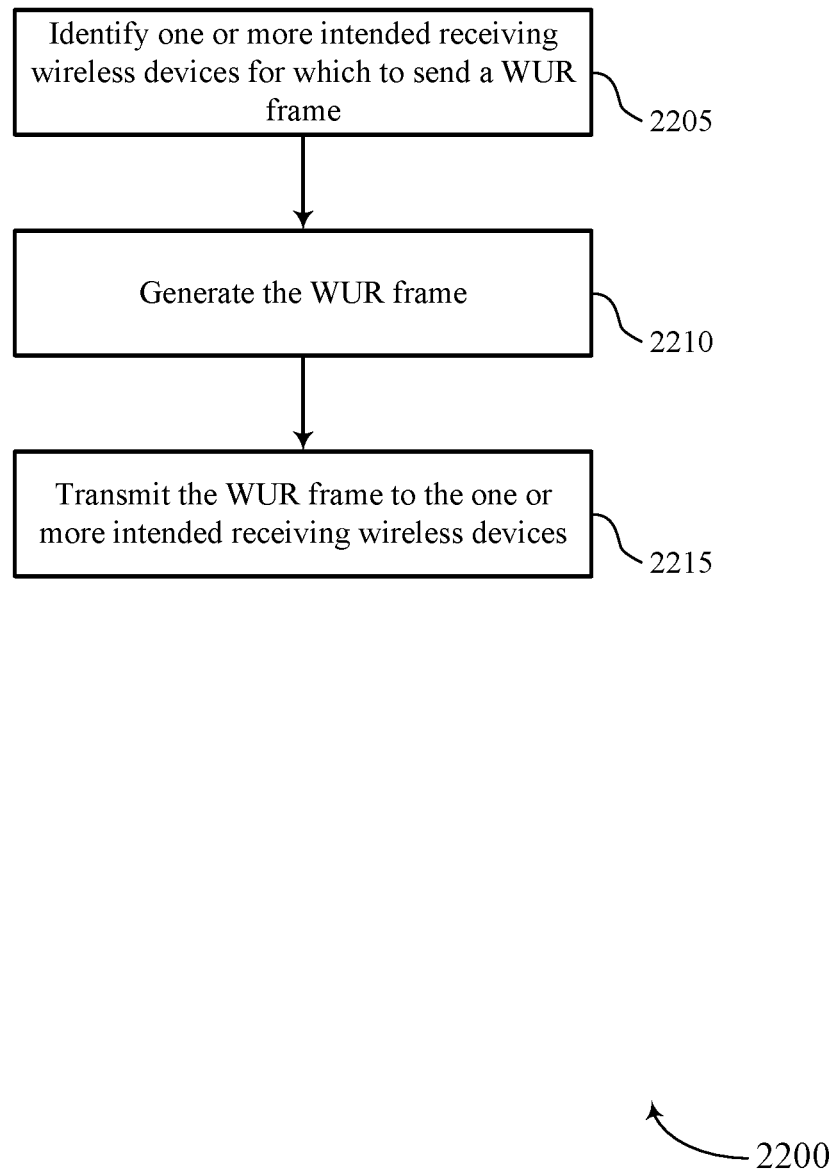
FIGS. 22 through 25 show flowcharts illustrating methods that support WUR frame formats and device communications in accordance with some implementations.

FIG. 22 shows a flowchart illustrating a method 2200 that supports WUR frame formats and device communications in accordance with some implementations. The operations of method 2200 may be implemented by a AP or its components as described herein. For example, the operations of method 2200 may be performed by a WUR frame manager as described with reference to FIGS. 14 through 17. In some examples, a AP may execute a set of instructions to control the functional elements of the AP to perform the functions described below. Additionally or alternatively, a AP may perform aspects of the functions described below using special-purpose hardware.

At 2205, the AP may identify one or more intended receiving wireless devices for which to send a WUR frame. The operations of 2205 may be performed according to the methods described herein. In some examples, aspects of the operations of 2205 may be performed by a selection manager as described with reference to FIGS. 14 through 17.

At 2210, the AP may generate the WUR frame. The operations of 2210 may be performed according to the methods described herein. In some examples, aspects of the operations of 2210 may be performed by a field generation manager as described with reference to FIGS. 14 through 17.

At 2215, the AP may transmit the WUR frame to the one or more intended receiving wireless devices. The operations of 2215 may be performed according to the methods described herein. In some examples, aspects of the operations of 2215 may be performed by a frame transmission manager as described with reference to FIGS. 14 through 17.

Figure 23:
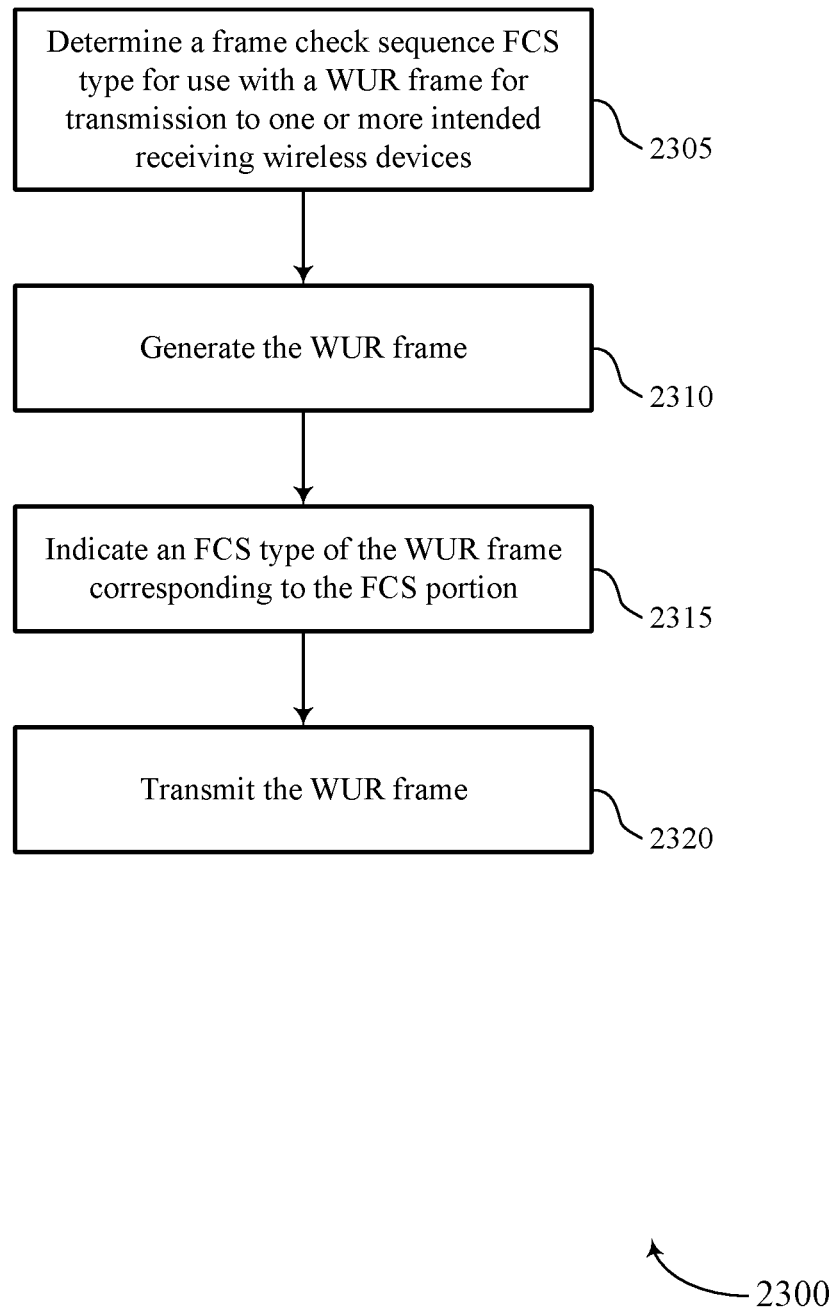

FIG. 23 shows a flowchart illustrating a method 2300 that supports WUR frame formats and device communications in accordance with some implementations. The operations of method 2300 may be implemented by a AP or its components as described herein. For example, the operations of method 2300 may be performed by a WUR frame manager as described with reference to FIGS. 14 through 17. In some examples, a AP may execute a set of instructions to control the functional elements of the AP to perform the functions described below. Additionally or alternatively, a AP may perform aspects of the functions described below using special-purpose hardware.

At 2305, the AP may determine a frame check sequence FCS type for use with a WUR frame for transmission to one or more intended receiving wireless devices. The operations of 2305 may be performed according to the methods described herein. In some examples, aspects of the operations of 2305 may be performed by a FCS manager as described with reference to FIGS. 14 through 17.

At 2310, the AP may generate the WUR frame. The operations of 2310 may be performed according to the methods described herein. In some examples, aspects of the operations of 2310 may be performed by a field generation manager as described with reference to FIGS. 14 through 17.

At 2315, the AP may indicate an FCS type of the WUR frame corresponding to the FCS portion. The operations of 2315 may be performed according to the methods described herein. In some examples, aspects of the operations of 2315 may be performed by a FCS manager as described with reference to FIGS. 14 through 17.

At 2320, the AP may transmit the WUR frame. The operations of 2320 may be performed according to the methods described herein. In some examples, aspects of the operations of 2320 may be performed by a frame transmission manager as described with reference to FIGS. 14 through 17.

Figure 24:
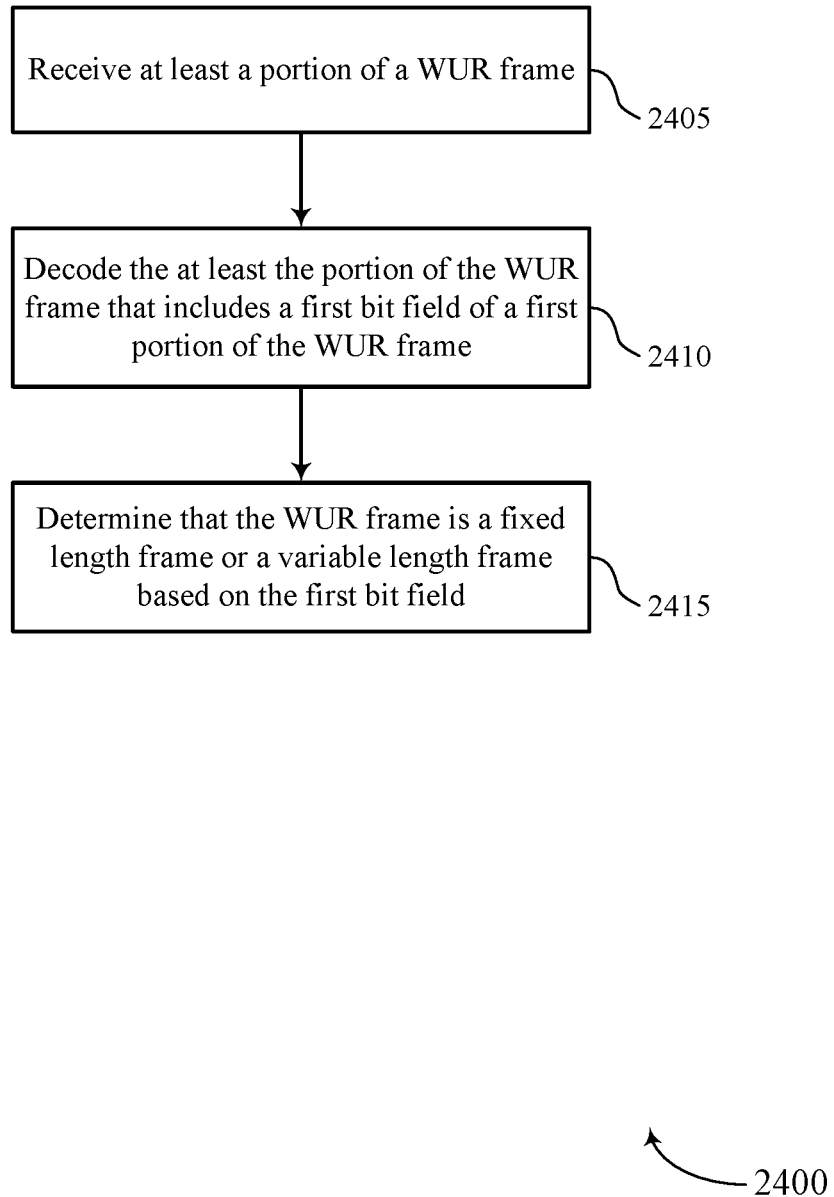

FIG. 24 shows a flowchart illustrating a method 2400 that supports WUR frame formats and device communications in accordance with some implementations. The operations of method 2400 may be implemented by a STA or its components as described herein. For example, the operations of method 2400 may be performed by a WUR frame manager as described with reference to FIGS. 18 through 21. In some examples, a STA may execute a set of instructions to control the functional elements of the STA to perform the functions described below. Additionally or alternatively, a STA may perform aspects of the functions described below using special-purpose hardware.

At 2405, the STA may receive at least a portion of a WUR frame. The operations of 2405 may be performed according to the methods described herein. In some examples, aspects of the operations of 2405 may be performed by a frame reception manager as described with reference to FIGS. 18 through 21.

At 2410, the STA may decode the at least the portion of the WUR frame that includes a first field of a first portion of the WUR frame. The operations of 2410 may be performed according to the methods described herein. In some examples, aspects of the operations of 2410 may be performed by a field decoding manager as described with reference to FIGS. 18 through 21.

At 2415, the STA may determine that the WUR frame is a fixed length frame or a variable length frame based on the first field. The operations of 2415 may be performed according to the methods described herein. In some examples, aspects of the operations of 2415 may be performed by a field decoding manager as described with reference to FIGS. 18 through 21.

Figure 25:
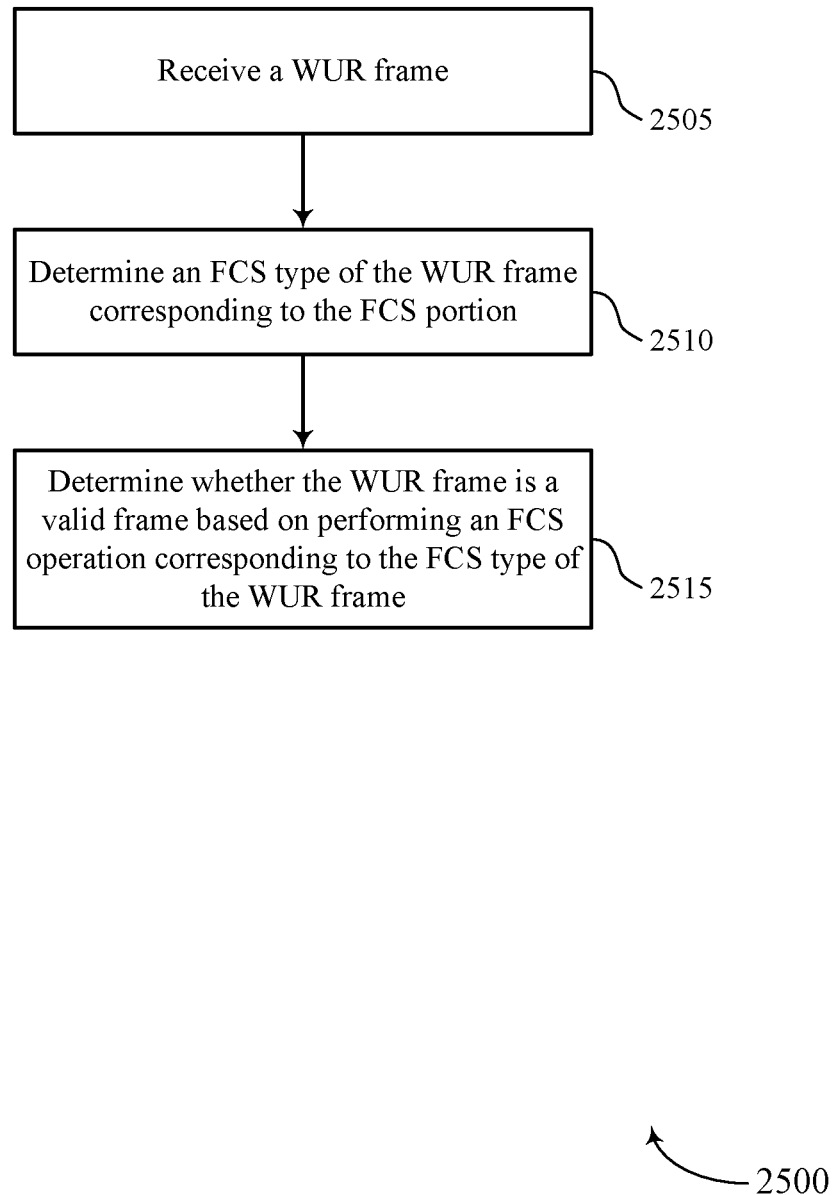

FIG. 25 shows a flowchart illustrating a method 2500 that supports WUR frame formats and device communications in accordance with some implementations. The operations of method 2500 may be implemented by a STA or its components as described herein. For example, the operations of method 2500 may be performed by a WUR frame manager as described with reference to FIGS. 18 through 21. In some examples, a STA may execute a set of instructions to control the functional elements of the STA to perform the functions described below. Additionally or alternatively, a STA may perform aspects of the functions described below using special-purpose hardware.

At 2505, the STA may receive a WUR frame. The operations of 2505 may be performed according to the methods described herein. In some examples, aspects of the operations of 2505 may be performed by a frame reception manager as described with reference to FIGS. 18 through 21.

At 2510, the STA may determine an FCS type of the WUR frame corresponding to the FCS portion. The operations of 2510 may be performed according to the methods described herein. In some examples, aspects of the operations of 2510 may be performed by a FCS manager as described with reference to FIGS. 18 through 21.

At 2515, the STA may determine whether the WUR frame is a valid frame based on performing an FCS operation corresponding to the FCS type of the WUR frame. The operations of 2515 may be performed according to the methods described herein. In some examples, aspects of the operations of 2515 may be performed by a FCS manager as described with reference to FIGS. 18 through 21.

The methods and techniques disclosed herein describe possible implementations, and that the operations and the steps may be rearranged or otherwise modified and that other implementations are possible. Furthermore, aspects from two or more of the methods may be combined.

Further, it should be appreciated that modules or other appropriate means for performing the methods and techniques described herein can be downloaded or otherwise obtained by a user terminal, STA, base station or AP as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal, STA. or base station or AP can obtain the various methods upon coupling or providing the storage means to the device. Moreover, any other suitable technique for providing the methods and techniques described herein to a device can be utilized. While the foregoing is directed to aspects of the present disclosure, other and further aspects of the disclosure may be devised without departing from the basic scope thereof, and the scope thereof is determined by the claims that follow.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an ASIC, a FPGA or other PLD, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication, comprising:
   identifying, by a transmitting wireless device, one or more intended receiving wireless devices for which to send a wake-up radio (WUR) frame;
   generating, by the transmitting wireless device, the WUR frame, the WUR frame comprising a media access control (MAC) header that includes a first field, a second field, and a protected field, wherein the first field indicates whether the WUR frame is a fixed length frame or a variable length frame, wherein the second field indicates miscellaneous information that is different from a length of a second portion of the WUR frame based at least in part on a first value of the first field, and wherein the protected field indicates whether data in the WUR frame is protected or unprotected; and
   transmitting, by the transmitting wireless device, the WUR frame to the one or more intended receiving wireless devices.

2. The method of claim 1, wherein the first field indicates to the one or more intended receiving wireless devices that the second portion of the WUR frame is omitted based at least in part on the first value of the first field, and wherein the MAC header of the WUR frame has a fixed length.

3. The method of claim 1, wherein the second field indicates the length of the second portion of the WUR frame based at least in part on a second value of the first field different from the first value of the first field.

4. The method of claim 3, wherein the MAC header includes a third field, the third field indicating a format type of the WUR frame, and wherein at least one of the second field or the third field is adjacent to the first field.

5. The method of claim 4, wherein a type of the information is indicated based at least in part on one or both of a value of the second field and a value of the third field.

6. The method of claim 1, wherein the first field is positioned within a frame control field of the MAC header.

7. The method of claim 1, wherein the first field is positioned within a type dependent (TD) control field of the MAC header, the first field being positioned within the TD control field based at least in part on the protected field being positioned within a frame control field for a format type of the WUR frame.

8. The method of claim 1, wherein the MAC header includes a common field that provides an identifier of the WUR frame.

9. The method of claim 1, wherein the first field indicates to the one or more intended receiving wireless devices that the second portion of the WUR frame is present based at least in part on a value of the first field, and wherein the second portion includes a control instructions field, the control instructions field including a wake-up instruction associated with at least one of the one or more intended receiving wireless devices.

10. The method of claim 1, wherein the MAC header comprises signaling for a wake-up identifier, the wake-up identifier corresponding to the at least one of the one or more intended receiving wireless devices.

11. The method of claim 1, wherein the MAC header comprises signaling for at least two of a format type of the WUR frame, a presence of the second portion, or a wireless device identifier.

12. The method of claim 1, wherein the MAC header comprises signaling for a wireless device identifier that corresponds to the transmitting wireless device.

13. The method of claim 12, wherein at least one bit of the wireless device identifier is positioned within a first two bytes of the MAC header.

14. The method of claim 1, wherein the MAC header comprises signaling for a group identifier, the group identifier corresponding to at least two intended receiving wireless devices.

15. The method of claim 1, wherein the WUR frame comprises a third portion, the third portion associated with a frame check sequence (FCS).

16. The method of claim 15, wherein an FCS type of the third portion is a cyclic redundancy check (CRC) based at least in part on the WUR frame being an unprotected frame type.

17. The method of claim 15, wherein an FCS type of the third portion is a message integrity check (MIC) based at least in part on the WUR frame being a protected frame type.

18. The method of claim 1, wherein the MAC header of the frame comprises a type dependent (TD) control field that provides a partial timing synchronization function (TSF), the partial TFS being included in the TD control field based at least in part on a format type of the WUR frame and providing at least a portion of a monotonically increasing counter functionality.

19. A method for wireless communication, comprising:
   determining, by a transmitting wireless device, a frame check sequence (FCS) type for use with a wake-up radio (WUR) frame for transmission to one or more intended receiving wireless devices;
   generating, by the transmitting wireless device, the WUR frame, the WUR frame comprising at least a media access control (MAC) header and an FCS portion, the FCS portion capable of being one of a plurality of FCS types, wherein the MAC header includes a first field, a second field, and a protected field that indicates whether data in the WUR frame is protected or unprotected;
   indicating, by the transmitting wireless device, miscellaneous information that is different from a length of a second portion of the WUR frame in the second field, the indicating of the miscellaneous information being based at least in part on a first value of the first field;
   indicating, by the transmitting wireless device, an FCS type of the WUR frame corresponding to the FCS portion based at least in part on information in the protected field; and
   transmitting, by the transmitting wireless device, the WUR frame.

20. The method of claim 19, wherein the FCS type is a cyclic redundancy check (CRC) based at least in part on the WUR frame being an unprotected frame type.

21. The method of claim 19, wherein the FCS type is a message integrity check (MIC) based at least in part on the WUR frame being a protected frame type.

22. The method of claim 19, wherein the indicating the FCS type of the WUR frame comprises indicating the FCS type of the WUR frame to the one or more intended receiving wireless devices via information in the protected field receivable by the one or more intended receiving wireless devices prior to the FCS portion of the WUR frame.

23. The method of claim 22, wherein the MAC header includes a frame control field and type dependent (TD) control field, and wherein the protected field is positioned within one of the frame control field or the TD control field based at least in part on a format type of the WUR frame.

24. The method of claim 19, wherein the indicating the FCS type of the WUR frame comprises indicating the FCS type of the WUR frame to the one or more intended receiving wireless devices via one or more protection indicator bits of the WUR frame, the one or more protection bits being positioned for transmission in a portion of the WUR frame prior to the FCS portion of the WUR frame, the portion of the WUR frame being different than the MAC header of the WUR frame.

25. The method of claim 19, wherein the indicating the FCS type of the WUR frame comprises indicating the FCS type of the WUR frame to the one or more intended receiving wireless devices via a frame for transmission prior to transmission of the WUR frame.

26. The method of claim 19, further comprising receiving protection type information indicating whether the WUR frame is to be transmitted as one of an unprotected frame type or a protected frame type, and wherein the indicating the FCS type of the WUR frame is based at least in part on the protection type information.

27. An apparatus for wireless communication, comprising:
   a processor;
   memory in electronic communication with the processor; and
   instructions stored in the memory and operable, when executed by the processor, to cause the apparatus to:
      identify one or more intended receiving wireless devices for which to send a wake-up radio (WUR) frame;
      generate the WUR frame, the WUR frame comprising a media access control (MAC) header that includes a first field, a second field, and a protected field, wherein the first field indicates whether the WUR frame is a fixed length frame or a variable length frame, wherein the second field indicates miscellaneous information that is different from a length of a second portion of the WUR frame based at least in part on a first value of the first field, and wherein the protected field indicates whether data in the WUR frame is protected or unprotected; and
      transmit the WUR frame to the one or more intended receiving wireless devices.

28. The apparatus of claim 27, wherein the first field indicates to the one or more intended receiving wireless devices that the second portion of the WUR frame is omitted based at least in part on the first value of the first field, and wherein the MAC header of the WUR frame has a fixed length.

29. An apparatus for wireless communication, comprising:
   a processor;
   memory in electronic communication with the processor; and
   instructions stored in the memory and operable, when executed by the processor, to cause the apparatus to:
      determine a frame check sequence (FCS) type for use with a wake-up radio (WUR) frame for transmission to one or more intended receiving wireless devices;
      generate the WUR frame, the WUR frame comprising at least a media access control (MAC) header and an FCS portion, the FCS portion capable of being one of a plurality of FCS types, wherein the MAC header includes a first field, a second field, and a protected field that indicates whether data in the WUR frame is protected or unprotected;

indicate miscellaneous information that is different from a length of a second portion of the WUR frame in the second field, the indicating of the miscellaneous information being based at least in part on a first value of the first field;

indicate an FCS type of the WUR frame corresponding to the FCS portion based at least in part on information in the protected field; and transmit the WUR frame.

30. The apparatus of claim 29, wherein the FCS type is a cyclic redundancy check (CRC) based at least in part on the WUR frame being an unprotected frame type.

* * * * *